US010623462B2

(12) United States Patent
LaJoie et al.

(10) Patent No.: US 10,623,462 B2
(45) Date of Patent: *Apr. 14, 2020

(54) PERSONAL CONTENT SERVER APPARATUS AND METHODS

(71) Applicant: Time Warner Cable Enterprises LLC, New York, NY (US)

(72) Inventors: Michael L. LaJoie, Stamford, CT (US); Michael Hayashi, Evergreen, CO (US)

(73) Assignee: Time Warner Cable Enterprises LLC, St. Louis, MO (US)

(*) Notice: Subject to any disclaimer, the term of this patent is extended or adjusted under 35 U.S.C. 154(b) by 180 days.

This patent is subject to a terminal disclaimer.

(21) Appl. No.: 15/823,059

(22) Filed: Nov. 27, 2017

(65) Prior Publication Data

US 2018/0159912 A1      Jun. 7, 2018

Related U.S. Application Data

(60) Continuation of application No. 15/137,923, filed on Apr. 25, 2016, now Pat. No. 9,832,246, which is a
(Continued)

(51) Int. Cl.
*G06F 15/16*        (2006.01)
*G06F 11/16*        (2006.01)
(Continued)

(52) U.S. Cl.
CPC ....... *H04L 65/601* (2013.01); *G06Q 30/0256* (2013.01); *G06Q 30/0601* (2013.01);
(Continued)

(58) Field of Classification Search
USPC ....... 709/219, 203, 217, 218, 228, 223, 225, 709/205, 207, 230
See application file for complete search history.

(56) References Cited

U.S. PATENT DOCUMENTS 3,388,376 A    6/1968  Magee
4,355,415 A    10/1982 George et al.
(Continued)

FOREIGN PATENT DOCUMENTS

CA    2376550 A1    12/2000
CA    2376550 C     8/2008
(Continued)

OTHER PUBLICATIONS

3 Point Digital to Showcase Revolutionary Video-On-Demand at Streaming Media West '99, http://www.vsoftcom/press 1999nhtm, Dec. 3, 1999.
(Continued)

*Primary Examiner* — Jude Jean Gilles
(74) *Attorney, Agent, or Firm* — Gazdzinski & Associates, PC

(57) ABSTRACT

Personal content server apparatus and associated methods that allow a user (e.g., cable or satellite network subscriber) to access content, such as a video program, from a location outside the subscriber's network. In one embodiment, a personal content server streams the content to the subscriber over a network connection from the local e.g., (subscription) network to a remote network upon authorization by a content manager process. Various access, business or operational rules are applied depending on the content and delivery mode; e.g., to live video broadcast, video-on-demand (VOD), or archived content from the subscriber's digital video recorder (DVR) or networked PVR. Secondary content (e.g., promotions, advertisements, etc.) can also be selectively replaced if desired in order to make the remotely delivered content more appropriate to the remote user's context.

23 Claims, 14 Drawing Sheets

Related U.S. Application Data continuation of application No. 13/888,224, filed on May 6, 2013, now Pat. No. 9,325,710, which is a division of application No. 12/717,089, filed on Mar. 3, 2010, now Pat. No. 8,438,243, which is a continuation of application No. 11/440,490, filed on May 24, 2006, now Pat. No. 8,280,982.

(51) Int. Cl.
| | |
|---|---|
| *H04L 29/06* | (2006.01) |
| *G06Q 30/02* | (2012.01) |
| *G06Q 30/06* | (2012.01) |
| *H04N 21/218* | (2011.01) |
| *H04N 21/254* | (2011.01) |
| *H04N 21/4147* | (2011.01) |
| *H04N 21/4227* | (2011.01) |
| *H04N 21/436* | (2011.01) |
| *H04N 21/63* | (2011.01) |
| *H04N 21/643* | (2011.01) |
| *H04N 21/81* | (2011.01) |
| *H04N 21/835* | (2011.01) |
| *H04L 29/08* | (2006.01) |
| *H04W 12/06* | (2009.01) |
| *H04W 12/00* | (2009.01) |

(52) U.S. Cl.
CPC .......... *H04L 63/10* (2013.01); *H04L 65/4076* (2013.01); *H04L 65/4084* (2013.01); *H04L 67/02* (2013.01); *H04N 21/2181* (2013.01); *H04N 21/2541* (2013.01); *H04N 21/4147* (2013.01); *H04N 21/4227* (2013.01); *H04N 21/43615* (2013.01); *H04N 21/632* (2013.01); *H04N 21/64322* (2013.01); *H04N 21/8193* (2013.01); *H04N 21/835* (2013.01); *H04W 12/06* (2013.01); *H04L 63/0428* (2013.01); *H04L 63/08* (2013.01); *H04W 12/00503* (2019.01)

(56) References Cited

U.S. PATENT DOCUMENTS

| | | | |
|---|---|---|---|
| 4,384,610 | A | 5/1983 | Cook et al. |
| 4,534,056 | A | 8/1985 | Feilchenfeld et al. |
| 4,546,382 | A | 10/1985 | McKenna et al. |
| 4,577,177 | A | 3/1986 | Marubashi |
| 4,602,279 | A | 7/1986 | Freeman |
| 4,694,490 | A | 9/1987 | Harvey et al. |
| 4,696,578 | A | 9/1987 | Mansuria et al. |
| 4,708,224 | A | 11/1987 | Schrooder |
| 4,749,062 | A | 6/1988 | Tsuji et al. |
| 4,902,732 | A | 2/1990 | Itoh et al. |
| 4,905,080 | A | 2/1990 | Watanabe et al. |
| 4,908,707 | A | 3/1990 | Kinghorn |
| 4,930,120 | A | 5/1990 | Baxter et al. |
| 4,930,158 | A | 5/1990 | Vogel |
| 4,959,720 | A | 9/1990 | Duffield et al. |
| 4,975,909 | A | 12/1990 | Masson et al. |
| 4,977,455 | A | 12/1990 | Young |
| 4,979,593 | A | 12/1990 | Watanabe et al. |
| 4,995,479 | A | 2/1991 | Fujiwara et al. |
| 5,042,620 | A | 8/1991 | Yoneda et al. |
| 5,047,867 | A | 9/1991 | Strubbe et al. |
| 5,056,629 | A | 10/1991 | Tsuji et al. |
| 5,086,450 | A | 2/1992 | Kitagawa et al. |
| 5,155,591 | A | 10/1992 | Wachob |
| 5,159,163 | A | 10/1992 | Bahjat et al. |
| 5,172,413 | A | 12/1992 | Bradley et al. |
| 5,200,583 | A | 4/1993 | Kupersmith et al. |
| 5,200,822 | A | 4/1993 | Bronfin et al. |
| 5,253,066 | A | 10/1993 | Vogel et al. |
| 5,255,341 | A | 10/1993 | Nakajima |
| 5,285,272 | A | 2/1994 | Bradley et al. |
| 5,287,266 | A | 2/1994 | Malec et al. |
| 5,290,710 | A | 3/1994 | Haj-Ali-Ahmadi et al. |
| 5,295,064 | A | 3/1994 | Malec et al. |
| 5,335,277 | A | 8/1994 | Harvey et al. |
| 5,357,276 | A | 10/1994 | Banker et al. |
| 5,371,532 | A | 12/1994 | Gelman et al. |
| 5,371,551 | A | 12/1994 | Logan et al. |
| 5,373,315 | A | 12/1994 | Dufresne et al. |
| 5,394,182 | A | 2/1995 | Klappert et al. |
| 5,412,720 | A | 5/1995 | Hoarty |
| 5,414,455 | A | 5/1995 | Hooper et al. |
| 5,442,389 | A | 8/1995 | Blahut et al. |
| 5,461,415 | A | 10/1995 | Wolf et al. |
| 5,463,209 | A | 10/1995 | Figh et al. |
| 5,479,266 | A | 12/1995 | Young et al. |
| 5,479,268 | A | 12/1995 | Young et al. |
| 5,481,294 | A | 1/1996 | Thomas et al. |
| 5,485,897 | A | 1/1996 | Matsumoto et al. |
| 5,497,185 | A | 3/1996 | Dufresne et al. |
| 5,512,934 | A | 4/1996 | Kochanski |
| 5,515,510 | A | 5/1996 | Kikinis |
| 5,517,257 | A | 5/1996 | Dunn et al. |
| 5,524,195 | A | 6/1996 | Clanton, III et al. |
| 5,528,282 | A | 6/1996 | Voeten et al. |
| 5,528,284 | A | 6/1996 | Iwami et al. |
| 5,534,911 | A | 7/1996 | Levitan |
| 5,535,206 | A | 7/1996 | Bestler et al. |
| 5,541,738 | A | 7/1996 | Mankovitz |
| 5,551,532 | A | 9/1996 | Kupersmith |
| 5,583,561 | A | 12/1996 | Baker et al. |
| 5,583,563 | A | 12/1996 | Wanderscheid et al. |
| 5,585,838 | A | 12/1996 | Lawler et al. |
| 5,589,892 | A | 12/1996 | Knee et al. |
| 5,592,551 | A | 1/1997 | Lett et al. |
| 5,600,364 | A | 2/1997 | Hendricks et al. |
| 5,606,154 | A | 2/1997 | Doigan et al. |
| 5,619,247 | A | 4/1997 | Russo |
| 5,619,249 | A | 4/1997 | Billock et al. |
| 5,625,405 | A | 4/1997 | Dulac et al. |
| 5,652,615 | A | 7/1997 | Bryant et al. |
| 5,657,072 | A | 8/1997 | Aristides et al. |
| 5,659,350 | A | 8/1997 | Hendricks et al. |
| 5,671,225 | A | 9/1997 | Hooper et al. |
| 5,675,647 | A | 10/1997 | Garneau et al. |
| 5,682,597 | A | 10/1997 | Ganek et al. |
| 5,684,714 | A | 11/1997 | Yogeshwar et al. |
| 5,684,963 | A | 11/1997 | Clement |
| 5,689,094 | A | 11/1997 | Friedli et al. |
| 5,701,383 | A | 12/1997 | Russo et al. |
| 5,708,961 | A | 1/1998 | Hylton et al. |
| 5,710,970 | A | 1/1998 | Walters et al. |
| 5,721,878 | A | 2/1998 | Ottesen et al. |
| 5,724,646 | A | 3/1998 | Ganek et al. |
| 5,729,280 | A | 3/1998 | Inoue et al. |
| 5,729,648 | A | 3/1998 | Boyce et al. |
| 5,748,254 | A | 5/1998 | Harrison et al. |
| 5,749,443 | A | 5/1998 | Romao |
| 5,751,282 | A | 5/1998 | Girard et al. |
| 5,758,257 | A | 5/1998 | Herz et al. |
| 5,761,607 | A | 6/1998 | Gudesen |
| 5,771,354 | A | 6/1998 | Crawford |
| 5,771,435 | A | 6/1998 | Brown |
| 5,774,170 | A | 6/1998 | Hite et al. |
| 5,778,181 | A | 7/1998 | Hidary et al. |
| 5,778,187 | A | 7/1998 | Monteiro et al. |
| 5,781,228 | A | 7/1998 | Sposato |
| 5,793,409 | A | 8/1998 | Tetsumura |
| 5,793,971 | A | 8/1998 | Fujita et al. |
| 5,794,217 | A | 8/1998 | Allen |
| 5,805,154 | A | 9/1998 | Brown |
| 5,805,155 | A | 9/1998 | Allibhoy et al. |
| 5,805,763 | A | 9/1998 | Lawler et al. |
| 5,805,804 | A | 9/1998 | Laursen et al. |
| 5,808,608 | A | 9/1998 | Young et al. |
| 5,809,204 | A | 9/1998 | Young et al. |
| 5,812,642 | A | 9/1998 | Leroy |
| 5,815,146 | A | 9/1998 | Youden et al. |
| 5,815,148 | A | 9/1998 | Tanaka |

(56) References Cited

U.S. PATENT DOCUMENTS

| | | | |
|---|---|---|---|
| 5,818,438 A | 10/1998 | Howe et al. |
| 5,818,440 A | 10/1998 | Allibhoy et al. |
| 5,818,510 A | 10/1998 | Cobbley et al. |
| 5,819,034 A | 10/1998 | Joseph et al. |
| 5,822,530 A | 10/1998 | Brown |
| 5,826,168 A | 10/1998 | Inoue et al. |
| 5,832,231 A | 11/1998 | Raman et al. |
| 5,835,125 A | 11/1998 | Bhagavath |
| 5,841,468 A | 11/1998 | Wright |
| 5,844,181 A | 12/1998 | Amo et al. |
| 5,844,897 A | 12/1998 | Asamizuya |
| 5,847,703 A | 12/1998 | Teicher et al. |
| 5,850,218 A | 12/1998 | LaJoie et al. |
| 5,861,881 A | 1/1999 | Freeman et al. |
| 5,864,176 A | 1/1999 | Babock et al. |
| 5,887,139 A | 3/1999 | Madison, Jr. et al. |
| 5,887,243 A | 3/1999 | Harvey et al. |
| 5,892,535 A | 4/1999 | Allen et al. |
| 5,892,915 A | 4/1999 | Duso et al. |
| 5,896,454 A | 4/1999 | Cookson et al. |
| 5,897,635 A | 4/1999 | Torres et al. |
| 5,909,638 A | 6/1999 | Allen |
| 5,914,945 A | 6/1999 | Abu-Amara et al. |
| 5,917,538 A | 6/1999 | Asamizuya |
| 5,918,222 A | 6/1999 | Fukui et al. |
| 5,918,665 A | 7/1999 | Babcock et al. |
| 5,930,473 A | 7/1999 | Teng et al. |
| 5,930,893 A | 8/1999 | Eaton |
| 5,932,853 A | 8/1999 | Friedli et al. |
| 5,940,370 A | 8/1999 | Curtis et al. |
| 5,955,710 A | 9/1999 | DiFranza |
| 5,956,716 A | 9/1999 | Kenner et al. |
| 5,960,411 A | 9/1999 | Hartman et al. |
| 5,970,206 A | 10/1999 | Yuen et al. |
| 5,974,299 A | 10/1999 | Massetti |
| 5,979,757 A | 11/1999 | Tracy et al. |
| 5,984,051 A | 11/1999 | Morgan et al. |
| 5,987,506 A | 11/1999 | Carter et al. |
| 5,991,308 A | 11/1999 | Fuhrmann et al. |
| 5,995,708 A | 11/1999 | Corey |
| 6,002,393 A | 12/1999 | Hite et al. |
| 6,005,603 A | 12/1999 | Flavin |
| 6,005,643 A | 12/1999 | Morimoto et al. |
| 6,006,265 A | 12/1999 | Rangan et al. |
| 6,009,098 A | 12/1999 | Asamizuya |
| 6,011,839 A | 1/2000 | Friedli et al. |
| 6,016,509 A | 1/2000 | Dedrick |
| 6,018,509 A | 1/2000 | Itoh et al. |
| 6,029,045 A | 2/2000 | Picco et al. |
| 6,047,327 A | 4/2000 | Tso et al. |
| 6,052,145 A | 4/2000 | Macrae et al. |
| 6,057,832 A | 5/2000 | Lev et al. |
| 6,058,380 A | 5/2000 | Anderson et al. |
| 6,069,023 A | 5/2000 | Bernier et al. |
| 6,073,160 A | 6/2000 | Grantham et al. |
| 6,073,727 A | 6/2000 | DiFranza et al. |
| 6,078,928 A | 6/2000 | Schnase et al. |
| 6,081,830 A | 6/2000 | Schindler |
| 6,082,500 A | 7/2000 | Amo et al. |
| 6,088,722 A | 7/2000 | Herz et al. |
| 6,091,883 A | 7/2000 | Artigalas et al. |
| 6,092,197 A | 7/2000 | Coueignoux |
| 6,097,431 A | 8/2000 | Anderson et al. |
| 6,112,192 A | 8/2000 | Capek |
| 6,122,647 A | 9/2000 | Horowitz et al. |
| 6,134,532 A | 10/2000 | Lazarus et al. |
| 6,137,793 A | 10/2000 | Gorman et al. |
| 6,144,401 A | 11/2000 | Casement et al. |
| 6,160,989 A | 12/2000 | Hendricks et al. |
| 6,161,142 A | 12/2000 | Wolfe et al. |
| 6,167,188 A | 12/2000 | Young et al. |
| 6,167,432 A | 12/2000 | Jiang |
| 6,169,570 B1 | 1/2001 | Suzuki |
| 6,177,931 B1 | 1/2001 | Alexander et al. |
| 6,181,697 B1 | 1/2001 | Nurenberg et al. |
| 6,182,050 B1 | 1/2001 | Ballard |
| 6,202,008 B1 | 3/2001 | Beckert et al. |
| 6,202,210 B1 | 3/2001 | Ludtke |
| 6,202,799 B1 | 3/2001 | Drop |
| 6,206,142 B1 | 3/2001 | Meacham |
| 6,208,335 B1 | 3/2001 | Gordon et al. |
| 6,216,129 B1 | 4/2001 | Eldering |
| 6,219,710 B1 | 4/2001 | Gray et al. |
| 6,223,160 B1 | 4/2001 | Kostka et al. |
| 6,233,389 B1 | 5/2001 | Barton et al. |
| 6,236,968 B1 | 5/2001 | Kanevsky et al. |
| 6,240,401 B1 | 5/2001 | Oren et al. |
| 6,259,701 B1 | 7/2001 | Shur et al. |
| 6,286,041 B1 | 9/2001 | Collins, III et al. |
| 6,292,624 B1 | 9/2001 | Saib et al. |
| 6,321,257 B1 | 11/2001 | Kotola et al. |
| 6,324,338 B1 | 11/2001 | Wood et al. |
| 6,327,418 B1 | 12/2001 | Barton |
| 6,341,668 B1 | 1/2002 | Fayette et al. |
| 6,343,313 B1 | 1/2002 | Salesky et al. |
| 6,343,647 B2 | 2/2002 | Kim et al. |
| 6,349,797 B1 | 2/2002 | Newville et al. |
| 6,369,840 B1 | 4/2002 | Barnett et al. |
| 6,378,035 B1 | 4/2002 | Parry et al. |
| 6,378,129 B1 | 4/2002 | Zetts |
| 6,397,976 B1 | 6/2002 | Hale et al. |
| 6,421,305 B1 | 7/2002 | Gioscia et al. |
| 6,434,562 B1 | 8/2002 | Pennywitt et al. |
| 6,446,261 B1 | 9/2002 | Rosser |
| RE37,881 E | 10/2002 | Haines |
| 6,460,036 B1 | 10/2002 | Herz |
| 6,463,585 B1 | 10/2002 | Hendricks et al. |
| 6,466,232 B1 | 10/2002 | Newell et al. |
| 6,467,089 B1 | 10/2002 | Aust et al. |
| 6,470,378 B1 | 10/2002 | Tracton et al. |
| 6,504,571 B1 | 1/2003 | Narayanaswami et al. |
| 6,519,062 B1 | 2/2003 | Yoo |
| 6,523,696 B1 | 2/2003 | Saito et al. |
| 6,549,718 B1 | 4/2003 | Grooters et al. |
| 6,553,178 B2 | 4/2003 | Abecassis |
| 6,560,203 B1 | 5/2003 | Beser et al. |
| 6,560,578 B2 | 5/2003 | Eldering |
| 6,571,279 B1 | 5/2003 | Herz et al. |
| 6,574,617 B1 | 6/2003 | Immerman et al. |
| 6,587,835 B1 | 7/2003 | Treyz et al. |
| 6,588,015 B1 | 7/2003 | Eyer et al. |
| 6,591,420 B1 | 7/2003 | McPherson et al. |
| 6,598,228 B2 | 7/2003 | Hejna et al. |
| 6,604,138 B1 | 8/2003 | Virine et al. |
| 6,611,654 B1 | 8/2003 | Shteyn |
| 6,615,039 B1 | 9/2003 | Eldering |
| 6,615,175 B1 | 9/2003 | Gazdzinski |
| 6,615,251 B1 | 9/2003 | Klug et al. |
| 6,622,305 B1 | 9/2003 | Willard |
| 6,640,145 B2 | 10/2003 | Hoffberg et al. |
| 6,647,548 B1 | 11/2003 | Lu et al. |
| 6,651,045 B1 | 11/2003 | MacAulay |
| 6,671,736 B2 | 12/2003 | Virine et al. |
| 6,671,879 B1 | 12/2003 | Schlarb et al. |
| 6,681,393 B1 | 1/2004 | Bauminger et al. |
| 6,687,735 B1 | 2/2004 | Logston et al. |
| 6,694,145 B2 | 2/2004 | Riikonen et al. |
| 6,704,930 B1 | 3/2004 | Eldering et al. |
| 6,718,551 B1 | 4/2004 | Swix et al. |
| 6,738,978 B1 | 5/2004 | Hendricks et al. |
| 6,741,980 B1 | 5/2004 | Langseth et al. |
| 6,757,796 B1 | 6/2004 | Hofmann |
| 6,760,918 B2 | 7/2004 | Rodriguez et al. |
| 6,769,127 B1 | 7/2004 | Bonomi et al. |
| 6,771,290 B1 | 8/2004 | Hoyle |
| 6,772,434 B1 | 8/2004 | Godwin |
| 6,775,778 B1 | 8/2004 | Laczko, Sr. et al. |
| 6,782,550 B1 | 8/2004 | Cao |
| 6,785,704 B1 | 8/2004 | McCanne |
| 6,788,676 B2 | 9/2004 | Partanen et al. |
| 6,792,577 B1 | 9/2004 | Kimoto |
| 6,801,792 B1 | 10/2004 | Schuster et al. |
| 6,802,077 B1 | 10/2004 | Schlarb |
| 6,810,528 B1 | 10/2004 | Chatani |

(56) References Cited

U.S. PATENT DOCUMENTS

| | | | |
|---|---|---|---|
| 6,813,776 B2 | 11/2004 | Chernock et al. |
| 6,817,028 B1 | 11/2004 | Jerding et al. |
| 6,826,267 B2 | 11/2004 | Daum et al. |
| 6,832,259 B2 | 12/2004 | Hymel et al. |
| 6,851,063 B1 | 2/2005 | Boyle et al. |
| 6,853,731 B1 | 2/2005 | Boyle et al. |
| 6,857,132 B1 | 2/2005 | Rakib et al. |
| 6,859,845 B2 | 2/2005 | Mate |
| 6,898,762 B2 | 5/2005 | Ellis et al. |
| 6,909,726 B1 | 6/2005 | Sheeran |
| 6,909,837 B1 | 6/2005 | Unger |
| 6,910,064 B1 | 6/2005 | Astarabadi et al. |
| 6,914,446 B1 | 7/2005 | Tustaniwskyj et al. |
| 6,915,528 B1 | 7/2005 | McKenna, Jr. |
| 6,920,565 B2 | 7/2005 | Isaacson et al. |
| 6,925,257 B2 | 8/2005 | Yoo |
| 6,934,880 B2 | 8/2005 | Hofner |
| 6,944,150 B1 | 9/2005 | McConnell et al. |
| 6,959,288 B1 | 10/2005 | Medina et al. |
| 6,975,850 B1 | 12/2005 | Hurtta et al. |
| 6,978,370 B1 | 12/2005 | Kocher |
| 6,990,312 B1 | 1/2006 | Gioscia et al. |
| 6,990,680 B1 | 1/2006 | Wugofski |
| 7,004,243 B1 | 2/2006 | Babcock et al. |
| 7,006,881 B1 | 2/2006 | Hoffberg et al. |
| 7,009,972 B2 | 3/2006 | Maher et al. |
| 7,016,376 B2 | 3/2006 | Goldenberg et al. |
| 7,017,179 B1 | 3/2006 | Asamoto et al. |
| 7,020,892 B2 | 3/2006 | Levesque et al. |
| 7,024,466 B2 | 4/2006 | Russell et al. |
| 7,024,678 B2 | 4/2006 | Gordon et al. |
| 7,025,209 B2 | 4/2006 | Hawkins |
| 7,027,460 B2 | 4/2006 | Iyer et al. |
| 7,028,009 B2 | 4/2006 | Wang et al. |
| 7,028,329 B1 | 4/2006 | Mizutani |
| 7,039,048 B1 | 5/2006 | Monta et al. |
| 7,039,928 B2 | 5/2006 | Kamada et al. |
| 7,054,843 B2 | 5/2006 | Charas |
| 7,054,902 B2 | 5/2006 | Toporek et al. |
| 7,058,685 B1 | 6/2006 | Van et al. |
| 7,058,810 B2 | 6/2006 | Kumazawa et al. |
| 7,068,639 B1 | 6/2006 | Varma et al. |
| 7,069,577 B2 | 6/2006 | Geile et al. |
| 7,073,189 B2 | 7/2006 | McElhatten et al. |
| 7,073,193 B2 | 7/2006 | Marsh |
| 7,075,945 B2 | 7/2006 | Arsenault et al. |
| 7,080,397 B2 | 7/2006 | Cochran et al. |
| 7,080,400 B1 | 7/2006 | Navar |
| 7,099,308 B2 | 8/2006 | Merrill et al. |
| 7,100,183 B2 | 8/2006 | Kunkel et al. |
| 7,103,906 B1 | 9/2006 | Katz et al. |
| 7,106,382 B2 | 9/2006 | Shiotsu |
| 7,109,848 B2 | 9/2006 | Schybergson |
| 7,124,195 B2 | 10/2006 | Roach et al. |
| 7,136,573 B2 | 11/2006 | Kikuchi et al. |
| 7,136,853 B1 | 11/2006 | Kohda et al. |
| 7,137,728 B2 | 11/2006 | Witham et al. |
| 7,143,431 B1 | 11/2006 | Eager et al. |
| 7,146,627 B1 | 12/2006 | Ismail et al. |
| 7,146,630 B2 | 12/2006 | Dravida et al. |
| 7,149,772 B1 | 12/2006 | Kalavade |
| 7,152,237 B2 | 12/2006 | Flickinger et al. |
| 7,155,226 B1 | 12/2006 | Oh et al. |
| 7,155,508 B2 | 12/2006 | Sankuratripati et al. |
| 7,159,235 B2 | 1/2007 | Son et al. |
| 7,171,485 B2 | 1/2007 | Roach et al. |
| 7,174,126 B2 | 2/2007 | McElhatten et al. |
| 7,174,127 B2 | 2/2007 | Otten et al. |
| 7,174,385 B2 | 2/2007 | Li |
| 7,184,526 B1 | 2/2007 | Cook |
| 7,191,244 B2 | 3/2007 | Jennings et al. |
| 7,194,001 B2 | 3/2007 | Leatherbury et al. |
| 7,194,009 B2 | 3/2007 | Eng |
| 7,197,472 B2 | 3/2007 | Conkwright et al. |
| 7,203,185 B1 | 4/2007 | Dhara et al. |
| 7,203,311 B1 | 4/2007 | Kahn et al. |
| 7,209,458 B2 | 4/2007 | Ahvonen et al. |
| 7,209,892 B1 | 4/2007 | Galuten et al. |
| 7,212,543 B1 | 5/2007 | Arwald et |
| 7,213,742 B1 | 5/2007 | Birch et al. |
| 7,216,170 B2 | 5/2007 | Ludvig et al. |
| 7,222,078 B2 | 5/2007 | Abelow |
| 7,222,163 B1 | 5/2007 | Girouard |
| 7,228,359 B1 | 6/2007 | Monteiro |
| 7,228,555 B2 | 6/2007 | Schlack |
| 7,231,669 B2 | 6/2007 | Leung et al. |
| 7,233,948 B1 | 6/2007 | Shamoon et al. |
| 7,237,250 B2 | 6/2007 | Kanojia et al. |
| 7,240,196 B2 | 7/2007 | Cooper et al. |
| 7,242,960 B2 | 7/2007 | Van et al. |
| 7,246,150 B1 | 7/2007 | Donoho et al. |
| 7,246,172 B2 | 7/2007 | Yoshiba et al. |
| 7,254,608 B2 | 8/2007 | Yeager et al. |
| 7,257,308 B2 | 8/2007 | Plourde et al. |
| 7,260,564 B1 | 8/2007 | Lynn |
| 7,263,187 B2 | 8/2007 | Pedlow et al. |
| 7,263,188 B2 | 8/2007 | Kohno |
| 7,266,198 B2 | 9/2007 | Medvinsky |
| 7,266,832 B2 | 9/2007 | Miller |
| 7,266,836 B2 | 9/2007 | Anttila et al. |
| 7,269,854 B2 | 9/2007 | Simmons et al. |
| 7,280,737 B2 | 10/2007 | Smith |
| 7,281,261 B2 | 10/2007 | Jaff et al. |
| 7,301,944 B1 | 11/2007 | Redmond |
| 7,305,357 B2 | 12/2007 | Hamilton |
| 7,305,691 B2 | 12/2007 | Cristofalo |
| 7,315,886 B1 | 1/2008 | Meenan et al. |
| 7,317,728 B2 | 1/2008 | Acharya et al. |
| 7,320,134 B1 | 1/2008 | Tomsen et al. |
| 7,321,923 B1 | 1/2008 | Rosenberg et al. |
| 7,325,073 B2 | 1/2008 | Shao et al. |
| 7,327,692 B2 | 2/2008 | Ain et al. |
| 7,330,483 B1 | 2/2008 | Peters, Jr. et al. |
| 7,330,875 B1 | 2/2008 | Parasnis et al. |
| 7,337,147 B2 | 2/2008 | Chen et al. |
| 7,337,459 B2 | 2/2008 | Tsutsui et al. |
| 7,340,510 B1 | 3/2008 | Liskov et al. |
| 7,340,760 B2 | 3/2008 | Wachtfogel et al. |
| 7,346,558 B2 | 3/2008 | Rosenberg |
| 7,346,630 B2 | 3/2008 | Eichstaedt et al. |
| 7,352,775 B2 | 4/2008 | Powell |
| 7,355,980 B2 | 4/2008 | Bauer et al. |
| 7,356,751 B1 | 4/2008 | Levitan |
| 7,360,233 B2 | 4/2008 | Russ et al. |
| 7,363,371 B2 | 4/2008 | Kirkby et al. |
| 7,363,643 B2 | 4/2008 | Drake et al. |
| 7,367,043 B2 | 4/2008 | Dudkiewicz et al. |
| 7,369,750 B2 | 5/2008 | Cheng et al. |
| 7,373,594 B1 | 5/2008 | Lopez et al. |
| 7,376,386 B2 | 5/2008 | Phillips et al. |
| 7,383,228 B2 | 6/2008 | Lisanke et al. |
| 7,386,621 B1 | 6/2008 | Hlasny |
| 7,406,099 B2 | 7/2008 | Schlagintweit |
| 7,438,233 B2 | 10/2008 | Leiper |
| 7,441,037 B2 | 10/2008 | Saxena |
| 7,457,520 B2 | 11/2008 | Rossetti et al. |
| 7,486,869 B2 | 2/2009 | Alexander et al. |
| 7,496,647 B2 | 2/2009 | Karaoguz et al. |
| 7,533,376 B2 | 5/2009 | Anwar et al. |
| 7,558,837 B1 | 7/2009 | Denny |
| 7,567,262 B1 | 7/2009 | Clemens et al. |
| 7,567,988 B2 | 7/2009 | Wolf et al. |
| 7,577,118 B2 | 8/2009 | Haumonte et al. |
| 7,592,912 B2 | 9/2009 | Hasek et al. |
| 7,602,820 B2 | 10/2009 | Helms et al. |
| 7,603,529 B1 | 10/2009 | MacHardy et al. |
| 7,627,492 B2 | 12/2009 | Nishizawa et al. |
| 7,634,546 B1 | 12/2009 | Strickholm et al. |
| 7,636,792 B1 * | 12/2009 | Ho .................. H04L 67/2823 |
| | | 709/200 |
| 7,640,581 B1 | 12/2009 | Brenton et al. |
| 7,647,618 B1 | 1/2010 | Hunter et al. |
| 7,653,689 B1 | 1/2010 | Champagne |
| 7,673,004 B1 | 3/2010 | Sherstinsky et al. |

(56) References Cited

U.S. PATENT DOCUMENTS

| | | | |
|---|---|---|---|
| 7,690,020 B2 | 3/2010 | Lebar | |
| 7,693,171 B2 | 4/2010 | Gould | |
| 7,707,644 B2 | 4/2010 | Choi et al. | |
| 7,712,125 B2 | 5/2010 | Herigstad et al. | |
| 7,720,432 B1 | 5/2010 | Colby et al. | |
| 7,721,314 B2 | 5/2010 | Sincaglia et al. | |
| 7,730,509 B2 | 6/2010 | Boulet et al. | |
| 7,742,074 B2 | 6/2010 | Minatogawa | |
| 7,769,629 B1 | 8/2010 | Kriza et al. | |
| 7,787,416 B2* | 8/2010 | Gidwani | H04W 28/18 370/310 |
| 7,793,334 B2 | 9/2010 | Lewis | |
| 7,805,515 B2 | 9/2010 | Riley | |
| 7,809,942 B2 | 10/2010 | Baran et al. | |
| 7,843,876 B2 | 11/2010 | Holt et al. | |
| 7,849,491 B2 | 12/2010 | Perlman | |
| 7,878,908 B2 | 2/2011 | Sloate et al. | |
| 7,900,229 B2 | 3/2011 | Dureau | |
| 7,908,626 B2 | 3/2011 | Williamson et al. | |
| 7,984,473 B1 | 7/2011 | Casile et al. | |
| 8,006,262 B2 | 8/2011 | Rodriguez et al. | |
| 8,006,273 B2 | 8/2011 | Rodriguez | |
| 8,015,583 B2 | 9/2011 | Bates et al. | |
| 8,024,762 B2 | 9/2011 | Britt | |
| 8,028,322 B2 | 9/2011 | Riedl et al. | |
| 8,042,131 B2 | 10/2011 | Flickinger | |
| 8,055,585 B2 | 11/2011 | Wu | |
| 8,065,703 B2 | 11/2011 | Wilson et al. | |
| 8,127,331 B2 | 2/2012 | Heilbron et al. | |
| 8,150,757 B1 | 4/2012 | Sieffert et al. | |
| 8,181,206 B2 | 5/2012 | Hasek | |
| 8,205,226 B2 | 6/2012 | Ko et al. | |
| 8,272,020 B2 | 9/2012 | Watson | |
| 8,280,982 B2* | 10/2012 | La Joie | G06Q 30/0256 709/219 |
| 8,396,055 B2 | 3/2013 | Patel et al. | |
| 8,424,048 B1 | 4/2013 | Lyren et al. | |
| 8,438,243 B2* | 5/2013 | LaJoie | G06Q 30/0256 709/219 |
| 8,527,602 B1 | 9/2013 | Rasmussen et al. | |
| 8,561,113 B2 | 10/2013 | Cansler et al. | |
| 8,583,758 B2 | 11/2013 | Casey et al. | |
| 8,584,182 B2 | 11/2013 | Berberet et al. | |
| 8,713,623 B2 | 4/2014 | Brooks | |
| 9,215,423 B2 | 12/2015 | Kimble et al. | |
| 9,317,241 B2* | 4/2016 | Tranchina | H04N 21/43632 |
| 9,325,710 B2* | 4/2016 | LaJoie | G06Q 30/0256 |
| 9,832,246 B2* | 11/2017 | LaJoie | G06Q 30/0256 |
| 2001/0001160 A1 | 5/2001 | Shoff et al. | |
| 2001/0003194 A1 | 6/2001 | Shimura et al. | |
| 2001/0004768 A1 | 6/2001 | Hodge et al. | |
| 2001/0013123 A1 | 8/2001 | Freeman et al. | |
| 2001/0013173 A1 | 8/2001 | Mertens et al. | |
| 2001/0030975 A1 | 10/2001 | Limb et al. | |
| 2001/0037223 A1 | 11/2001 | Beery et al. | |
| 2001/0049705 A1 | 12/2001 | Murase et al. | |
| 2001/0054181 A1 | 12/2001 | Corvin | |
| 2002/0003789 A1 | 1/2002 | Kim et al. | |
| 2002/0004870 A1 | 1/2002 | Kobayashi | |
| 2002/0013940 A1 | 1/2002 | Tsukamoto et al. | |
| 2002/0019984 A1 | 2/2002 | Rakib | |
| 2002/0026496 A1 | 2/2002 | Boyer et al. | |
| 2002/0027883 A1 | 3/2002 | Belaiche | |
| 2002/0032754 A1 | 3/2002 | Logston et al. | |
| 2002/0038296 A1 | 3/2002 | Margolus et al. | |
| 2002/0042921 A1 | 4/2002 | Ellis | |
| 2002/0046286 A1 | 4/2002 | Caldwell et al. | |
| 2002/0046406 A1 | 4/2002 | Chelehmal et al. | |
| 2002/0046407 A1 | 4/2002 | Franco | |
| 2002/0049800 A1 | 4/2002 | Kobayashi et al. | |
| 2002/0049902 A1 | 4/2002 | Rhodes | |
| 2002/0054754 A1 | 5/2002 | Kikuchi et al. | |
| 2002/0056118 A1 | 5/2002 | Hunter et al. | |
| 2002/0056125 A1 | 5/2002 | Hodge et al. | |
| 2002/0056175 A1 | 5/2002 | Magarino et al. | |
| 2002/0059619 A1 | 5/2002 | Lebar | |
| 2002/0059621 A1 | 5/2002 | Thomas et al. | |
| 2002/0059635 A1 | 5/2002 | Hoang | |
| 2002/0066033 A1 | 5/2002 | Dobbins et al. | |
| 2002/0069404 A1 | 6/2002 | Copeman et al. | |
| 2002/0073327 A1 | 6/2002 | Vellandi | |
| 2002/0073419 A1 | 6/2002 | Yen et al. | |
| 2002/0077984 A1 | 6/2002 | Ireton | |
| 2002/0078176 A1 | 6/2002 | Nomura et al. | |
| 2002/0078444 A1 | 6/2002 | Krewin et al. | |
| 2002/0082858 A1 | 6/2002 | Heddaya et al. | |
| 2002/0083456 A1 | 6/2002 | Bates et al. | |
| 2002/0085516 A1 | 7/2002 | Bridgelall | |
| 2002/0087661 A1 | 7/2002 | Matichuk et al. | |
| 2002/0087976 A1 | 7/2002 | Kaplan et al. | |
| 2002/0099642 A1 | 7/2002 | Schwankl et al. | |
| 2002/0100055 A1 | 7/2002 | Zeidman | |
| 2002/0104019 A1 | 8/2002 | Chatani et al. | |
| 2002/0104083 A1 | 8/2002 | Hendricks et al. | |
| 2002/0112186 A1 | 8/2002 | Ford et al. | |
| 2002/0112240 A1 | 8/2002 | Bacso et al. | |
| 2002/0120498 A1 | 8/2002 | Gordon et al. | |
| 2002/0123928 A1 | 9/2002 | Eldering et al. | |
| 2002/0124182 A1 | 9/2002 | Bacso et al. | |
| 2002/0138854 A1 | 9/2002 | Desai et al. | |
| 2002/0143565 A1 | 10/2002 | Headings et al. | |
| 2002/0144262 A1 | 10/2002 | Plotnick et al. | |
| 2002/0144263 A1 | 10/2002 | Eldering et al. | |
| 2002/0147771 A1 | 10/2002 | Traversat et al. | |
| 2002/0147984 A1 | 10/2002 | Tomsen et al. | |
| 2002/0151271 A1 | 10/2002 | Tatsuji et al. | |
| 2002/0152299 A1 | 10/2002 | Traversat et al. | |
| 2002/0152458 A1 | 10/2002 | Eyer et al. | |
| 2002/0161835 A1 | 10/2002 | Ball | |
| 2002/0166121 A1 | 11/2002 | Rovira | |
| 2002/0169961 A1 | 11/2002 | Giles et al. | |
| 2002/0174430 A1 | 11/2002 | Ellis et al. | |
| 2002/0178445 A1 | 11/2002 | Eldering et al. | |
| 2002/0178447 A1 | 11/2002 | Plotnick et al. | |
| 2002/0184629 A1 | 12/2002 | Sie et al. | |
| 2002/0184634 A1 | 12/2002 | Cooper | |
| 2002/0184635 A1 | 12/2002 | Istvan | |
| 2002/0188689 A1 | 12/2002 | Michael | |
| 2002/0188744 A1 | 12/2002 | Mani | |
| 2002/0188869 A1 | 12/2002 | Patrick | |
| 2002/0191950 A1 | 12/2002 | Wang | |
| 2002/0194498 A1 | 12/2002 | Blight et al. | |
| 2002/0196940 A1 | 12/2002 | Isaacson et al. | |
| 2003/0004810 A1 | 1/2003 | Eldering | |
| 2003/0005447 A1 | 1/2003 | Rodriguez | |
| 2003/0005453 A1 | 1/2003 | Rodriguez et al. | |
| 2003/0018977 A1 | 1/2003 | McKenna | |
| 2003/0022990 A1 | 1/2003 | Hirota et al. | |
| 2003/0023690 A1 | 1/2003 | Lohtia | |
| 2003/0028893 A1 | 2/2003 | H. Addington et al. | |
| 2003/0030751 A1 | 2/2003 | Lupulescu et al. | |
| 2003/0033199 A1 | 2/2003 | Coleman | |
| 2003/0037330 A1 | 2/2003 | Makofka | |
| 2003/0037335 A1 | 2/2003 | Gatto et al. | |
| 2003/0037338 A1 | 2/2003 | Suzuki | |
| 2003/0049021 A1 | 3/2003 | Kamieniecki | |
| 2003/0053476 A1 | 3/2003 | Sorenson et al. | |
| 2003/0056217 A1 | 3/2003 | Brooks | |
| 2003/0058887 A1 | 3/2003 | Dworkin et al. | |
| 2003/0070052 A1 | 4/2003 | Lai | |
| 2003/0074661 A1 | 4/2003 | Krapf et al. | |
| 2003/0093311 A1 | 5/2003 | Knowlson | |
| 2003/0093515 A1 | 5/2003 | Kauffman | |
| 2003/0093784 A1 | 5/2003 | Dimitrova et al. | |
| 2003/0093790 A1 | 5/2003 | Logan et al. | |
| 2003/0093792 A1 | 5/2003 | Labeeb et al. | |
| 2003/0093806 A1 | 5/2003 | Dureau et al. | |
| 2003/0097574 A1 | 5/2003 | Upton | |
| 2003/0101449 A1 | 5/2003 | Bentolila et al. | |
| 2003/0101451 A1 | 5/2003 | Bentolila et al. | |
| 2003/0101454 A1 | 5/2003 | Ozer et al. | |
| 2003/0110499 A1 | 6/2003 | Knudson et al. | |
| 2003/0110503 A1 | 6/2003 | Perkes | |
| 2003/0115267 A1 | 6/2003 | Hinton et al. | |

(56) References Cited

U.S. PATENT DOCUMENTS

| | | |
|---|---|---|
| 2003/0115601 A1 | 6/2003 | Palazzo et al. |
| 2003/0118014 A1 | 6/2003 | Iyer et al. |
| 2003/0130008 A1 | 7/2003 | Rajaniemi et al. |
| 2003/0135513 A1 | 7/2003 | Quinn et al. |
| 2003/0135628 A1 | 7/2003 | Fletcher et al. |
| 2003/0143984 A1 | 7/2003 | Umeda |
| 2003/0145323 A1 | 7/2003 | Hendricks et al. |
| 2003/0149581 A1 | 8/2003 | Chaudhri |
| 2003/0149884 A1 | 8/2003 | Hernandez et al. |
| 2003/0149975 A1 | 8/2003 | Eldering et al. |
| 2003/0149988 A1 | 8/2003 | Ellis et al. |
| 2003/0149993 A1 | 8/2003 | Son et al. |
| 2003/0151621 A1 | 8/2003 | McEvilly et al. |
| 2003/0163832 A1 | 8/2003 | Tsuria et al. |
| 2003/0165241 A1 | 9/2003 | Fransdonk |
| 2003/0166401 A1 | 9/2003 | Combes et al. |
| 2003/0177490 A1 | 9/2003 | Hoshino et al. |
| 2003/0182551 A1 | 9/2003 | Frantz et al. |
| 2003/0188023 A1 | 10/2003 | Grecco et al. |
| 2003/0208763 A1 | 11/2003 | McElhatten et al. |
| 2003/0208767 A1 | 11/2003 | Williamson et al. |
| 2003/0208768 A1 | 11/2003 | Urdang et al. |
| 2003/0217137 A1 | 11/2003 | Roese et al. |
| 2003/0217365 A1 | 11/2003 | Caputo |
| 2003/0223450 A1 | 12/2003 | Bender et al. |
| 2003/0225777 A1 | 12/2003 | Marsh |
| 2003/0226150 A1 | 12/2003 | Berberet et al. |
| 2003/0229898 A1 | 12/2003 | Babu et al. |
| 2003/0229900 A1 | 12/2003 | Reisman |
| 2003/0231661 A1 | 12/2003 | DePietro et al. |
| 2003/0236839 A1 | 12/2003 | Demsky et al. |
| 2003/0237090 A1 | 12/2003 | Boston et al. |
| 2004/0006694 A1 | 1/2004 | Heelan et al. |
| 2004/0015608 A1 | 1/2004 | Ellis et al. |
| 2004/0015989 A1 | 1/2004 | Kaizu et al. |
| 2004/0025181 A1 | 2/2004 | Addington et al. |
| 2004/0025190 A1 | 2/2004 | McCalla et al. |
| 2004/0034873 A1 | 2/2004 | Zenoni |
| 2004/0034877 A1 | 2/2004 | Nogues |
| 2004/0039911 A1 | 2/2004 | Oka et al. |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0047599 A1 | 3/2004 | Grzeczkowski |
| 2004/0049694 A1 | 3/2004 | Candelore |
| 2004/0060076 A1 | 3/2004 | Song |
| 2004/0078371 A1 | 4/2004 | Worrall et al. |
| 2004/0078809 A1 | 4/2004 | Drazin |
| 2004/0093394 A1 | 5/2004 | Weber et al. |
| 2004/0103120 A1 | 5/2004 | Fickle et al. |
| 2004/0103429 A1 | 5/2004 | Carlucci et al. |
| 2004/0103479 A1 | 6/2004 | Mossbeck et al. |
| 2004/0104842 A1 | 6/2004 | Drury et al. |
| 2004/0114539 A1 | 6/2004 | Beshai et al. |
| 2004/0117817 A1 | 6/2004 | Kwon et al. |
| 2004/0117846 A1 | 6/2004 | Karaoguz et al. |
| 2004/0123125 A1 | 6/2004 | Zuili |
| 2004/0133467 A1 | 7/2004 | Siler |
| 2004/0133923 A1 | 7/2004 | Watson et al. |
| 2004/0137918 A1 | 7/2004 | Varonen et al. |
| 2004/0148625 A1 | 7/2004 | Eldering et al. |
| 2004/0153525 A1 | 8/2004 | Borella |
| 2004/0162900 A1 | 8/2004 | Bucher |
| 2004/0163111 A1 | 8/2004 | Palazzo et al. |
| 2004/0163129 A1 | 8/2004 | Chapman et al. |
| 2004/0172531 A1 | 9/2004 | Little et al. |
| 2004/0177383 A1 | 9/2004 | Martinolich et al. |
| 2004/0181811 A1 | 9/2004 | Rakib |
| 2004/0185856 A1 | 9/2004 | McKenna et al. |
| 2004/0193712 A1 | 9/2004 | Benenati et al. |
| 2004/0198386 A1 | 10/2004 | Dupray |
| 2004/0221305 A1 | 11/2004 | Broussard et al. |
| 2004/0246933 A1 | 12/2004 | Valko et al. |
| 2004/0250273 A1 | 12/2004 | Swix et al. |
| 2004/0255139 A1 | 12/2004 | Giobbi |
| 2004/0255335 A1 | 12/2004 | Fickle et al. |
| 2004/0261099 A1 | 12/2004 | Durden et al. |
| 2004/0264511 A1 | 12/2004 | Futch et al. |
| 2004/0264551 A1 | 12/2004 | Eidson |
| 2004/0266336 A1 | 12/2004 | Patsiokas et al. |
| 2004/0268386 A1 | 12/2004 | Logan et al. |
| 2005/0021940 A1 | 1/2005 | Ma |
| 2005/0022237 A1 | 1/2005 | Nomura |
| 2005/0022242 A1 | 1/2005 | Rosetti et al. |
| 2005/0022247 A1 | 1/2005 | Bitran et al. |
| 2005/0027696 A1 | 2/2005 | Swaminathan et al. |
| 2005/0028208 A1 | 2/2005 | Ellis et al. |
| 2005/0034171 A1 | 2/2005 | Benya |
| 2005/0034173 A1 | 2/2005 | Hatanaka |
| 2005/0038904 A1 | 2/2005 | Dougall |
| 2005/0039205 A1 | 2/2005 | Riedl |
| 2005/0049886 A1 | 3/2005 | Grannan et al. |
| 2005/0055220 A1 | 3/2005 | Lee et al. |
| 2005/0060742 A1 | 3/2005 | Riedl et al. |
| 2005/0060745 A1 | 3/2005 | Riedl et al. |
| 2005/0071882 A1 | 3/2005 | Rodriguez et al. |
| 2005/0080330 A1* | 4/2005 | Masuzawa ............ G06F 19/321 600/407 |
| 2005/0086683 A1 | 4/2005 | Meyerson |
| 2005/0086691 A1 | 4/2005 | Dudkiewicz et al. |
| 2005/0091539 A1 | 4/2005 | Wang et al. |
| 2005/0091681 A1 | 4/2005 | Borden et al. |
| 2005/0097006 A1 | 5/2005 | Nyako |
| 2005/0102529 A1 | 5/2005 | Buddhikot et al. |
| 2005/0108529 A1 | 5/2005 | Juneau |
| 2005/0108763 A1 | 5/2005 | Baran et al. |
| 2005/0111467 A1 | 5/2005 | Ng et al. |
| 2005/0114900 A1 | 5/2005 | Ladd et al. |
| 2005/0138357 A1 | 6/2005 | Swenson et al. |
| 2005/0144333 A1 | 6/2005 | Kotzin |
| 2005/0144635 A1 | 6/2005 | Boortz et al. |
| 2005/0153778 A1 | 7/2005 | Nelson et al. |
| 2005/0166224 A1 | 7/2005 | Ficco |
| 2005/0177855 A1 | 8/2005 | Maynard et al. |
| 2005/0179938 A1 | 8/2005 | Kayashima et al. |
| 2005/0183120 A1 | 8/2005 | Jain et al. |
| 2005/0204019 A1 | 9/2005 | Flynn et al. |
| 2005/0210502 A1 | 9/2005 | Flickinger et al. |
| 2005/0216942 A1 | 9/2005 | Barton |
| 2005/0223032 A1 | 10/2005 | Shan et al. |
| 2005/0223409 A1 | 10/2005 | Rautila et al. |
| 2005/0229209 A1 | 10/2005 | Hildebolt et al. |
| 2005/0229213 A1 | 10/2005 | Ellis et al. |
| 2005/0235318 A1 | 10/2005 | Grauch et al. |
| 2005/0239402 A1 | 10/2005 | Gioscia et al. |
| 2005/0251454 A1 | 11/2005 | Wood |
| 2005/0261970 A1 | 11/2005 | Vucina et al. |
| 2005/0262418 A1 | 11/2005 | Gehrmann |
| 2005/0262542 A1 | 11/2005 | DeWeese et al. |
| 2005/0267787 A1 | 12/2005 | Rose et al. |
| 2005/0273819 A1 | 12/2005 | Knudson et al. |
| 2005/0273828 A1 | 12/2005 | Barton |
| 2005/0278741 A1 | 12/2005 | Robarts et al. |
| 2005/0278760 A1 | 12/2005 | Dewar et al. |
| 2005/0289588 A1 | 12/2005 | Kinnear |
| 2005/0289618 A1 | 12/2005 | Hardin |
| 2006/0010226 A1 | 1/2006 | Hurtta et al. |
| 2006/0013557 A1 | 1/2006 | Poslinski |
| 2006/0015502 A1 | 1/2006 | Szucs |
| 2006/0015580 A1 | 1/2006 | Gabriel et al. |
| 2006/0015637 A1 | 1/2006 | Chung |
| 2006/0015925 A1 | 1/2006 | Logan |
| 2006/0019702 A1 | 1/2006 | Anttila et al. |
| 2006/0020786 A1 | 1/2006 | Helms et al. |
| 2006/0021004 A1 | 1/2006 | Moran et al. |
| 2006/0021019 A1 | 1/2006 | Hinton et al. |
| 2006/0031558 A1 | 2/2006 | Ortega et al. |
| 2006/0031883 A1 | 2/2006 | Ellis et al. |
| 2006/0031892 A1 | 2/2006 | Cohen |
| 2006/0036750 A1 | 2/2006 | Ladd et al. |
| 2006/0041910 A1 | 2/2006 | Hatanaka et al. |
| 2006/0047603 A1 | 3/2006 | Fontijn |
| 2006/0047745 A1 | 3/2006 | Knowles et al. |
| 2006/0047801 A1 | 3/2006 | Haag et al. |

(56) References Cited

U.S. PATENT DOCUMENTS

| | | |
|---|---|---|
| 2006/0047957 A1 | 3/2006 | Helms et al. |
| 2006/0053473 A1 | 3/2006 | Vau et al. |
| 2006/0075230 A1 | 4/2006 | Baird, III |
| 2006/0080408 A1 | 4/2006 | Istvan et al. |
| 2006/0088063 A1 | 4/2006 | Hartung et al. |
| 2006/0089911 A1 | 4/2006 | Dandekar et al. |
| 2006/0095940 A1 | 5/2006 | Yearwood |
| 2006/0107302 A1 | 5/2006 | Zdepski |
| 2006/0116966 A1 | 6/2006 | Pedersen et al. |
| 2006/0117341 A1 | 6/2006 | Park |
| 2006/0117365 A1 | 6/2006 | Ueda et al. |
| 2006/0117366 A1 | 6/2006 | Fries |
| 2006/0123147 A1 | 6/2006 | Yasuhara |
| 2006/0130099 A1 | 6/2006 | Rooyen |
| 2006/0130107 A1 | 6/2006 | Gonder et al. |
| 2006/0130113 A1 | 6/2006 | Carlucci et al. |
| 2006/0130120 A1 | 6/2006 | Brandyberry et al. |
| 2006/0136964 A1 | 6/2006 | Diez et al. |
| 2006/0137015 A1 | 6/2006 | Fahrny et al. |
| 2006/0149850 A1 | 7/2006 | Bowman |
| 2006/0153017 A1 | 7/2006 | Kim |
| 2006/0159048 A1 | 7/2006 | Han et al. |
| 2006/0161635 A1 | 7/2006 | Lamkin et al. |
| 2006/0163340 A1 | 7/2006 | Leiper |
| 2006/0167808 A1 | 7/2006 | Greene et al. |
| 2006/0168219 A1 | 7/2006 | Ahluwalia et al. |
| 2006/0168616 A1 | 7/2006 | Candelore |
| 2006/0171390 A1 | 8/2006 | La |
| 2006/0171423 A1 | 8/2006 | Helms et al. |
| 2006/0173787 A1 | 8/2006 | Weber et al. |
| 2006/0173974 A1 | 8/2006 | Tang |
| 2006/0176884 A1 | 8/2006 | Fair et al. |
| 2006/0185004 A1 | 8/2006 | Song et al. |
| 2006/0187900 A1 | 8/2006 | Akbar |
| 2006/0190336 A1 | 8/2006 | Pisaris-Henderson et al. |
| 2006/0195553 A1 | 8/2006 | Nakamura |
| 2006/0200559 A1 | 9/2006 | Ling et al. |
| 2006/0200761 A1 | 9/2006 | Judd et al. |
| 2006/0200865 A1 | 9/2006 | Leake, Jr. et al. |
| 2006/0206565 A1 | 9/2006 | Ganesan et al. |
| 2006/0206712 A1 | 9/2006 | Dillaway et al. |
| 2006/0209799 A1 | 9/2006 | Gallagher et al. |
| 2006/0212400 A1 | 9/2006 | Kamperman et al. |
| 2006/0212435 A1 | 9/2006 | Williams et al. |
| 2006/0218604 A1 | 9/2006 | Riedl et al. |
| 2006/0222321 A1 | 10/2006 | Russ |
| 2006/0242267 A1 | 10/2006 | Grossman |
| 2006/0248209 A1 | 11/2006 | Chiu et al. |
| 2006/0248355 A1 | 11/2006 | Thayer |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253545 A1 | 11/2006 | Lakamp |
| 2006/0253584 A1 | 11/2006 | Dixon et al. |
| 2006/0253864 A1 | 11/2006 | Easty |
| 2006/0253894 A1 | 11/2006 | Bookman et al. |
| 2006/0256814 A1 | 11/2006 | Caci |
| 2006/0259924 A1 | 11/2006 | Boortz et al. |
| 2006/0259927 A1 | 11/2006 | Acharya et al. |
| 2006/0272032 A1* | 11/2006 | Jogand-Coulomb ... G06F 21/10 726/30 |
| 2006/0277569 A1 | 12/2006 | Smith |
| 2006/0277576 A1 | 12/2006 | Acharya et al. |
| 2006/0282319 A1 | 12/2006 | Maggio |
| 2006/0291506 A1 | 12/2006 | Cain |
| 2006/0291507 A1 | 12/2006 | Sarosi et al. |
| 2006/0293954 A1 | 12/2006 | Anderson et al. |
| 2006/0294259 A1 | 12/2006 | Matefi et al. |
| 2006/0294371 A1 | 12/2006 | Fanning |
| 2007/0011335 A1 | 1/2007 | Burns et al. |
| 2007/0019645 A1 | 1/2007 | Menon |
| 2007/0022032 A1 | 1/2007 | Anderson et al. |
| 2007/0022459 A1 | 1/2007 | Gaebel, Jr. et al. |
| 2007/0022469 A1 | 1/2007 | Cooper et al. |
| 2007/0033531 A1 | 2/2007 | Marsh |
| 2007/0038931 A1 | 2/2007 | Allaire et al. |
| 2007/0049245 A1 | 3/2007 | Lipman |
| 2007/0061331 A1 | 3/2007 | Ramer et al. |
| 2007/0061336 A1 | 3/2007 | Ramer et al. |
| 2007/0067851 A1 | 3/2007 | Fernando et al. |
| 2007/0076728 A1 | 4/2007 | Rieger et al. |
| 2007/0077921 A1 | 4/2007 | Hayashi et al. |
| 2007/0078714 A1 | 4/2007 | Ott et al. |
| 2007/0083899 A1 | 4/2007 | Compton et al. |
| 2007/0086372 A1 | 4/2007 | Lee et al. |
| 2007/0088801 A1 | 4/2007 | Levkovitz et al. |
| 2007/0088832 A1 | 4/2007 | Tsang et al. |
| 2007/0089127 A1 | 4/2007 | Flickinger et al. |
| 2007/0094691 A1 | 4/2007 | Gazdzinski |
| 2007/0101359 A1 | 5/2007 | Schiller et al. |
| 2007/0106814 A1 | 5/2007 | Son et al. |
| 2007/0107035 A1 | 5/2007 | Howe et al. |
| 2007/0112685 A1 | 5/2007 | Yamamichi |
| 2007/0113243 A1 | 5/2007 | Brey |
| 2007/0115389 A1 | 5/2007 | McCarthy et al. |
| 2007/0115922 A1 | 5/2007 | Schneider et al. |
| 2007/0118857 A1 | 5/2007 | Chen et al. |
| 2007/0121612 A1 | 5/2007 | Nadeau et al. |
| 2007/0121678 A1 | 5/2007 | Brooks et al. |
| 2007/0123253 A1 | 5/2007 | Simongini et al. |
| 2007/0124416 A1 | 5/2007 | Casey et al. |
| 2007/0124488 A1 | 5/2007 | Baum et al. |
| 2007/0124781 A1 | 5/2007 | Casey et al. |
| 2007/0129987 A1 | 6/2007 | Hauser et al. |
| 2007/0136743 A1 | 6/2007 | Hasek et al. |
| 2007/0136777 A1 | 6/2007 | Hasek et al. |
| 2007/0150919 A1 | 6/2007 | Morishita |
| 2007/0157249 A1 | 7/2007 | Cordray et al. |
| 2007/0157260 A1 | 7/2007 | Walker |
| 2007/0162958 A1 | 7/2007 | Kao et al. |
| 2007/0166687 A1 | 7/2007 | Bell et al. |
| 2007/0168429 A1 | 7/2007 | Apfel et al. |
| 2007/0171274 A1 | 7/2007 | Yim |
| 2007/0186103 A1 | 8/2007 | Randle et al. |
| 2007/0204300 A1 | 8/2007 | Markley et al. |
| 2007/0204310 A1 | 8/2007 | Hua et al. |
| 2007/0204311 A1 | 8/2007 | Hasek et al. |
| 2007/0204314 A1 | 8/2007 | Hasek et al. |
| 2007/0209054 A1 | 9/2007 | Cassanova |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0220158 A1 | 9/2007 | Tolgu et al. |
| 2007/0220573 A1 | 9/2007 | Chiussi et al. |
| 2007/0220605 A1 | 9/2007 | Chien |
| 2007/0233857 A1 | 10/2007 | Cheng et al. |
| 2007/0237330 A1 | 10/2007 | Srivastava |
| 2007/0244760 A1 | 10/2007 | Bodnar et al. |
| 2007/0247395 A1 | 10/2007 | Barraclough et al. |
| 2007/0250880 A1 | 10/2007 | Hainline |
| 2007/0261116 A1 | 11/2007 | Prafullchandra et al. |
| 2007/0265978 A1 | 11/2007 | Kahn et al. |
| 2007/0271388 A1 | 11/2007 | Bowra et al. |
| 2007/0276864 A1 | 11/2007 | Espelien |
| 2007/0276925 A1 | 11/2007 | La et al. |
| 2007/0276926 A1 | 11/2007 | LaJoie et al. |
| 2007/0279625 A1 | 12/2007 | Rzasa et al. |
| 2007/0280110 A1 | 12/2007 | Murphy et al. |
| 2007/0294178 A1 | 12/2007 | Pinder et al. |
| 2007/0294720 A1 | 12/2007 | Cohen et al. |
| 2008/0009268 A1 | 1/2008 | Ramer et al. |
| 2008/0040758 A1 | 2/2008 | Beetcher et al. |
| 2008/0052157 A1 | 2/2008 | Kadambi et al. |
| 2008/0059409 A1 | 3/2008 | Montpetit |
| 2008/0072249 A1 | 3/2008 | Hovnanian et al. |
| 2008/0090513 A1 | 4/2008 | Collins et al. |
| 2008/0098212 A1 | 4/2008 | Helms et al. |
| 2008/0098422 A1 | 4/2008 | Rodriguez et al. |
| 2008/0103977 A1 | 5/2008 | Khosravy et al. |
| 2008/0115161 A1 | 5/2008 | Kurzion |
| 2008/0115169 A1 | 5/2008 | Ellis et al. |
| 2008/0139193 A1 | 6/2008 | Hao et al. |
| 2008/0147497 A1 | 6/2008 | Tischer |
| 2008/0155589 A1 | 6/2008 | McKinnon et al. |

(56) References Cited

U.S. PATENT DOCUMENTS

| | | |
|---|---|---|
| 2008/0155600 A1 | 6/2008 | Klappert et al. |
| 2008/0155607 A1 | 6/2008 | Klappert |
| 2008/0155616 A1 | 6/2008 | Logan et al. |
| 2008/0162623 A1 | 7/2008 | Flynn |
| 2008/0163305 A1 | 7/2008 | Johnson et al. |
| 2008/0171423 A1 | 7/2008 | Ieong et al. |
| 2008/0192820 A1 | 8/2008 | Brooks et al. |
| 2008/0195871 A1 | 8/2008 | Peinado et al. |
| 2008/0196056 A1 | 8/2008 | Bassett et al. |
| 2008/0209464 A1 | 8/2008 | Wright-Riley |
| 2008/0221986 A1 | 9/2008 | Soicher et al. |
| 2008/0229354 A1 | 9/2008 | Morris et al. |
| 2008/0263578 A1 | 10/2008 | Bayer et al. |
| 2008/0271068 A1 | 10/2008 | Ou et al. |
| 2008/0273591 A1 | 11/2008 | Brooks et al. |
| 2008/0282299 A1 | 11/2008 | Koat et al. |
| 2008/0289009 A1 | 11/2008 | Lee et al. |
| 2008/0313671 A1 | 12/2008 | Batrouny et al. |
| 2008/0313691 A1 | 12/2008 | Cholas et al. |
| 2009/0019134 A1 | 1/2009 | Bellifemine et al. |
| 2009/0019492 A1 | 1/2009 | Grasset |
| 2009/0030802 A1 | 1/2009 | Plotnick et al. |
| 2009/0034521 A1 | 2/2009 | Kato |
| 2009/0094652 A1 | 4/2009 | Al et al. |
| 2009/0098861 A1 | 4/2009 | Kalliola et al. |
| 2009/0100459 A1 | 4/2009 | Riedl et al. |
| 2009/0132346 A1 | 5/2009 | Duggal et al. |
| 2009/0138922 A1 | 5/2009 | Thomas et al. |
| 2009/0187939 A1 | 7/2009 | LaJoie |
| 2009/0198794 A1 | 8/2009 | Beals |
| 2009/0210899 A1 | 8/2009 | Lawrence-Apfelbaum et al. |
| 2009/0235319 A1 | 9/2009 | Mao et al. |
| 2009/0248794 A1 | 10/2009 | Helms et al. |
| 2009/0249473 A1 | 10/2009 | Cohn |
| 2009/0282241 A1 | 11/2009 | Prafullchandra et al. |
| 2009/0317065 A1 | 12/2009 | Fyock et al. |
| 2009/0319379 A1 | 12/2009 | Joao |
| 2009/0320059 A1 | 12/2009 | Bolyukh |
| 2010/0042478 A1 | 2/2010 | Reisman |
| 2010/0083362 A1 | 4/2010 | Francisco et al. |
| 2010/0107194 A1 | 4/2010 | McKissick et al. |
| 2010/0146539 A1 | 6/2010 | Hicks, III et al. |
| 2010/0175584 A1 | 7/2010 | Kusaka et al. |
| 2010/0251304 A1 | 9/2010 | Donoghue et al. |
| 2010/0251305 A1 | 9/2010 | Kimble et al. |
| 2010/0251312 A1 | 9/2010 | Albano et al. |
| 2010/0287584 A1 | 11/2010 | Starikov et al. |
| 2010/0306369 A1 | 12/2010 | Riley |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0040755 A1 | 2/2011 | Hindle et al. |
| 2011/0041146 A1 | 2/2011 | Lewis |
| 2011/0055347 A1 | 3/2011 | Hu et al. |
| 2011/0099593 A1 | 4/2011 | Kim et al. |
| 2011/0103374 A1 | 5/2011 | LaJoie et al. |
| 2012/0005756 A1 | 1/2012 | Hoefelmeyer et al. |
| 2012/0011567 A1 | 1/2012 | Cronk et al. |
| 2012/0158547 A1 | 6/2012 | Wood et al. |
| 2012/0284765 A1 | 11/2012 | Killick et al. |
| 2012/0291140 A1 | 11/2012 | Robert |
| 2013/0036011 A1* | 2/2013 | Roberts .............. G06Q 30/0251 705/14.58 |
| 2013/0219458 A1 | 8/2013 | Ramanathan |
| 2013/0227608 A1 | 8/2013 | Evans et al. |
| 2013/0239134 A1 | 9/2013 | Britt et al. |
| 2013/0239135 A1 | 9/2013 | Parker et al. |
| 2014/0283137 A1 | 9/2014 | Rebaud et al. |
| 2015/0348129 A1 | 12/2015 | Inoue et al. |

FOREIGN PATENT DOCUMENTS

| | | |
|---|---|---|
| CA | 2438497 C | 11/2013 |
| EP | 1134951 A2 | 9/2001 |
| EP | 1691523 A1 | 8/2006 |
| JP | S5218653 A | 2/1977 |
| JP | S5218653 U | 2/1977 |
| JP | S5239237 A | 3/1977 |
| JP | H01226681 A | 9/1989 |
| JP | H03272977 A | 12/1991 |
| JP | H0517083 A | 1/1993 |
| JP | H0558564 A | 3/1993 |
| JP | H05201624 A | 8/1993 |
| JP | 2002335507 A | 11/2002 |
| JP | 2005519365 A | 6/2005 |
| JP | 2005519501 A | 6/2005 |
| JP | 2005339093 A | 12/2005 |
| KR | 20060009376 A | 1/2006 |
| WO | WO-9617306 A2 | 6/1996 |
| WO | WO-9929107 A2 | 6/1999 |
| WO | WO-9963759 A2 | 12/1999 |
| WO | WO-0018120 A1 | 3/2000 |
| WO | WO-0072592 A1 | 11/2000 |
| WO | WO-0110125 A1 | 2/2001 |
| WO | WO-0156285 A1 | 8/2001 |
| WO | WO-0160071 A2 | 8/2001 |
| WO | WO-2005015422 A1 | 2/2005 |

OTHER PUBLICATIONS

Almeroth, IEEE Journal on Selected Areas in Communications, The Use of Multicast Delivery to Provide a Scalable and Interactive Video-On-Demand Service, pp. 1110-1122, vol. 14: No. 6, 1996.

Bodzinga et al., "Enhancing the IPTV Service Architecture to Enable Service Innovation", International Engineering Consortium, May 1, 2006.

Butts, Tom, "Israeli Defense Technology Fuel's Vsoft's Software", pp. 1-2, http://www.vsoft.com/prints/israeli.sub.--defence.htm, Feb. 1, 1999.

Cantor, et al., Assertions and Protocols for the OASIS Security Assertion Markup Language (SAML) V2.0, OASIS Standard, Mar. 15, 2005. Document ID: saml-core-2.0-os (http://docs.oasis-open.org/security/saml/v2.0/saml-core-2.0-os.pdf).

Cantor, et al., Bindings for the OASIS Security Assertion Markup Language (SAML) V2.0, OASIS Standard, Mar. 2005, Document ID saml-bindings-2.0-os ,(http://docs.oasis-open.org/security/saml/v2.0/saml-bindings-2.0-os.pdf).

Carnoy, David, "Anthony Wood and Mike Ramsey at War," Success, Mar. 1999, pp. 52-57.

Congdon et al., "IEEE 802.1 X Remote Authentication Dial in User Service (RADIUS) Usage Guidelines", RFC 3580, 2003.

Furchgott, Roy, "Don't People Want to Control Their TV's?" The New York Times, Aug. 24, 2000, p. GI.

Hamilton, David P., "Driving Force", The Wall Street Journal, Jun. 26, 2000, p. R12.

Jacobs, Karen (Dec. 7, 1999) "Elevator Maker to Add Commercial Touch," The Wall Street Journal, pp. 1-2.

Kahaner, (Mar. 16, 1991) "Hitachi 1991 Technology Exhibition, Tokyo," Asian Technology Information Program, pp. 1-14.

Lewis M., "Boom Box", The New York Times Magazine, Aug. 13, 2000, p. 36.

Lipschitz Sugarman, Margo "A Picture of the Future" pp. 1-2, http://vvww.vsoft.com/prints/picture.sub.-- of.sub.--the.sub.--future.htm, Dec. 20, 1999.

Maxwell, Kim, Residential Broadband: An Insider's Guide to the Battle for the Last Mile, 1999, pp. 43-46, 308-312, John Wiley & Sons, Inc., New York.

McDevitt et al., "Switched vs Broadcast Video for Fiber-To-The Home Systems", 1990.

Merriam Webster, "subscribe", 2015.

Metadata Specifications, CableLabs Asset Distribution Interface Specification, Version 1.1 MD-SP-ADI 1-104-060505, May 5, 2006.

Motorola Next-Generation CMTS Architecture Protecting Network Investments While Migrating to Next-Generation CMTS Platforms, 2004 Motorola, Inc.

Parsons, Patrick R., et al., The Cable and Satellite Televison Industries, 1998, pp. 162-163, 170-172, Allyn and Bacon, Boston.

(56) References Cited

OTHER PUBLICATIONS

Perdue, Lewis (Jul. 20, 1999) "Forget Elevator Music Here Comes Elevator Internet," Internet VC Watch, pp. 1-2.
"Powerkey" family (Powerkey Book 2, Powerkey Book 3, etc.) NDS (including VideoGuard, mVideoGuard, etc.). ANSI/SCTE Standard 52 2003 (DVS-042).
Stevens Institute of Technology, Spring 1999 Final Report, pp. 1-12. Videodick 2.0 is Now Available on Sun Servers, p. 1, http://www.vsoft.com/press1999d.htm, Apr. 19, 1999.
Vsoft Launches Videoclick .COPYRGT. Home at IBC 2000, pp. 1-2, http:/www.vsoft.com/press2000o.htm, Sep. 8, 2000.
Vsoft to Implement Its Advanced Videoclick Interactive TV Software on Power TV Based Digital Cable Set-Top Boxes, pp. 1-2, http://www.vsoft.com/press1999m.htm, Dec. 13, 1999.
Vsoft to Present First Set-Top Box Implementation of Its Digital Video Software Platform, Targeted to Service Providers of Digital Video Services for Home Video, p. 1, http://www.vsoft.com/press1999j.htm, Sep. 8, 1999.
Wikipedia, "Content delivery network", 2015.
Wikipedia, "Hybrid fibre-coaxial", 2015.
Wikipedia, "Packet switching", 2015.
Wikipedia, "switched", 2015.
Yoneda, et al. (Dec. 1997) "Multi-Objective Elevator Supervisory—Control System with Individual Floor—Situation Control," Hitachi Review, p. 1.
David P.A., "The Beginnings and Prospective Ending of 'End-to-End': An Evolutionary Perspective on the Internet's Architecture," Stanford Institute for Economic Policy Research, Aug. 2001, 34 pages.
Ford B., "Unmanaged Internet Protocol: Scalable Application-Friendly Internet Routing," Jul. 24, 2003, 6 pages.
Ford B., "Unmanaged Internet Protocol: Taming the Edge Network Management Crisis," ACM SIGCOMM Computer Communications Review, vol. 34 (1), Jan. 2004, pp. 93-98.
Marusic, et al., "Share it!—Content Transfer in Home-to-Home Networks." IEEE MELECON 2004, May 12-15, 2004, Dubrovnik, Croatia.
Sadok D.H., et al., "Trends in Network and Device Composition," Topics in Internet Technology, IEEE Communications Magazine, Oct. 2006, pp. 112-118.
Merriam-Webster, "apparatus", 2019 (Year: 2019).

\* cited by examiner ods", U.S. patent application Ser. No. 11/080,693
PERSONAL CONTENT SERVER APPARATUS AND METHODS

PRIORITY AND RELATED APPLICATIONS

This application is a continuation of and claims priority to co-owned and co-pending U.S. patent application Ser. No. 15/137,923 of the same title filed on Apr. 25, 2016, issuing as U.S. Pat. No. 9,832,246 on Nov. 28, 2017, which is a continuation of and claims priority to co-owned U.S. patent application Ser. No. 13/888,224 of the same title filed on May 6, 2013, issued as U.S. Pat. No. 9,325,710 on Apr. 26, 2016, which is a divisional of and claims priority to co-owned U.S. patent application Ser. No. 12/717,089 of the same title filed on Mar. 3, 2010, issued as U.S. Pat. No. 8,438,243 on May 7, 2013, which is a continuation of and claims priority to U.S. patent application Ser. No. 11/440,490 filed on May 24, 2006 of the same title now issued as U.S. Pat. No. 8,280,982 on Oct. 2, 2012, each of the foregoing incorporated herein by reference in its entirety.

This application is related to commonly owned U.S. patent application Ser. No. 11/441,476 filed on May 24, 2006 and entitled "Secondary Content Insertion Apparatus And Methods", U.S. patent application Ser. No. 11/080,693 filed Mar. 14, 2005 entitled "Method And Apparatus For Network Content Downloading and Recording", now issued as U.S. Pat. No. 8,028,322 on Sep. 27, 2011, U.S. patent application Ser. No. 10/182,307 filed Jul. 26, 2002 entitled "System And Method For Providing Broadcast Programming, A Virtual VCR, And A Video Scrapbook To Programming Subscribers", now issued as U.S. Pat. No. 8,584,182 on Nov. 12, 2013, and U.S. patent application Ser. No. 10/626,051 filed Jul. 24, 2003 and entitled "Technique for Providing a Virtual Digital Video Recorder Service Through a Communications Network", now issued as U.S. Pat. No. 7,457,520 on Nov. 25, 2008, each of the foregoing incorporated herein by reference in its entirety.

BACKGROUND OF THE INVENTION

1. Field of the Invention

The invention relates to the fields of content storage and delivery over one or more networks such as for example cable television networks and other networks (e.g., Internet).

2. Description of Related Technology

Recent advances in video capture and data storage technologies have led to the proliferation of consumer electronics devices that allow a user to record video programming or other content received from a bearer network (such as a cable television or satellite network) on a digital video recorder (DVR) or personal video recorder (PVR), and contemporaneously or subsequently access the content. Additionally, such DVR/PVR devices can also be used to transmit the stored content over a network interface to another device (which may or may not be remote from the DVR/PVR) where the same or another user can access the content.

However, such distribution of the content to a second device or location generally makes inefficient use of the available network bandwidth. For example, when the bearer network is cable television network, and the network interface comprises an internetworking (e.g., Internet) connection realized via a cable or other type of modem, the delivery of the content requires effectively twice the bandwidth it would otherwise require; i.e., first in the downstream direction to receive the content, and second in the upstream direction to transmit the program to the desired destination via the upstream channels (e.g., QAMs) associated with the DOCSIS or other modem architecture in use.

Exemplary prior art in this area includes the "Slingbox™" device manufactured by Sling Media of San Mateo, Calif. This device is capable of enabling a user to, inter alia, watch TV programming from various locations via an Internet-connected PC or similar device. The device utilizes an analog television (RF) tuner; when the user tunes to a given channel, the Slingbox encodes the video input received via the downstream delivery channels (e.g., QAMs or otherwise) in Windows Media or similar format. The encoded content is then streamed to a client application disposed on a Windows XP-based or similar PC via an IP network such as the Internet. Hence, the user can view the data locally (i.e., at the same premises) or remotely so long as they have access to the IP distribution network.

The Slingbox approach (and those similar thereto) suffers from several disadvantages. Specifically, in the case where the programming delivered to the premises is in digital format, the conversion of this digital program to analog format, and back again to digital, results in some degradation in media quality. Also, metadata such as closed captioning, teletext, etc. associated with a digital program is generally lost when converted to and back from the analog format.

Additionally, since the upstream bandwidth from a premises at which the Slingbox or similar device is installed is typically shared by multiple devices, other applications desiring to transmit data upstream may have to compete with the upstream transmission for the remote viewing session, thereby potentially leading to contention and reduced data rates for each user (especially if the Slingbox transmission enforces a minimum required upstream bandwidth for QoS or other considerations).

Similarly, because such use of remote viewing is constrained by the upstream bandwidth of a user's premises to the Internet, viewing high-quality, high-resolution programming such as high definition (HD) programming may be limited or even not available.

Furthermore, once a user makes the investment in a storage and streaming device such as the Slingbox, he/she is largely "locked into" the technology, and accordingly may have difficulty retrofitting the device with enhancements such as new developments in encoding technologies (e.g., new compression formats, new pre-processing techniques, etc.) for generating video for transmission to the remote location.

Aside from the upstream bandwidth requirements, retransmission of content actually present on a premises recording device has several additional disabilities, including the need to maintain the recording or storage device powered up at all times when an upstream transmission may be required, as well as the finite storage volume limitations of the device which can effectively limit the user's selection for content.

Moreover, the viewer must incur added expenses to establish a connection between his television network and the IP network (e.g., must obtain a cable modem and Internet service in addition to the MSO content delivery service). This connection must also have sufficient bandwidth to accommodate "slinging" of the desired content.

Using the aforementioned prior art approaches, content owners also generally cannot protect their copyright and distribution rights, since the Slingbox or comparable device is generally agnostic to the content it is "slinging", as well as the location or address to which the content is being delivered. Hence, copyrighted content can be intentionally or unintentionally directed to remote domains or environments which may or may not have copyright protection or digital rights management (DRM) capability. In a particularly troublesome case, the remote device to which the content is transmitted may comprise a peer in a peer-to-peer (P2P) file-sharing network environment (such as Kazaa, Morpheus, etc.), thereby facilitating broad distribution of the copyrighted content over the P2P network, e.g., the Internet.

Content owners may further be concerned with the reproduction of copies of their content within the network for distribution purposes. For example, a network operator may have restrictions on replicating and/or distributing content received from the content source. Certain activities are generally recognized as not being in violation of a content owner's copyright. For example, so called "time shifting" (i.e., recording or storing the content for later viewing), and "space shifting" (i.e., moving content from one device or medium to another) of content owned by a purchaser in certain circumstances are recognized by U.S. courts as not violating copyrights. However, the application of such rules is typically quite fact-specific, and hence each situation must be individually analyzed. In short, the content source or copyright owner must have assurances that the network operator (e.g., MSO) which is entrusted with their valuable content will process and distribute this content within the limitations of the law, and not expose the content to undue risk of unauthorized reproduction or distribution.

Based on the foregoing, there is a need for improved apparatus and methods for enabling secondary (e.g., remote) access of content such as television programs without repetitious or inefficient use of network bandwidth. Such apparatus and methods would, in addition to efficiently and flexibly delivering content to one or more remote locations, also ideally protect the content by enforcing authentication and/or rights protection rules.

Additionally, when the network delivers programs in digital format, such apparatus and methods would preferably be able to preserve the high visual quality.

These features would also be provided using substantially extant network infrastructure and components, and would be compatible with a number of different client device and delivery systems including both wired and wireless technologies.

SUMMARY OF THE INVENTION

The present invention satisfies the foregoing needs by providing improved apparatus and methods for the delivery of content over a network to one or more remote nodes.

In a first aspect of the invention, an improved personal content distribution system is disclosed. In one embodiment, the system comprises: a first network for distribution of content to a first device at a first location; a personal content server operatively communicating with the first network; and a second network in data communication with the content server and adapted to receive a request to access particular content from a second device at a second location. The personal content server is operative to: identify the existence of a logical relationship between at least one of: (i) the first device and the second device; and (ii) the first location and the second location; and based at least in part on the identification, providing access to the particular content to the second device. In one variant, the logical relationship comprises the first device and the second device being disposed at a common premises, the first and second locations being substantially within the premises.

In another variant, the first network comprises a content-based cable or satellite network having a plurality of subscribers, and the logical relationship comprises the first device and the second device being associated with at least a common one of the plurality of subscribers. The association of the first and second devices with the at least one common subscriber is identified by the server by accessing a subscriber database having data relating uniquely to the first and second devices.

In yet another variant, the logical relationship comprises the first device having the particular content disposed thereon in either substantially permanent or ephemeral storage.

In still another variant, the first network comprises a cable or satellite content-based network, and the second network comprises a cellular network adapted to distribute content to a plurality of mobile users, the second device comprising a mobile device. The logical relationship comprises the first device and the second device being associated with a common user that is subscribed to receive first service over the cable or satellite network, and second service over the cellular network.

In a second aspect of the invention, a method of delivering copyrighted content over a network is disclosed. In one embodiment, the method comprises: receiving a user-originated request via a first network from a first device for copying of copyrighted content; copying the copyrighted content, based at least in part on the request, to produce a local copy of the copyrighted content; receiving a request for delivery of the copyrighted content over a second network to a second device; and causing delivery of the content to the second device using the local copy of the content.

In one variant, the first network comprises a cable television network, the first device comprises a subscriber premises device, and the second network comprises a packet-switched network connected to the cable network via at least one gateway device. The method also further comprises authenticating the user or device issuing the request for delivery over the second network against a subscriber database maintained within the cable network.

In another variant, the act of copying further comprises recoding the content into an encoded format different than that of the content before copying.

In a third aspect of the invention, a method of delivering content over a network is disclosed. In one embodiment, the method comprises: receiving a request for access to content via a first network from a first device; determining whether the content has previously been or is contemporaneously being delivered over a second network to a second device; and where the act of determining indicates that the content has been or is being delivered over the second network, causing the content to be delivered to the first device.

In one variant, the first device and the second device are associated with a common user, yet disposed at substantially remote locations. In another variant, the first device and the second device are disposed at a substantially common location.

In still another variant, the content is delivered to the first device via a third network that is substantially independent of the first network.

In yet another variant, the first network comprises the Internet, and the second network comprises a cable television network, and the act of causing comprises causing the content to be streamed over the Internet to the first device from a storage location also used for the delivery of the content over the cable television network. Delivery of the content over the cable television network comprises streaming the content using a video-on-demand (VOD) session.

In another embodiment, the method comprises: receiving a request for access to content via a first network from a first device; determining the state of a tuner associated with a second device coupled to a content delivery network; and based at least in part on the state, causing the content to be delivered to the first device. In one variant, the act of determining the state comprises determining the channel the tuner is presently tuned to. In another variant, the act of determining the state comprises determining a variable uniquely identifying the tuner, such as TUNER ID, TUNER USE, and MAC address.

In another variant, the content delivery network comprises a cable television network having a broadcast switched architecture (BSA) and a plurality of hub sites, and at least the act of determining is performed by a software process running on a server disposed at the one of the hub site.

In yet another embodiment, the method comprises: providing first content at a first node of the network; distributing the first content from the first node to a first trusted domain in response to an authenticated request for delivery originated from the trusted domain; receiving a request for delivery for the first content from a second node, the second node not being part of the cable television network; causing a second trusted domain to be established within the second node; and when the second domain has been established, delivering the first content to the second node from the first node.

In a fourth aspect of the invention, a client device architecture adapted for delivery of content over a network is disclosed. In one embodiment, the architecture comprises: a server disposed substantially within a content-based network and adapted to serve content requests from client devices; a content source in data communication with the server for providing content thereto; and a management process in operative communication with the server, the management process being adapted to evaluate content access requests from one or more client devices associated with a remote network in data communication with the content-based network. The evaluation of the content requests comprises: at least identifying prior or contemporaneous subscriber selections of the content made via the content-based network; and based at least in part on the identifying, selectively serving the content access requests from the client devices in order to deliver the content thereto.

In a fifth aspect of the invention, a method of operating a content delivery network is disclosed. In one embodiment, the method comprises: providing a user with a plurality of copyrighted content choices; receiving at least one content selection from the user, the at least one selection relating to first copyrighted content; providing the first content to a first device in data communication with a network; receiving a request from a second device in data communication with the network for access to the first content; determining if the first and the second devices are associated with a common user; and if associated with a common user, permitting delivery of the first content to the second device.

In one variant, the act of determining if the devices are associated comprises determining if the first and second devices are part of a common subscription account within a subscriber database maintained by an operator of the network.

In another variant, the act of providing comprises delivering the first content via broadcast delivery to the first device; and the act of permitting delivery comprises causing delivery of the first content from a content source substantially external to the network, the content source comprising or being licensed by the copyright holder for the first content.

In a sixth aspect of the invention, a method optimizing bandwidth usage within a cable television network is disclosed. In one embodiment, the method comprises: providing first content at a first node of the network; distributing the first content from the first node to a second node in response to a request for delivery originated from the second node; receiving a request for delivery for the first content from a third node, the third node not being part of the cable television network; and causing, when at least one criteria is met, delivery of the first content to the third node from the first node without having to transmit the first content from the second node to the third node.

In one variant, the first node comprises the head-end of the cable network, the second node comprises a subscriber premises, and the third node comprises a location remote from the premises and the head-end, yet in data communication with the head-end.

In another variant, the act of distributing comprises broadcasting the first content over a broadcast switched architecture (BSA) network; and the first node comprises a hub site thereof. Delivery comprises streaming packetized data from the hub site to the third node via an internetwork interface, and the at least one criteria comprises whether a tuner of the second device is tuned to a channel over which the first content is being broadcast.

In a seventh aspect of the invention, server apparatus adapted for use in a content-based network is disclosed. In one embodiment, the apparatus comprises: a storage device; a processor in data communication with the storage device and adapted to run at least one computer program thereon, at least a portion of the at least one program being stored in the storage device; a first network interface in data communication with the content-based network; a second network interface in data communication with a remote network; and a data interface in data communication with a content source. The computer program is adapted to: receive a request for access to content from a remote client device in data communication with the remote network via the second network interface; evaluate the request against data relating to a subscriber's operating history or status; and based at least in part on the evaluation, determine whether or not to grant the requested access to the content to the remote client device.

In one variant, the content-based network comprises a cable television network, and the at least one computer program is further adapted to cause a session to be created between the apparatus and the remote client device substantially over the second network, the session delivering the requested content. In another variant, the computer program is further adapted to cause a session to be created between a proxy of the apparatus and the remote client device. The proxy may be disposed substantially outside of the content-based network, yet in data communication with the second network.

In an eighth aspect of the invention, a method of remotely distributing high-bandwidth content over both a primary network and secondary network in data communication therewith is disclosed. In one embodiment, the method comprises: providing the content over the primary network to at least one of a plurality of subscribers; receiving a request from a remote device coupled to the secondary network for access to the high-bandwidth content; and delivering the high-bandwidth content to the secondary network from a location within the primary network that can support such delivery. The high-bandwidth content comprises e.g., high-definition (HD) programming, and the location within the primary network comprises a content server disposed at the head-end of a cable television network.

In a ninth aspect of the invention, a method of associating a user with one or more content choices over a network while maintaining the privacy thereof is disclosed. In one embodiment, the method comprises: generating a first variable from first data using a first cryptographic algorithm, the first variable being useful for associating a user with a device; generating a second variable from second data using a second cryptographic algorithm, the second variable being useful for associating a user with a content choice; and relating the first and second variables so as to permit relation of the first data and the second data. In one variant, the first and second cryptographic algorithms comprise cryptographic hashes that substantially prevent determining the first and second data from the first and second variables, respectively. The first and second cryptographic algorithms, variables, and the relating of the variables substantially prevent determination of the relation between the first data and the second data if any of: (i) the first variable, (ii) second variable, and (iii) the relation of the first and second variables, are not known.

In a tenth aspect of the invention, network apparatus adapted for use in a content based network is disclosed. In one embodiment, the apparatus is particularly adapted for use in a hub site of a switched broadcast network, and comprises: at least one QAM modulator device configured to produce at least one QAM for carrying content; switch apparatus adapted to cause delivery of selected ones of a plurality of broadcast content streams to ones of a plurality of network clients via the at least one modulator device and the at least one QAM; an interface to a second network, the interface being adapted to carry packetized data; and a management process in operative communication with the server apparatus, the management process being able to selectively receive a request for, and cause delivery of, one or more of the broadcast content streams in the form of packetized data to a remote client device via the interface and the second network. Delivery of the one or more content streams to the remote client device is determined at least in part by the state of the switch apparatus; e.g., whether the switch apparatus is selected to deliver the requested one or more broadcast streams to a network client associated with the remote client device.

DETAILED DESCRIPTION OF THE INVENTION

Figure 1:
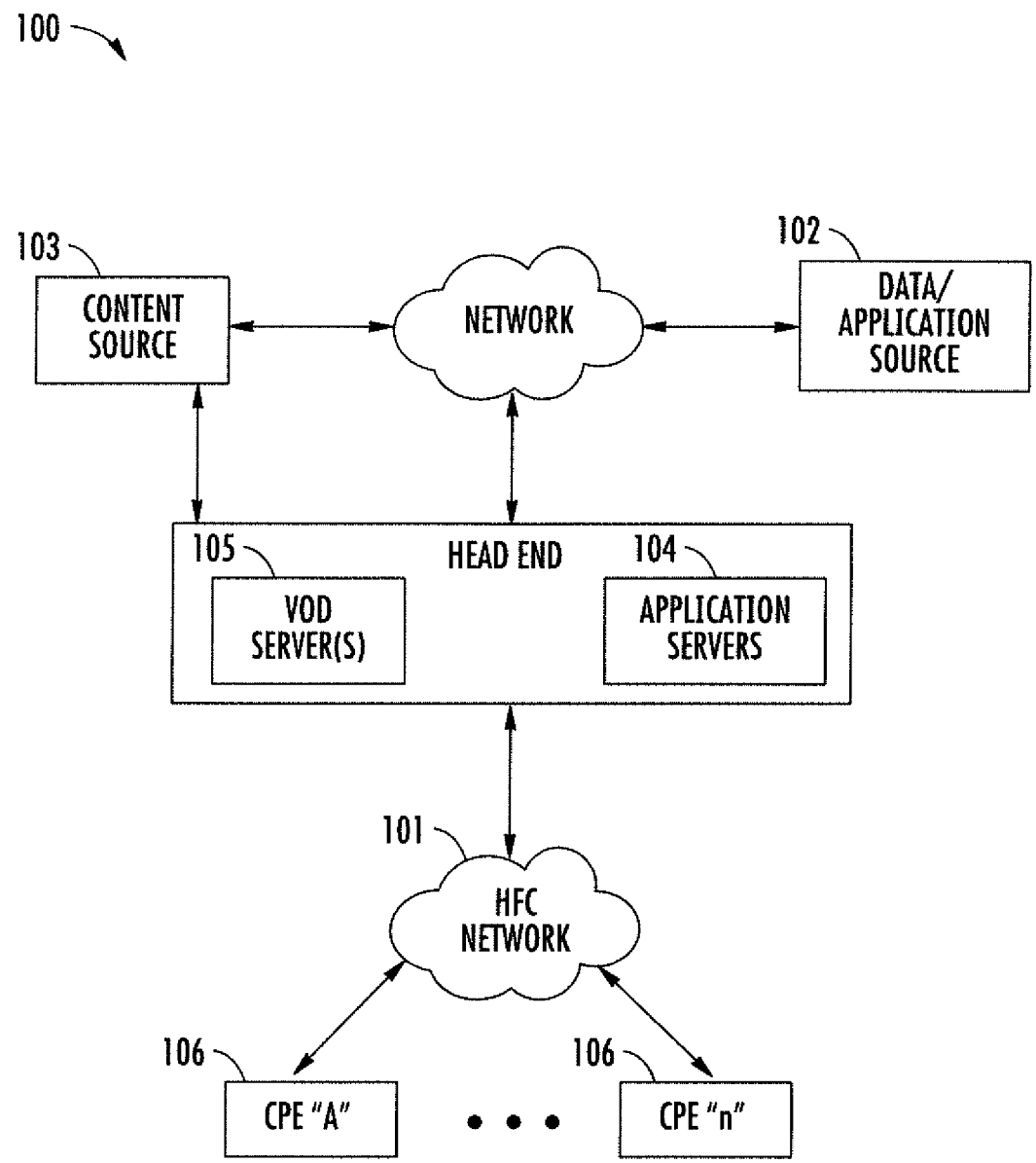
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein the term "browser" refers to any computer program, application or module which provides network access capability including, without limitation, Internet browsers adapted for accessing one or more websites or URLs over the Internet, as well as any "user agent" including those adapted for visual, aural, or tactile communications.

As used herein, the terms "client device" and "end user device" include, but are not limited to, set-top boxes (e.g., DSTBs), digital television sets, personal computers (PCs), and minicomputers, whether desktop, laptop, or otherwise, and mobile devices such as handheld computers, PDAs, personal media devices (PMDs), such as for example an iPod™ or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AVC/H.264, AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "conditional access" refers to any access control scheme, whether implemented in hardware, software, or firmware (or combinations thereof), including without limitation members of the "Powerkey" family (Powerkey Book 2, Powerkey Book 3, etc.), NDS (including VideoGuard, mVideoGuard, etc.), ANSI/SCTE Standard 52 2003 (DVS-042), incorporated herein by reference in its entirety, and Motorola/General Instrument DigiCipher® family (DigiCipher II, etc.). These can be implemented using, for example, the so-called "CableCard" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment or function whereby content sent over a network can be recorded and selectively recalled, including without limitation so-called "personal video recording" (PVR) functions or devices. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "head-end" refers generally to a networked system controlled by an operator (e.g., an MSO) that distributes programming to MSO clientele using client devices. Such programming may include any information source/receiver including, inter alia, free-to-air TV channels, pay TV channels, interactive TV, and the Internet. DSTBs may take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the term "integrated circuit (IC)" refers to any type of device having any level of integration (including without limitation VLSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the terms "local" and "remote" refer generally to devices, entities, or users that are serviced by substantially different communications channels. These terms are intended to be relative, and bear no physical or absolute reference or connotation as to the placement of the communication channels or the served device, entities or users. For example, a "local" network may comprise the MSO cable or satellite network, whereas a "remote" network may comprise the Internet or a LAN/WAN/MAN, the latter which may serve the very same premises.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "modem" refers to any kind of modulation or demodulation process or apparatus including without limitation cable (e.g., DOCSIS compliant) modems, DSL modems, analog modems, and so forth.

As used herein, the terms "MSO" or "multiple system operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, TCP/IP, H.323, etc.).

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), modem, WiFi (802.11a,b,g,n), WiMAX (802.16), PAN (802.15), or IrDA families.

As used herein, the term "purchase" shall mean without limitation any sale, agreement for sale, transfer of funds, promise to transfer funds, barter arrangement, promotional or incentive agreement or arrangement, virtual ownership, subscription, or other relationship wherein consideration of any kind is exchanged between two or more parties (or their proxies).

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to said schemes.

As used herein, the term "recording medium" refers to any material, component, collection of components or device adapted to store information in a substantially permanent or semi-permanent state. Exemplars of recording media include, without limitation, magnetic media, integrated circuits (e.g., RAM or ROM), optical media, chemical media, and atomic- and subatomic-level storage structures (e.g., crystalline structures, quantum or spin states, etc.).

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity. A user interface may comprise, for example, a computer screen display, touch screen, speech recognition engine, text-to-speech (TTS) algorithm, and so forth.

As used herein, the term "Wi-Fi" refers to, without limitation, any of the variants of IEEE-Std. 802.11 or related standards including 802.11 a/b/g/n.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention provides, inter alia, improved apparatus and methods for allowing access to content (e.g., program viewing) delivered over a content-based network via other networks or communication channels outside of the content-based network. For example, in the context of a cable television network, programming or other content delivered to a subscriber over the cable network can be accessed via other (secondary) networks such as the Internet, LANs/WANs/MANs, a wireless service provider (WSP) network, cellular service provider (CSP) network, or even a satellite network.

In one embodiment, the invention comprises a personal content server located, e.g., at the head-end of the bearer (cable) network; this server distributes content to the remote requesting location(s), thereby eliminating repetitious traffic to and from subscriber's premises to fulfill the requests for remote content delivery.

In one variant, information relating to the requesting subscriber's prior activity for the requested content is used as a basis for authorizing delivery of the remote content. For example, the remote content manager may determine whether the requested program was previously stored on the subscriber's DVR attached to the local (cable) network. This information is gathered by either querying the DVR or by querying a process at the head-end for the program titles stored on the DVR.

In another variant of the invention, when the subscriber wishing to access content (e.g., watch a program) from a location outside the bearer network does not have a DVR on his premises, the personal media management server communicates with either a "network DVR" or a "virtual DVR" maintained for the subscriber at the head-end or other location outside of the subscriber premises in order to determine remote access privileges.

In yet another variant, activity or status of the tuner(s) within the local premises device is used as the basis for controlling or determining delivery of the requested content to the remote location; e.g., the remote user can watch that channel to which the premises tuner is currently tuned.

The requested content advantageously may comprise video, audio, gaming content, software applications, stored data, or any other form of data which can be delivered over a network. On-demand content delivery (including trick mode and similar functions) is also optionally supported through the establishment of a session between the remote client device and a VOD server within the cable head-end and control using extant session and stream control protocols (e.g., LSCP).

Broadcast or "live" content can also be accessed via the secondary network approach of the present invention. For example, one variant allows the broadcast streams to be switched via the head-end to the remote node via the secondary network (e.g., Internet, WAN, CSP network, etc.). Another variant of the invention places the content server function at a hub site of a broadcast switched architecture (BSA), thereby allowing for a close coupling between the hub switch state and the remote delivery for individual subscribers.

The improved methods and apparatus of the invention are readily implemented using substantially existing infrastructure, thereby obviating significant modifications or expense in implementing such capability. These methods and apparatus also provide other significant benefits including: (i) reduced cost of ownership for the user (i.e., instead of having to buy a separate external box, a consumer can simply subscribe to the service); (ii) ready upgrade of the subscriber's software (e.g., codecs, conditional access technology, and so forth) by avoiding a separate third party hardware environment within the subscriber's premises; (iii) eliminating upstream bandwidth contention between local premises communications or streams and the remote delivery stream (content is delivered from the head-end or a node upstream of the premises, so no contention occurs); (iv) capability to remotely control and configure premises devices from the remote client device; (v) capability to monitor activity on the premises device remotely, and (vi) avoiding content quality degradation due to digital-to-analog-to-digital conversion processes.

In another aspect of the invention, security features and content protection can be preserved when delivering content remotely through a series of measures including content encryption, authentication, and even establishment of a trusted or authorized domain within the remote client device or network.

Methods and apparatus for dynamic secondary content insertion (e.g., replacement of dated or geographically inappropriate advertisements or promotions) are also described, as well as techniques for maintaining user/content anonymity (privacy) across the various delivery paths.

An operational and business rules "engine" useful in implementing various operational or business goals is also disclosed.

Detailed Description of Exemplary Embodiments

Exemplary embodiments of the apparatus and methods of the present invention are now described in detail. While these exemplary embodiments are described in the context of the aforementioned hybrid fiber coax (HFC) cable architecture used in conjunction with a "secondary" communication channel or network, the general principles and advantages of the invention may be extended to other types of networks and architectures where secondary delivery of content is required or desirable, whether broadband, narrowband, wired or wireless, content or data, or otherwise, and irrespective of topology. Hence, the following description is merely exemplary in nature.

It will also be appreciated that while described generally in the context of a network providing service to a consumer (i.e., home) end user domain, the present invention may be readily adapted to other types of environments including, e.g., commercial/enterprise, and government/military applications. Myriad other applications are possible.

It is further noted that while aspects of the invention are described primarily in the context of 6 MHz RF channels within the HFC network, the present invention is applicable to any frequency/bandwidth, such as for example 8 MHz channels.

Moreover, while generally described in terms of content delivery over discrete QAMs or channels, relevant portions of the invention can be used in conjunction with multiplexing algorithm and wideband tuner apparatus such as that described in co-owned U.S. patent application Ser. No. 11/013,671 filed Dec. 15, 2004, entitled "Method And Apparatus For Wideband Distribution Of Content", and issued as U.S. Pat. No. 9,723,267 on Aug. 1, 2017, incorporated herein by reference in its entirety.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

FIG. 1 illustrates a typical generalized content-based network configuration with which the personal media delivery apparatus and methods of the present invention may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

Furthermore, as discussed in greater detail subsequently herein, the generalized network of FIG. 1 also includes one or more interfaces to other (e.g., external) networks that can be used for the "personalized" delivery of content.

The data/application origination point 102 comprises any medium that allows data and/or applications (such as a VOD-based application, gaming application, or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the servers 104, 105) that can be accessed by a distribution server 104 or VOD server 105. Exemplary embodiments of a "converged" CPE (i.e., CD) of the invention are also described subsequently herein.

Figure 1A:
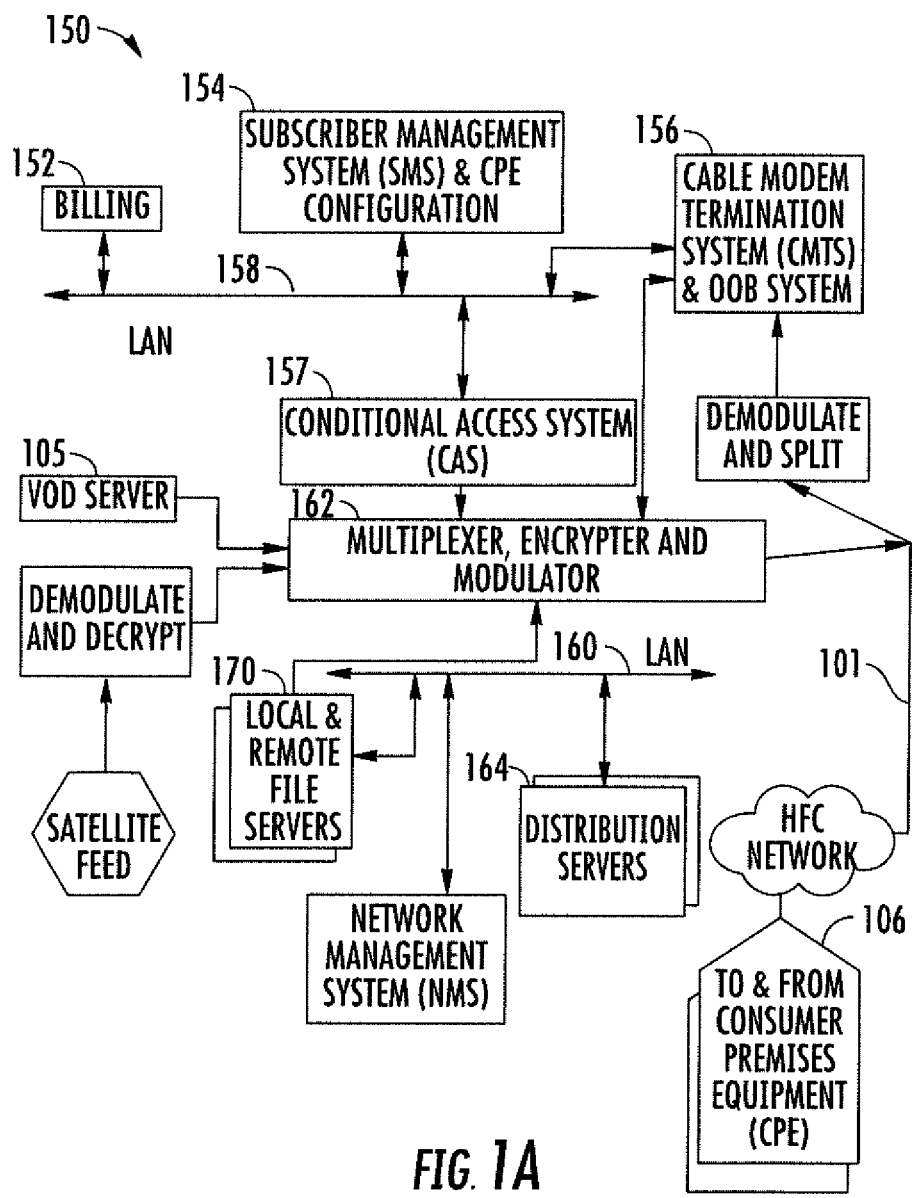
FIG. 1*a* is a functional block diagram illustrating one exemplary HFC cable network head-end configuration useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1b) via a variety of interposed network components.

Content (e.g., audio, video, data, applications, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
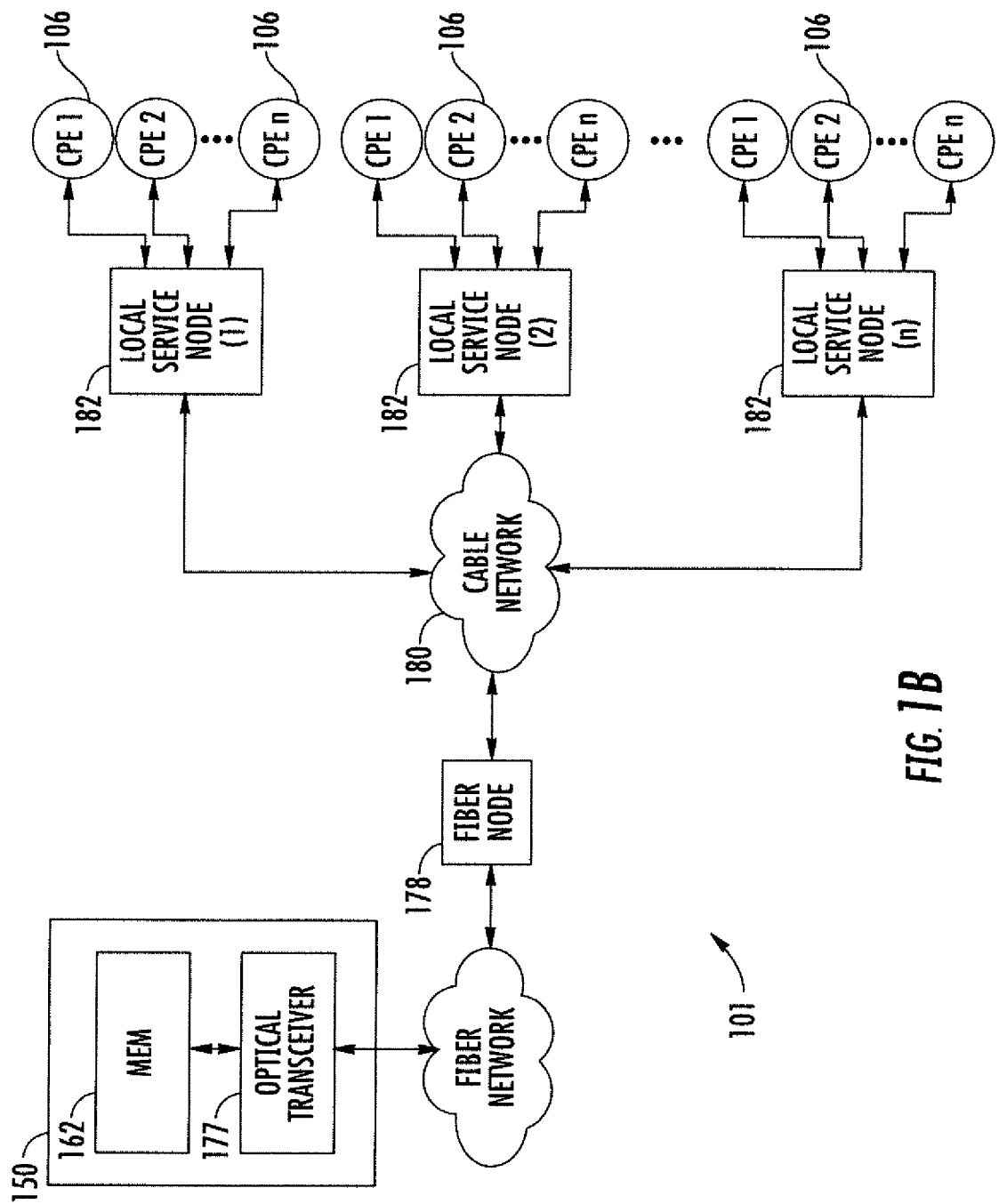
FIG. 1*b* is a functional block diagram illustrating one exemplary local service node configuration useful with the present invention.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks—

Figure 1C:
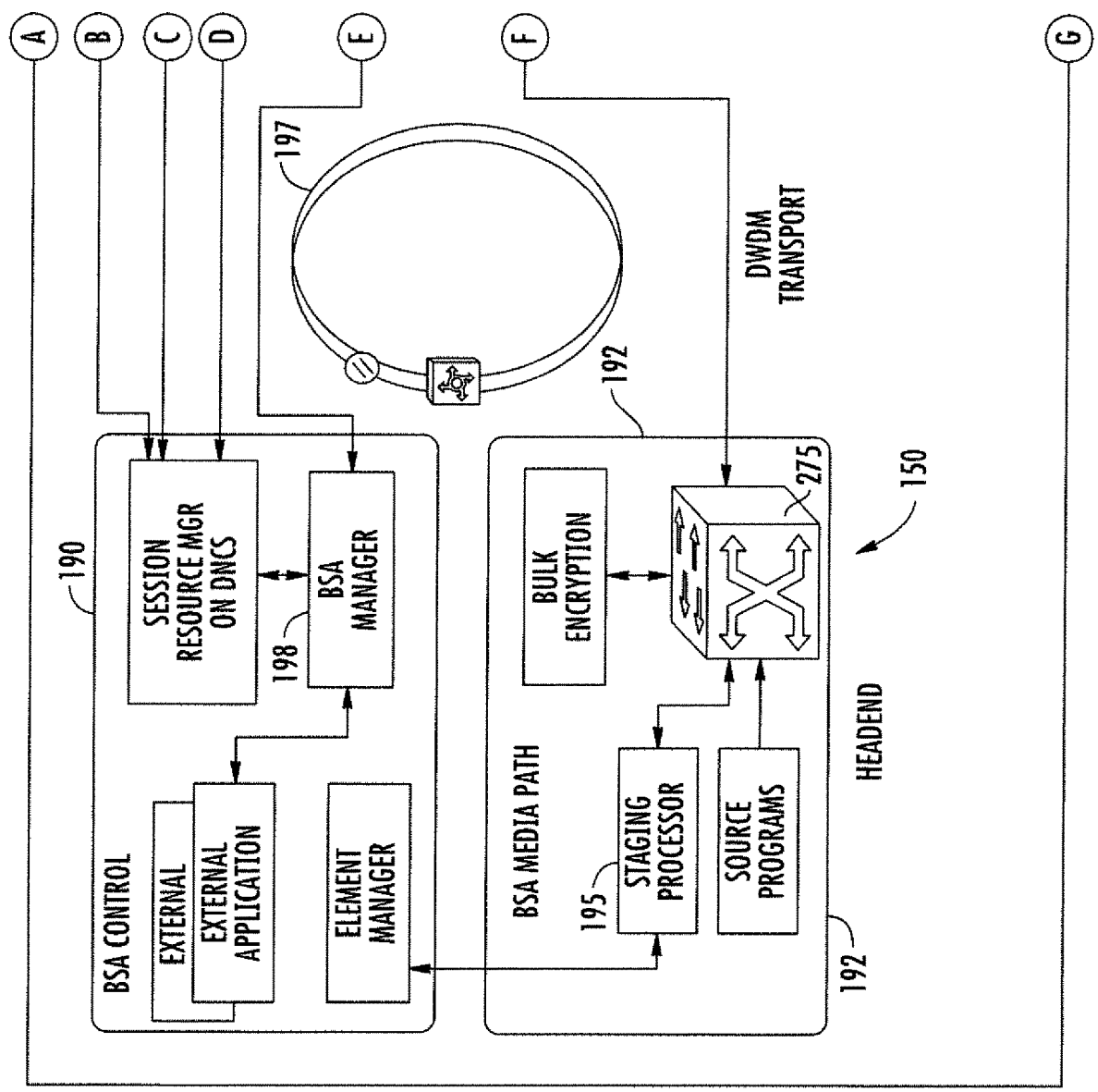
FIG. 1*c* is a functional block diagram illustrating one exemplary broadcast switched architecture (BSA) network useful with the present invention.
Figure 1C:
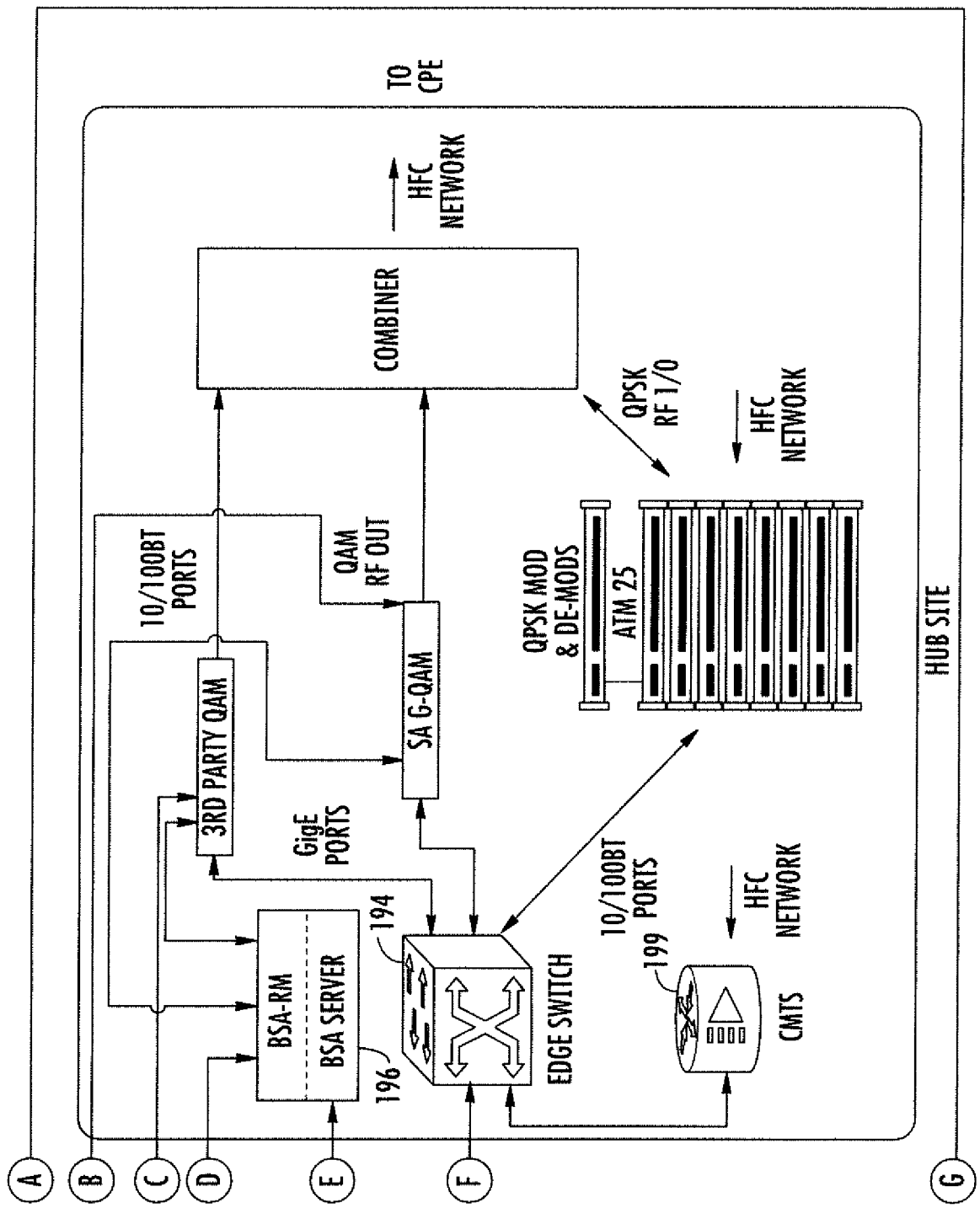

FIG. 1c illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the head-end 150 contains switched broadcast control and media path functions 190, 192; these element cooperating to control and feed, respectively, downstream or edge switching devices 194 at the hub site which are used to selectively switch broadcast streams to various service groups. A BSA server 196 is also typically disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001, entitled "Technique For Effectively Providing Program Material In A Cable Television System", and issued as U.S. Pat. No. 8,713,623 on Apr. 29, 2014, incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a-1c can also deliver Internet data services using the Internet protocol (IP), although other protocols and transport mechanisms of the type well known in the digital communication art may be substituted. One exemplary delivery paradigm comprises delivering MPEG-based video content (e.g., "IPTV" or the like), with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable or other modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPEs (or CD). The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Personal Content Delivery Architecture—

Figure 2:
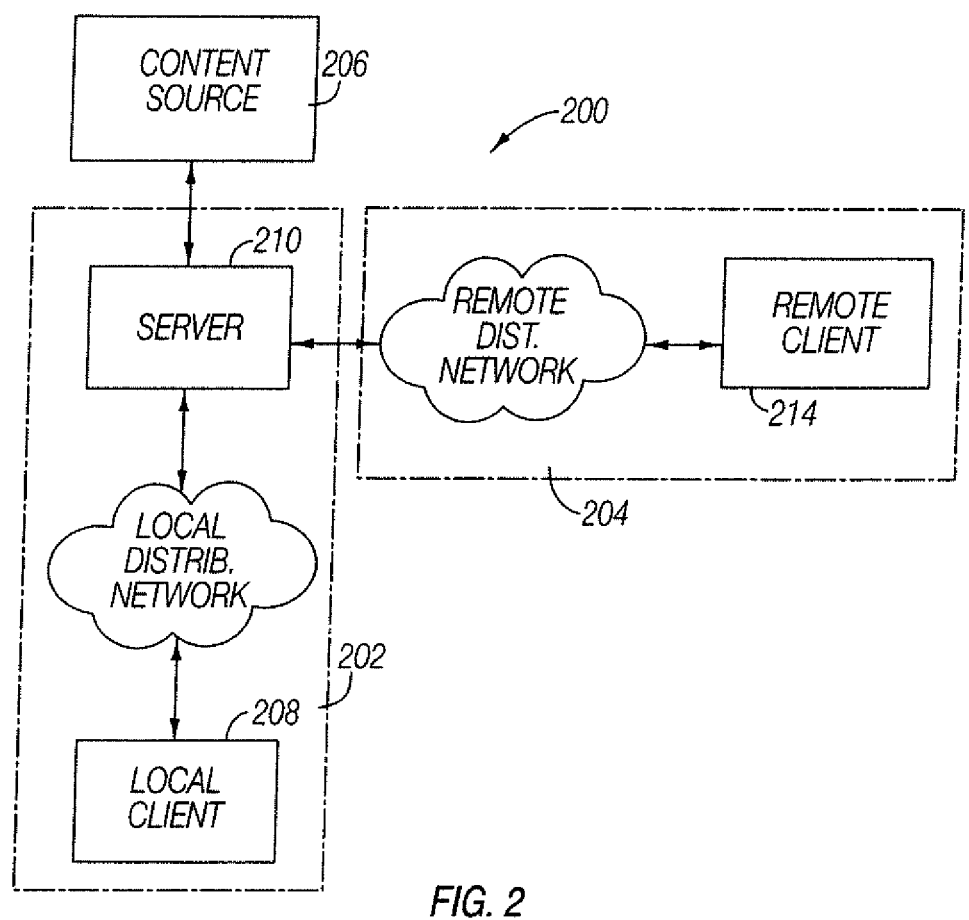
FIG. 2 is a functional block diagram illustrating one exemplary embodiment of the generalized content distribution architecture (CDA) according to the invention.

FIG. 2 is a functional block diagram showing an exemplary generalized architecture that implements the personal content delivery and related functions of the present invention. It will be appreciated that this generalized architecture may be readily integrated into the existing architecture of a cable television network (such as those shown in FIGS. 1-1c), or alternatively used in conjunction with other types of networks (e.g., satellite networks, DSL networks, etc.)

As shown in FIG. 2, the functional blocks in the illustrated system 200 are divided in two functional networks for simplicity of description: a local network 202, and a remote network 204. The content source 206 is shown supplying content to a server entity 210 within the local network 202, although it will be appreciated that the content source may supply the remote network directly or by proxy if desired (as controlled by the server entity 210).

The remote network 204 interfaces with the server entity 210, the latter receiving requests from a remote client device 214 (e.g., a PMD, remote PC, laptop, etc.). As discussed in greater detail subsequently herein, these remotely-issued requests are serviced by the server entity 210 based on one or more criteria.

It will be recognized that while the terms "remote" and "local" are used, these terms carry no specific connotation relating to distance or location, but rather are merely meant to differentiate between the various domains of the system 200. For example, the "remote" network 204 may actually be physically proximate or within a subscriber's premises along with the local network 202. Similarly, extensions of the local network 202, such as at the subscriber's premises via a LAN/WAN, or WiFi interface, may place the local client device 208 or LCD (e.g., a PMD, laptop, or other mobile device) more distant from the server entity 210 than the remote device.

Furthermore, while one of each the local and remote networks are shown in FIG. 2, two or more of each may be employed within the architecture, and in fact these multiple remote or local networks may communicate among themselves or between various of the illustrated components, such as where a plurality of remote client devices share a common server or infrastructure.

Figure 2A:
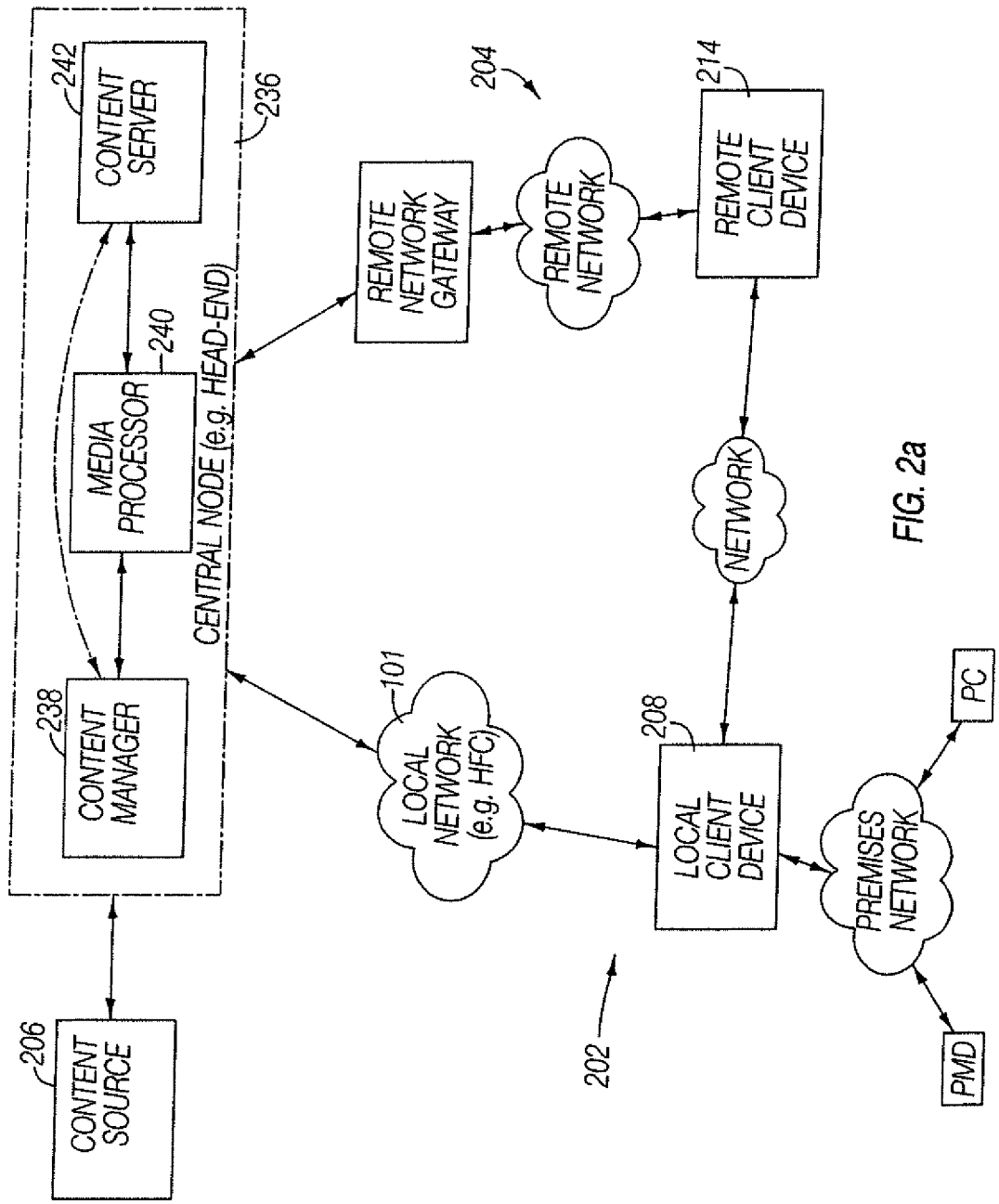
FIG. 2*a* is a functional block diagram of a first exemplary embodiment of the generalized architecture of FIG. 2, adapted for use with a typical cable television network.

FIG. 2a illustrates one exemplary embodiment of the personal content delivery architecture of the invention, adapted to a cable network. In this embodiment, a local access network 202 is used as the distribution network on which the subscriber receives his/her content (e.g., television programs), and to which a local client device (LCD) 208 located at the subscriber's premises is coupled. A central node 236 (e.g., cable head-end 150) services the local network and includes a content manager (CM) 238, a media processor (MP) 240 and a content server (CS) 242 connected to each other and the local network 202 via a LAN or other comparable infrastructure at the head-end.

The content manager 238, media processor 240, and content server 242 may be physically and/or logically integrated into one device or process, or maintained as separate devices/processes even located at disparate locations, as described further below. Alternatively, the function may be implemented in a distributed manner where one or more functional aspects are implemented on multiple platforms.

The content manager acts as the overall logical control or supervisory process for the remote content delivery functionality described herein. In this regard, the CM 238 acts as somewhat of an overlay onto existing logical and physical processes occurring within the network including, e.g., authentication of subscribers, instantiation of VOD sessions, switching of BSA hubs to deliver content to various subscribers, etc.

The media processor 240 acts to process media ingested by the head-end 150 (or stored therein, etc.) before delivery to the requesting remote client device (RCD). For example, the RCD might require the media to be encoded in Real or AVC format versus MPEG-2, may require compression, etc. Alternatively, the bitrate of the local network program may be different than the bandwidth available to the RCD via the remote network. In such a case, the media processor 240 may perform the function of rate shaping the content using any number of different implementations recognized by those of ordinary skill. One such exemplary implementation performs rate shaping by setting a target rate where the input bitstream is converted to a constant bitrate stream. In another implementation, the rate shaping is performed based on feedback from the network connection between the streaming content source and the RCD. In yet another implementation, the rate shaping is performed in multiple stages, depending on hops in the network and their availability of downstream bandwidth.

In certain implementations, the media processor may also add or convert portions of the content before transmission. For example, the media processor may include a watermark or other steganographic or DRM data on outgoing video, or encrypt it (e.g., according to an AES or DES encryption algorithm).

The media processor function may also be implemented by storing multiple copies of the content suitable for a variety of network conditions, and picking the appropriate copy as needed. This method becomes especially useful when the remote or visited network is a network that supports a well known parameter set or requirement; e.g., a prescribed data transfer speed (such as e.g., 56 Kbps or 384 Kbps), QoS, etc.

The content server 242 may comprise any server capable of serving the content to the requesting RCD, including for example existing broadcast, application or VOD servers (FIG. 1) within the network. When a connection is established between the remote or visited network client device and the content server by the content manager, the content server assumes the responsibility of streaming programs to the RCD. Such transmission of audio/video programs may be accomplished using one of several possible transport technologies. For example, one exemplary implementation utilizes an Internet Streaming Media Alliance (ISMA) compliant server. Another implementation may comply the RFC-3550 specification published by the Internet Engineering Task Force (IETF). Other streaming server implementations are possible, and will be readily implemented by those of ordinary skill.

On the remote network side 204, a remote client device (RCD) 214 is in communication with the remote network 244 which in turn is coupled to the head-end 150 via a remote network gateway (RNG) 246. The RNG can take any one of several forms, depending on the nature of remote or visited network. The exemplary RNG of FIG. 2a performs the function of policing communications going in and out of the remote network to the head-end 150. In some embodiments, this may be accomplished at the transport layer of the communication protocol stack. In other cases, such policing may be performed at multiple layers of the communication stack. For example, a wireless access point contains traffic policing both at IP layer and additionally performs the function of converting IP traffic from and to wireless medium to wired Ethernet IP connections. The RNG may also perform additional functions such as acting as a proxy server and/or firewall.

The RNG may also be equipped with 802.1x/RADIUS authentication capability, in event barring communications issued by the RCD from passing without proper authentication by the RADIUS server. This approach helps limit "spoofing" of the head-end processes (including the content manager) by surreptitious entities seeking to gain unauthorized access to the content distributed by the MSO. This can also be used as part of a multi-layer system; such as where the aforementioned 802.1x/RADIUS function or similar is layered with an independent authentication performed by the TA or a designated proxy (e.g., trusted authentication authority).

The exemplary architecture of FIGS. 2 and 2a make no assumptions about the remote network, other than that the remote network be able to support communication with local head-end servers and be able to deliver content to the RCD(s). Consider the case where a user is at their place of work, accessing personal media from their home over the Internet. In such an example, the remote network 204 comprises a corporate intranet that supports IP transport and provides access to the Internet (an interposed "remote" network).

Another example of a remote network according to the invention is a wide area wireless network such as cellular telephony network. In such a case, the remote network must be capable of following user commands from his/her mobile phone to reach the head-end servers, and also be able to forward personal media streamed by the content server 242 to the RCD. Exemplary methods and apparatus for implementing such connectivity and interoperability between an MSO network and a cellular or other such mobile device network are described in co-owned U.S. patent application Ser. No. 11/258,229 filed Oct. 24, 2005 and entitled "Method and Apparatus For On-Demand Content Transmission and Control Over Networks", incorporated herein by reference in its entirety. This disclosure provides exemplary apparatus and methods for accessing data (such as video, audio or data files) over a network according to download or "on demand" paradigms. In one embodiment, the network comprises a cable television network connected with a CSP (cellular service provider) or wireless service provider (WSP), and on-demand content delivery is accomplished via a "point-to-point" approach wherein a session is established between a content receiving entity (such as a cellular telephone) and a distributing entity (e.g., a VOD server). Session establishment and data flow control are advantageously implemented using protocols and bandwidth that are typically used for (i) providing on-demand services to subscribers within the cable network, and (ii) delivery and control of streaming multimedia to client mobile devices.

In one embodiment, session establishment and data flow control are advantageously implemented using protocols and bandwidth that are typically used for delivery and control of streaming multimedia to a subscriber's LCD 208, such as a cable network's VOD infrastructure. The content delivered may be an MPEG transport stream, for example, in either standard definition (SD) at 3.75 Mbps, or high definition (HD) at 15 Mbps (or any increments or multiples thereof).

The receiving client device, via a fixed- or soft-function key or other such user interface, can also invoke FF, REW or other "trick mode" functionality with respect to the video streamed over the wireless network (and any intermediate fiber/wired links within the IP network). This feature can also be used as a complement to other existing modalities, such as "real time" streaming or simply transferring the complete video/audio data file(s) to the requesting client for storage (and provision of "trick mode" functions) thereon.

The on-demand content provided to a subscriber's mobile device can be billed to the same MSO account held by the subscriber for the cable network services provided to the subscriber's premises. This allows for a convenient "bundling" of services, obviating a need to pay for access to this additional on-demand content on a separate bill or billing account.

The on-demand access of content according to the invention is also advantageously agnostic to the type of session establishing protocol or data transfer protocol used, thereby allowing the transfer of content to a client mobile device over virtually any type of multimedia-capable cellular or wireless bearer network (including e.g., 3G, CDMA, TDMA, 802.11, etc.).

The present invention can make use of packet-over-circuit technologies to extend its reach; e.g., use of UMTS CDMA air interface, RAN, etc. Almost all current cellular phones have WAP or similar Internet access technology (which accesses distant WAP server site via a gateway or similar infrastructure), but these are generally not equipped to handle any significant download sizes due to very limited bandwidth. The exemplary use 3G IMS increases bandwidth significantly, and hence is a natural choice to carry video content (even streamed).

The disclosed apparatus and methods also advantageously provide for upload of content to a server or other network entity, and the uploaded content can then be downloaded and "VOD'd" by a linked subscriber. For example, using a cellular phone camera, microphone, etc., user can stream video up to the VOD server for download/VOD access by others who have authorized access to the content-based network (perhaps other family members or friends), so these other persons can watch the uploaded content on their LCD 208 or other desired platform (e.g., PC).

Another example of remote network comprises a user connection to the Internet over a wireless network or interface. One such wireless network might comprise an 802.11 a/b/g/n network, PAN, or 802.16 WiMAX interface.

Yet another example of a remote network comprises an Internet Service Provider's (ISP) network when the user accesses the Internet through his ISP connection and then makes a request over the Internet to view personal media form the MSO (local) network.

Alternatively, the RCD may comprise a WAP-enabled client (e.g., PDA or other PMD) that interfaces with a WAP gateway, the latter which may comprise or be integrated with the remote network gateway (RNG) previously described.

It will be appreciated that the present invention also contemplates situations when the subscriber/RCD is not static in the remote network 204, but is mobile within that network, and may also transition from one remote network to another. Because the personal content delivery of the present invention can be implemented by delivery technologies that typically are enabled for such mobility, IP or comparable mobility solutions can be used consistent with the invention in order to ensure that a subscriber is able to receive their content when making a transition from one network to another. In one embodiment, the exemplary content manager 238 or MP 240 may contain a functional process (e.g., algorithm) that monitors for such transitions, including changes in bandwidth available for media streaming. For example, when a subscriber makes transition from a wide area network such as 3G network to a more localized 802.11 Wi-Fi network, the bandwidth available for streaming may increase substantially. The MP 240 then will be appropriately instructed by the algorithm, such as via interprocess messaging or communication between the CM 238 and the MP 240, to increase the bandwidth of outbound personal content streaming session.

The present invention can be used with any device capable of communication over the network and capable of receiving and utilizing the distributed content (e.g., displaying video streams). The RCD may comprise a wired device, such as a laptop or desktop personal computer or wireless receiver. The RCD may implement receive, decode and display capabilities for content on a single platform (e.g., a mobile phone), or on more than one platforms (e.g., a cable or other modem, and a PC connected to the modem and capable of decoding and displaying media).

The RCD may also have the ability to provide enough credentials on behalf of the user/subscriber, so that the content manager 238 is able to ascertain that the content access request is from a subscriber of the local network service (e.g., MSO). This capability may be implemented within the RCD via, e.g., a user interface for the subscriber to be able to provide username/password, or alternatively in the form of a digital authentication technology such as a SIM card for mobile phones.

The content source 206 shown in FIG. 2*a* may comprise any source of content accessible to the head-end 150 including, without limitation, third-party websites, studio content repositories, dedicated (e.g., RAID) or other storage, local MSO storage (e.g., that used for VOD or similar purposes), live or broadcast feeds from networks, and so forth.

Furthermore, it will be recognized that virtual content recording services and apparatus may be used consistent with the present invention in order to provide, inter alia, extended storage capabilities and access to the remote (or local) subscriber(s). See, e.g., the methods and apparatus disclosed in co-owned U.S. patent application Ser. No. 10/626,051 filed Jul. 24, 2003, entitled "Technique for Providing a Virtual Digital Video Recorder Service Through a Communications Network", and issued as U.S. Pat. No. 7,457,520 on Nov. 25, 2008, which is incorporated herein by reference in its entirety. In this manner, the size of the accessible "library" of stored content available to a subscriber is not limited to that of physical devices on their premises. For example, were the system of FIG. 2*a* to be configured according to one exemplary embodiment (described in greater detail subsequently herein) that restricts remote access to content which the requesting subscriber has downloaded and recorded on their premises DVR, the population of such content could be quite limited, since the physical capacity of DVR devices is comparatively small (even if a removable recording medium is utilized). To the contrary, "virtual" or remote storage (e.g., at the head-end or another site) expands the storage space (and hence the number of titles available to a user remotely via the aforementioned system operating paradigm) to an almost infinite amount, especially if the network operator utilizes virtual storage of their own.

Figure 2B:
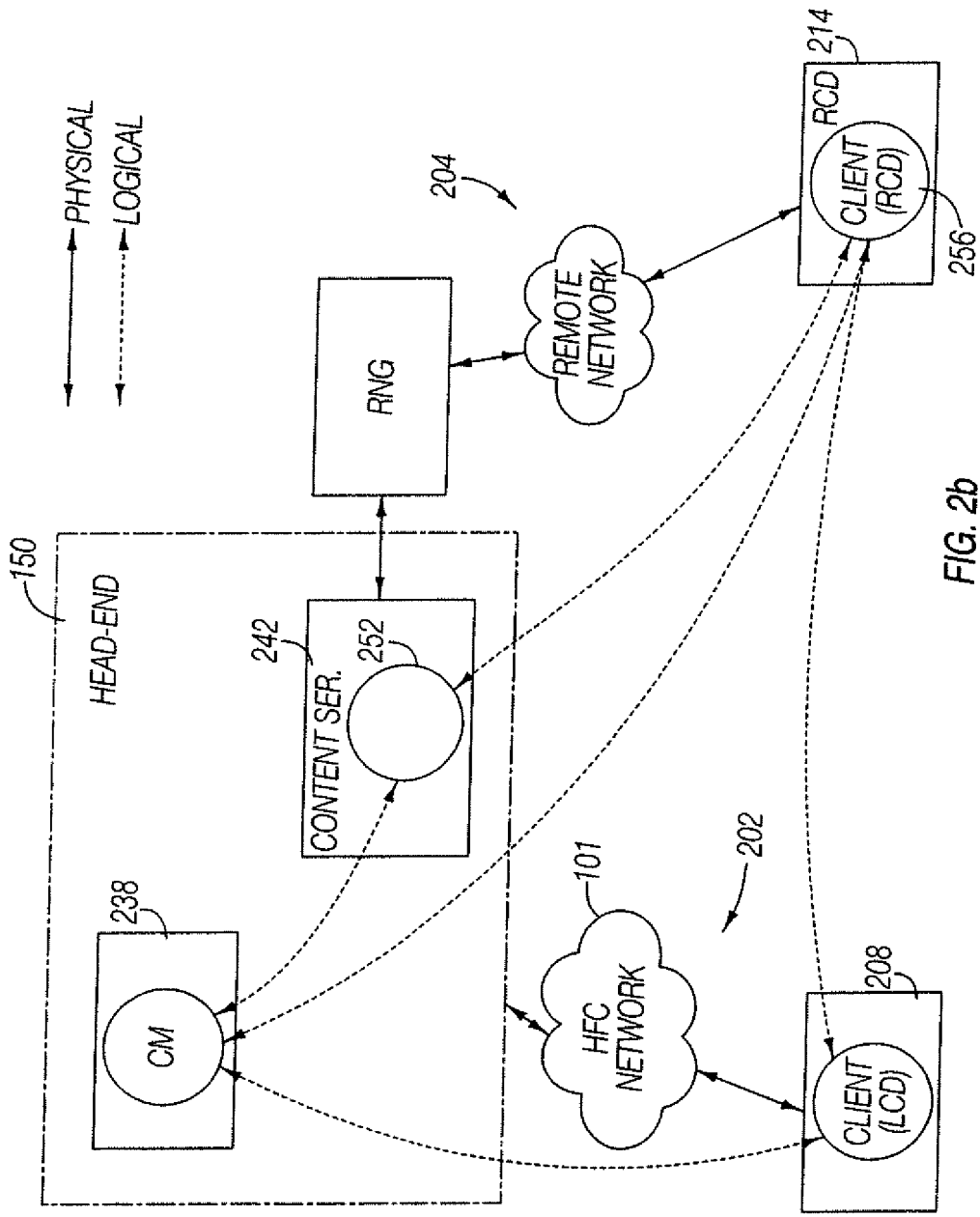
FIG. 2*b* is a graphical representation of one exemplary embodiment of a software architecture useful with the content delivery architecture of FIG. 2*a*.

FIG. 2*b* illustrates an exemplary software architecture useful with the invention. In the illustrated embodiment, the software architecture 250 comprises a distributed application (DA) comprising a server portion 252 as well as a local client portion 254 and a remote client portion 256. The content manager 238 functionality may be integrated into the server portion 252, or alternatively comprise a discrete or stand-alone module having inter-process communication with the server portion (or portions where multiple content servers and server portions are used in conjunction with the content manager 238). The client portions 254, 256 advantageously need not be in direct communication with one another, but rather can communicate only with the server portion 252 which, in conjunction with the CM 238, enforces rules relating to delivery of content relating to the LCD and the RCD as described in greater detail subsequently herein.

Figure 2C:
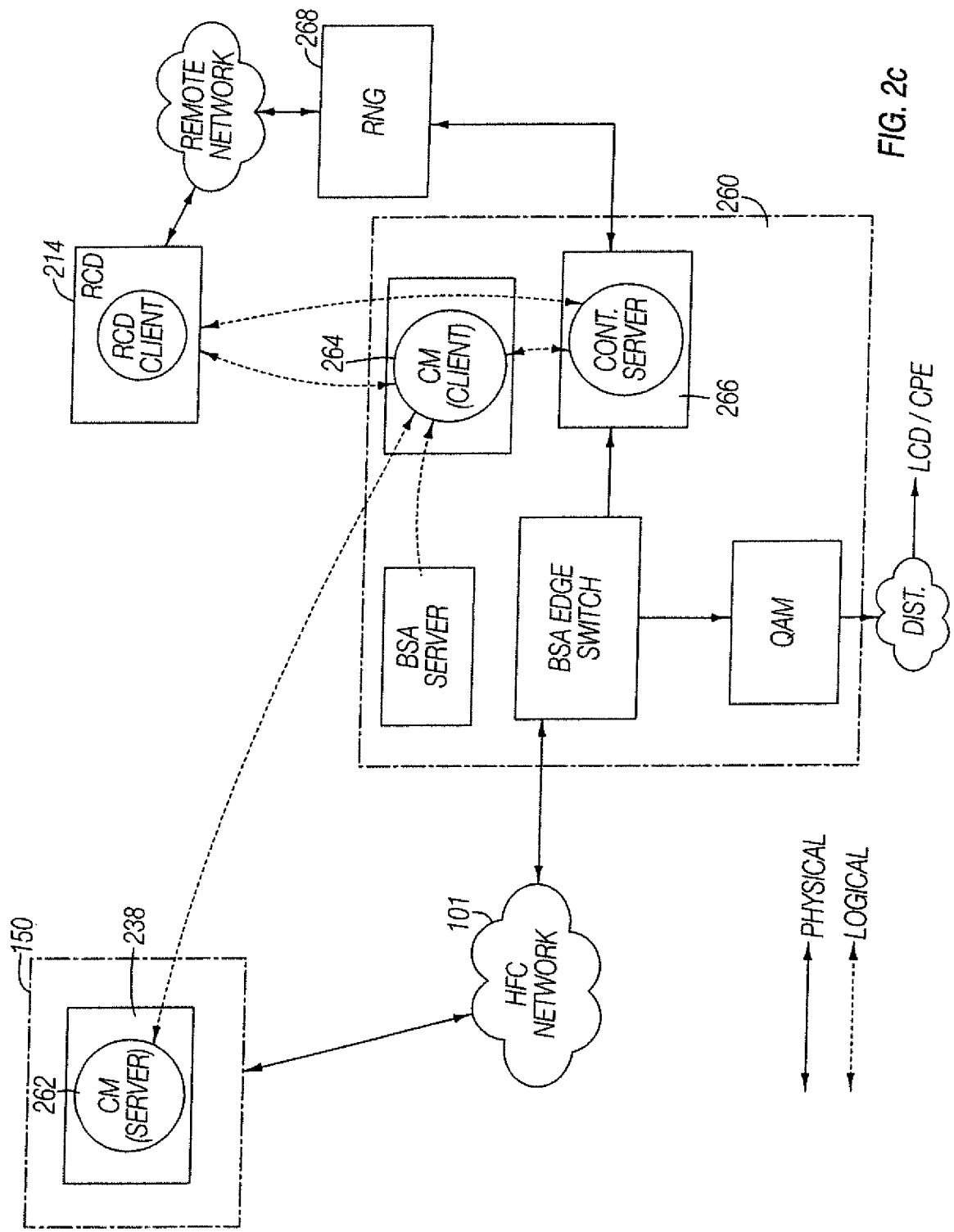
FIG. 2*c* is a functional block diagram of a second exemplary embodiment of the generalized architecture of FIG. 2, adapted for use with a broadcast switched architecture (BSA) cable television network.

FIG. 2*c* illustrates an alternate embodiment of the content delivery architecture of the invention, except adapted to a broadcast switched architecture (BSA) cable network of the type previously illustrated in FIG. 1*c*. In this architecture, at least some of the content manager (CM) functions are pushed out closer to the network edge, such as at the illustrated BSA hub site 260. The CM function, for example, may comprise a distributed application (DA) having a "server" portion 262 running at the head-end 150, and a client portion 264 running at the BSA hub (e.g., on the local content server 266). A local gateway 268 is also provided for direct access to the remote network 204 and RCD. This approach has the advantage of, inter alia, decentralizing the remote content access and delivery functions, especially under a broadcast paradigm. For example, in one variant, the state of the BSA hub switch (e.g., whether the switch is selected so as to deliver particular content to a given subscriber) is fed to the local content manager 264 so as to allow immediate determination or evaluation of requests for content received from the remote network 204. If the content is switched on for the requesting subscriber at the BSA switch, the remote access request is authorized, and the content ported to the remote gateway 268 for delivery to the remote device.

The architecture of FIG. 2*c* can also be used in parallel with other distribution architectures (e.g., that of FIG. 2*a*) to provide a heterogeneous capability; i.e., remote requests for broadcast content are handled by the hub site, while remote requests for VOD content are handled by the head-end 150 and associated content/VOD server(s).

One advantage provided by the present invention is the ability for the head-end 150, BSA hub site, or other such network node to transmit or relay content in a packetized digital format to the network address of the RCD, thereby avoiding the potentially signal-degrading analog-to-digital conversion previously described under prior art approaches.

Another advantage of such a system is the use of the same strong encryption used to deliver the high-value content over the local network when sending the content stream to the subscriber's remote or visited network.

Furthermore, another advantage provided by the architecture used in the exemplary embodiments of the invention relates to the fact that upstream bandwidth limitations that would be imposed upon prior art solutions such as the Slingbox are not present in this architecture. For example, it is possible that between the content server and the remote client device 214 located in the visited network, comparatively high (e.g., multi-megabit) bandwidth is available for streaming content. Accordingly, the quality of programming that can be streamed using this high-bandwidth connection or network is higher, since the architecture is not constrained by the typical upstream bandwidth rates (e.g., 384 Kilobits per second in a typical cable system) that support only a minimal quality video. Hence, by removing the "choke point" of the upstream channels from the premises to a distribution node, delivery of the content from the head-end or other upstream node in the network to the client in the remote network can occur at potentially greater bandwidths. This can be analogized to removing a flow restriction in a pipe capable of carrying much higher flow rates than those which the restriction can accommodate.

Moreover, the limited upstream bitrates associated with the prior art techniques make it effectively impossible to stream high definition (HD) programming. In contrast, according to one embodiment of the present invention, high definition (HD) programs can be streamed to the visited network client device since the upstream "bottleneck" of the downstream or edge portions of the MSO distribution network is removed.

Remote RCD Configuration—

In another embodiment of the invention, the RCD can be dynamically configured by content manager 238 (or content server 242) in order to enable certain types of functionality.

This dynamic configuration approach can be extended to, e.g., the codec configuration (e.g., MPEG-4, AVC, Real, etc.), the conditional access (CA) technologies, and network interfaces associated with delivery of the content, such as via the exemplary methods and apparatus of co-owned U.S. patent application Ser. No. 11/363,577 filed Feb. 27, 2006, entitled "Methods and Apparatus for Selecting Digital Coding/Decoding Technology for Programming and Data Delivery", and issued as U.S. Pat. No. 7,916,755 on Mar. 29, 2011, U.S. patent application Ser. No. 11/363,578 filed Feb. 27, 2006, entitled "Methods and Apparatus for Selecting Digital Access Technology for Programming and Data Delivery", and issued as U.S. Pat. No. 8,170,065 on May 1, 2012, and U.S. patent application Ser. No. 11/364,147 filed Feb. 27, 2006, entitled "Methods and Apparatus for Selecting Digital Interface Technology for Programming and Data Delivery", and issued as U.S. Pat. No. 8,718,100 on May 6, 2014, respectively, each of the foregoing being incorporated herein by reference in its entirety. For example, one RCD 214 may have a Powerkey or similar CA capability, while another is enabled for downloadable conditional access (DCAS) within its trusted domain. Accordingly, the head-end server process can configure the CA aspects of the content as appropriate for the relevant CA context, and also trigger other processes (such as DCAS download, key negotiation, etc.) necessary to facilitate the playback of the requested content. In this regard, the server process 242 can be made "self healing"; i.e., where the requesting RCD is not properly configured to play back the content, the necessary configuration changes can be instituted automatically to provide a seamless appearance to the remote user.

The CM/content server can also instantiate a trusted domain within the RCD if one does not already exist. For example, using a downloadable CA (DCAS) approach, the necessary software and firmware if any can be downloaded to the RCD, thereby enabling designation of the RCD as a trusted domain for handling content. Exemplary trusted domain apparatus and methods are described in co-owned U.S. patent application Ser. No. 11/006,404 filed Dec. 7, 2004, entitled "Technique For Securely Communicating And Storing Programming Material In A Trusted Domain", and issued as U.S. Pat. No. 8,312,267 on Nov. 13, 2012, incorporated herein by reference in its entirety, although it will be recognized that other approaches may be used.

In one embodiment, an authorized service domain (ASD) approach is utilized for protecting content delivered to the RCD 214. The exemplary configuration of the ASD comprises a UPnP digital rights management technology that is used by the network operator to protect content using security credentials of a multi-stream cable card or secure microprocessor disposed on the RCD 214. An exemplary ASD service (ASDService) defines a service that runs on the content server 242 and is invoked by the RCD (or the CM 238). The ASDService process in defined for exchanging and authenticating security credentials to the RCD (and any connected devices within the RCD domain).

The exemplary ASDService described herein abides by the UPnP AV Architecture for browsing content, setting up connections, transporting content and finally controlling the flow of the content between devices, although this is by no means a requirement for practicing the invention. The ASD-Service is a precursor to the UPnP general playback process, and is executed before the remote device can browse as ASD content directory (e.g., maintained by the content server 242 or CM 238) or allow playback.

The exemplary ASD Service also allows an ASD capable rendering device (e.g., RCD) to scan the remote or local domain networks for ASD capable "servers". Once identified, the RCD can request authentication from the ASD capable servers to view the ASD content directory. The RCD 214 or its proxy selects content from the directory and submits its ASD credentials along with the content ID or other data identifying the content of interest in order to gain access from the server. The submission of the security package is required each time a RCD accesses content in order for the server to maintain counters to comply with "copy once" and "copy never" classified content.

Secondary Content Insertion—

In another aspect, the present invention utilizes a dynamic secondary content (e.g., advertisement) insertion process that gives the network operator the opportunity to provide secondary content such as advertisements that are more tailored or better suited for the primary content (e.g., programming) than that associated with the primary content when it is transmitted to and stored on the subscriber's local or premises equipment (e.g., DVR). Because a program in the exemplary embodiment is streamed from the head-end server (e.g., the content server 242) or another network node upstream of the LCD 208, a decision is made at the time of streaming or delivery of the primary content whether to insert relevant advertisements or other secondary content that is more logically proximate to the primary content or other network context than that associated with the original delivery of the content that is being used as the reference for establishing the current requester's access.

As used herein, the term "logically proximate" refers to secondary content which bears some direct or indirect logical relationship to the primary content. For example, a logically proximate advertisement for the movie "Pirates of the Caribbean" might be one for Disneyland, which includes a "Pirates of the Caribbean" theme ride.

The term "network context" refers to secondary content which bears some logical or deterministic relationship to one or more network operational, business, or other parameters. For example, logically proximate secondary content based on network context may be that which is properly encoded to be delivered over the relevant distribution path, which fits the allotted time, which maximizes bandwidth or profits, etc.

Hence, while the original delivery of the target primary content might have advertising that is effectively randomized in terms of logical proximity or network context, the network operator can, using the apparatus and methods of the present invention, dynamically adjust the secondary content based as desired before it is delivered to the remote user/RCD.

Such functionality also allows for the substitution or replacement of secondary content which is less suited to the present context or environment, or which is dated. For example, a promotion such as "Tonight on NBC" becomes less relevant when the primary content is watched by the subscriber three days later than the original airing of the promotion. However, using the method of the present invention, the promotion could in fact relate to a program that is scheduled to be broadcast on the day that the subscriber watches the promotion. This can be readily determined by any number of means, such as e.g., using the date/time reference associated with the network (e.g., SI reference) as compared to metadata relating to date/time associated with the content. In the context of the foregoing exemplary promotion, the promotion might carry "date relevance" data or the like in the form of metadata, which can be read and evaluated by the exemplary advertising or secondary content insertion algorithm (not shown) included within the CM 238, or running on the content server 242. The insertion algorithm of the exemplary embodiment can, for example, select secondary content which is contextually, temporally and/or logically related to one or more elements of primary content, the network context, and so forth.

Another example of selective replacement of secondary content relates to geography or location; e.g., a promotion for a sports event for a local team, or local news, etc. might have limited applicability to a subscriber who is located out of the geographic area. Accordingly, one embodiment of the invention uses secondary content that contains geographic metadata when stored, the metadata being used as the basis for insertion based on a particular geographic location.

It will also be recognized that other types of information may also be included with the primary content that is delivered to the requester in the remote or visited network. For example, one variant of the invention comprises the inclusion of closed caption (cc) data, such as for example through use of the methods and apparatus described in co-owned U.S. patent application Ser. No. 11/298,247 entitled "Caption Data Delivery Apparatus and Methods" filed Dec. 9, 2005, and issued as U.S. Pat. No. 8,566,887 on Oct. 22, 2013, and incorporated herein by reference in its entirety. Similarly, emergency alert (e.g., EAS) data can be included for example using the methods and apparatus of co-owned U.S. patent application Ser. No. 11/299,169 entitled "Emergency Alert Data Delivery Apparatus and Methods" also filed Dec. 9, 2005, issued as U.S. Pat. No. 7,592,912 on Sep. 22, 2009, and incorporated herein by reference in its entirety.

Third Party Content Authority (CA)—

In another aspect of the invention, a third party content source database or other such data repository is used to determine whether a given subscriber or entity (which may be anonymous by virtue, e.g., identification or association of the subscriber's CPE/CD/PMD with the purchased content instead of their actual physical identity) has purchased particular content. For example, in one variant, the user registers with the content source such as during an on-line Internet purchase via the content source website. This information is maintained by the content source and, through agreement or cooperation between the MSO and the content source, provided to the MSO when the latter receives a "remote" request for content from one of its subscribers. Hence, the content server 242 at the head-end or BSA hub can authenticate the user, and also access the content source database to determine if the content has been previously purchased by that user. A correlation table or similar data structure can be maintained by the content source, MSO, or combination thereof, which correlates the various devices under a subscriber's MSO account or otherwise associated with the subscriber. For example, in one variant, the content source maintains a correlation table containing the user's name (or alternatively identification information such as TUNER ID or MAC; see, e.g., co-pending U.S. patent application Ser. No. 11/186,452 entitled "Method and Apparatus for Boundary-Based Network Operation" filed Jul. 20, 2005 and incorporated herein by reference in its entirety), as well as network or other addresses (e.g., 32-bit IP address) for other devices associated with the subscriber's MSO account. In this fashion, a remote request being issued from a subscriber's PC, PMD or other such device that is not their CPE/CD at their premises can be immediately recognized and granted access to content that was purchased and downloaded to, e.g., the subscriber's CPE/CD, or was purchased on-line via a web account.

In another variant, two or more content sources (e.g., copyright holders) may create an accessible database ("Content Authority" or CA) for content purchases, somewhat akin to the centralized trusted authority (TA) architecture used for authentication and security purchases. The CA can then act as a local- or even national-level clearinghouse for remote content requests from MSO subscribers. This approach provides a substantially centralized point (or points) of access for network operators of varying types and configurations, so that they may process requests for content from "remote" locations or entities in a timely fashion, thereby also potentially relieving the MSO of having to store data and information relating to content purchases or downloads.

However, it will be appreciated that each MSO may desire to maintain such information for, e.g., backup, quicker service for in-network requests, and so forth. Accordingly, in another variant, the CA described above is used only in the case where the remote content request originates outside of a network or device reflected within the MSO database. For instance, one exemplary algorithm according to the invention accesses the MSO internal or local database (e.g., maintained at the head-end 150) first to determine if a requesting device is reflected in that database. If the requesting device (as identified by, e.g., its MAC address, device ID, TUNER ID, etc.) is not present, then the algorithm calls out to the CA to see if the requesting device is present in the CA database. Conversely, the situation may occur where the requesting device is present in the MSO local database, yet the requested content is not reflected therein. Hence, since the subscriber may have purchased the content via a non-MSO linked source (e.g., an independent third party content source, such as via an Internet website), the algorithm may check the CA database (which would be updated with the third-party purchase of the content) to see if that content has been associated with that device (or subscriber).

The MSO database may also contain a correlation table or other such mechanism for correlating a specific subscriber's identity (e.g., name, SSN, address, etc. and their CPE/CD/PMD identifying data (e.g., TUNER ID, MAC, etc.), so as to permit cross-referencing within the third-party (e.g., non-MSO) databases. For example, such third-party databases may merely have the subscriber's name/address or other such information associated with a purchase of content. However, in order to associate a request from a CPE/CD/PMD that is rendered only in the device's identifying data, the MSO subscriber database must correlate the received device identifying data with a name, so that the third-party database can be cross-referenced.

It will be appreciated that the foregoing cross-referencing function can also be accomplished using an anonymous approach. For example, one exemplary embodiment of the invention comprises use of an "opaque" variable that is generated based on the user's device data via a cryptographic hash; see, e.g., the exemplary approach of U.S. patent application Ser. No. 11/186,452 previously referenced and incorporated herein. The hash and opaque variable frustrate de-encryption or reverse-engineering of the individual subscriber's identity or specific location. Accordingly, the association between the subscriber's actual identity and the content they have purchased can be maintained anonymous, thereby advantageously affording the subscriber total privacy as to their content purchases, yet still affording the ability to perform remote location access.

Similarly, a "two-way" hashing or anonymous association approach can be used, so that anonymity can be maintained within the CA or other third party database as well. This helps alleviate privacy concerns arising from the CA or third-party database. Specifically, in on embodiment, the user's content purchase information can be maintained using a similar yet independent opaque variable or other such mechanism generated by the CA/third-party source. For example, the user's IP address and a device ID (or other information uniquely identifying the user's platform or the user themselves, such as SSN, credit card number, etc.) can be used to generate a cryptographic hash and resulting opaque variable that is correlated to the purchased content. Hence, when an MSO subscriber purchases content via whatever channel outside the MSO network, a unique opaque variable is established and correlated to the content purchased. This second opaque variable can then be forwarded to the MSO, who can add this to a correlation table or other data structure, such as the table in which the MSO's (local) opaque variable is stored. Hence, a correlation between the first (local) and second (third party) opaque variables is established, thereby allowing for end-to-end anonymity for the subscriber/purchaser. The correlation between the two opaque variables can be established by, e.g., a physically and virtually secure database that is discrete from those previously described and which is populated through use of information that definitively correlates the two opaque variables in at least one aspect (e.g., name and SSN/CCN). Hence, surreptitious theft or "hacking" into this secure database by itself would not allow correlation between an individual and their content choices, since it only contains a data structure relating one or more MSO opaque variables to one or more third-party or CA opaque variables. Hence, three different databases are use in the exemplary architecture (and required to correlate an individual to particular content purchases): (i) an MSO local database that correlates the subscriber's unique MSO local opaque variable(s) to that subscriber; (ii) a third-party or CA database that correlates a content purchase to a second opaque variable (e.g., hash generated by way of the user's personal information, etc.); and (iii) a third database that correlates the first and second opaque variables (or sets thereof).

So, as an example of the foregoing, subscriber A (John Smith) first purchases "Pirates of the Caribbean" via third-party website B, which takes the subscriber's CCN or SSN and produces an opaque variable V based on a hash, the variable which is then stored as an entry associated with "Pirates of the Caribbean". Hence, anyone gaining surreptitious access to this database would merely have a group of opaque variables correlated with various specific content.

Stored at the MSO head-end, or other designated location is a second database which correlates the subscriber's devices with their identity; e.g., John Smith located at 742 Evergreen Terrace has devices P, Q, and R associated with his subscriber account (the devices being identified by opaque variables S, T, and U respectively unique to that subscriber and to each device).

Next, John Smith travels to Paris on vacation, and wishes to access the movie he purchased via the Internet website B previously discussed. Hence, he issues a request using his laptop, which is sent to the cable network head-end via an Internet connection. The opaque variable T is generated for John's laptop, which is associated with John's account as previously noted. However, the laptop opaque variable is merely used to enter the third database; i.e., the opaque variable correlation table, to correlate variable T (laptop) to variable V (purchase of ""Pirates of the Caribbean"" via internet website B). The access to the third database can be conducted on a per-variable basis; i.e., simply search for variable T and return all corresponding "content" variables (e.g., V), and match the returned variable(s) against the current content request. Hence, an "end-to-end opaque" transaction is supported, and anyone gaining access to only one (or even two) of the three aforementioned databases could not affirmatively correlate an individual's identity to particular content purchases, since the opaque variable in the third-party or CA database is not the same as that in the MSO database. This "distributed" approach of dividing the information necessary to correlate purchases to individuals provides enhanced security, since different security measures are employed at the CA/third party as compared to those at the MSO, and hence multiple systems must be "hacked" or breached.

It will be appreciated that in the context of the invention, the term "subscriber" or "user" can refer to more than one entity, such as for example a group of related family members, co-workers at an enterprise, etc. In one variant, a "virtual site license" approach is used, wherein the members of a logically related group (e.g., family members) are given copyright license to purchased content for unlimited personal use, such as for an additional fee. Hence, a set of device ID's (e.g., MAC, TUNER ID, IP address, etc.) for all of the devices in a family can be maintained in the aforementioned database(s), and each member given unlimited remote or local network access. The term "virtual" refers to the fact that the devices of the various members may be mobile, and hence the license is associated with a device rather than a fixed location or premises (although it clearly can be used at a fixed location or premises as well).

Method of Establishing Remote Access—

Figure 3:
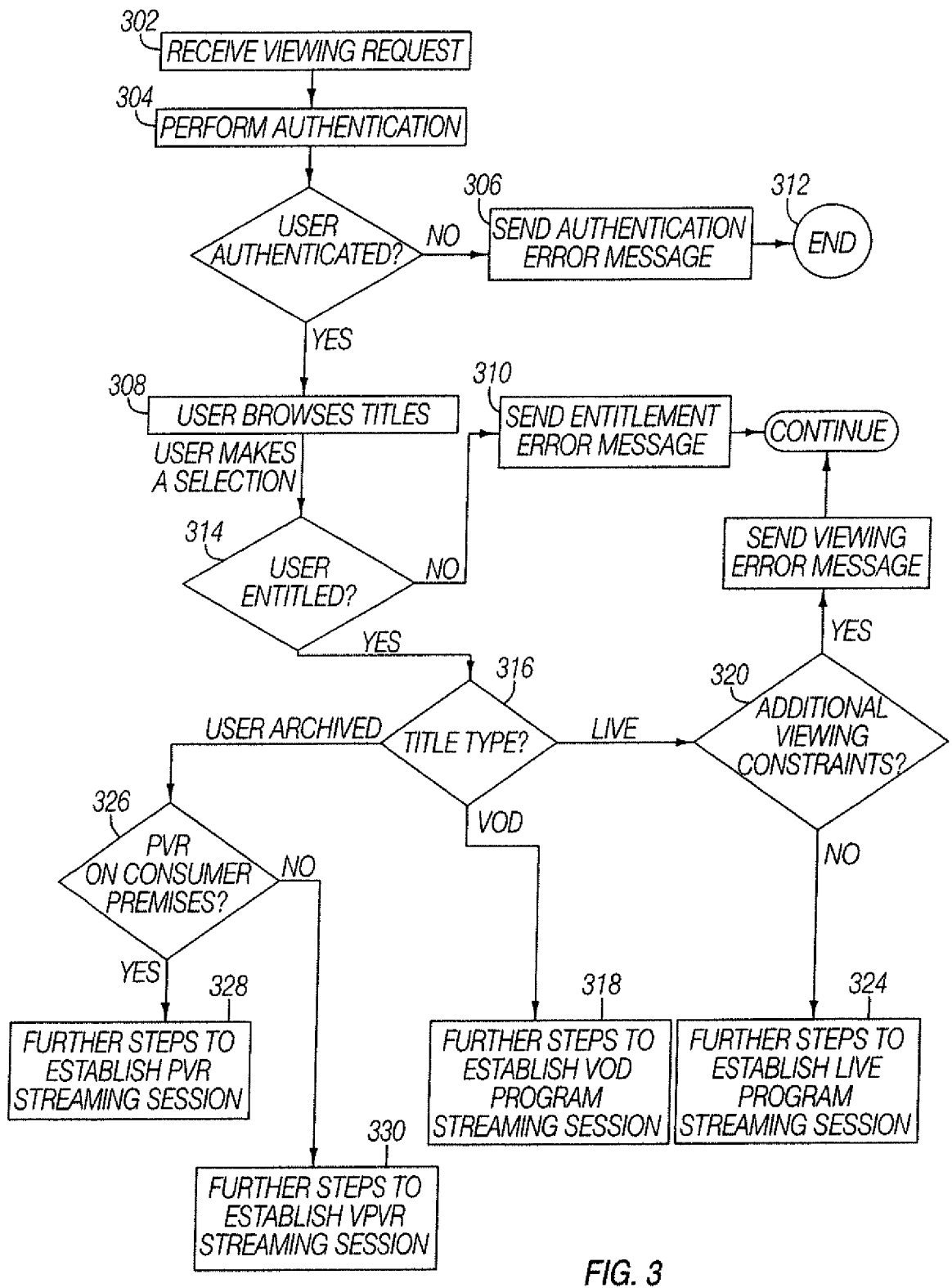
FIG. 3 is a logical flow chart illustrating one exemplary embodiment of the method of establishing a content delivery session according to the present invention.

FIG. 3 shows one exemplary embodiment of the methodology of establishing remote personal content access according to the invention. Such access may be requested when a subscriber is located in a visited or remote network 204 (which may or may not be physically remote to the subscriber's local network 202), and wants to access content available on his local network. This request may be communicated to the local network by a message (step 302) or other direct or indirect communication to the server entity 210, indicating the remote user's wish to access "local" content (e.g., watch a program available for distribution over the local network). For example, in one implementation, the interaction may be in the form of a web-based interactive application running on the server 210, with the remote client device (RCD) 214 being equipped with an application that has the knowledge of a network address to contact the interactive application. The server and client applications may also comprise a distributed application (DA) having server and client portions disposed on the respective devices.

In one embodiment, the client application allows the subscriber to browse (via, e.g., a user interface such as a browser) and select content for delivery from a listing of available titles, with availability of the titles for delivery to the remote device being determined according to one or more criteria described subsequently herein.

In another exemplary implementation, the subscriber may navigate to a universal resource locator (URL) for access to the server hosting the server side component of the personal content distribution DA.

When the viewing request is received at the server entity 210 (e.g., cable network head-end server), an authentication of the request and its origin is performed (step 304) to ensure that the request has come from a user using an RCD 214 that can be served. Such authentication may rely on a variety of methods, including, but not limited to, user identification by password and User ID, known device address, use of digital certificates, public/private keying and other well known cryptographic techniques.

If the server entity 210 determines that the request is not authentic per step 304, an authentication error message is sent to the requesting application (step 306) and the session is terminated (step 312). Such an error message could provide the user explanatory information as to why their request was not successful, an opportunity to re-send the request, and/or contain promotional messages such as a subscription or purchase web page URL. If the user request is authenticated, an interactive session is established (308) in which, among other things, the user is provided with a menu of tasks he can perform and content genre/titles available to him.

When the user makes a selection to access a particular content element (e.g., movie or TV program), an inquiry is made per step 314 to determine if the user's subscription or other access privileges allows him to watch the desired program. If the user is not entitled to watch the program, an appropriate error message is sent (step 310) and the interactive session continues where viewer is given choice to select something different per step 332. Alternatively, the user can merely be presented with a pre-screened listing of available content, such as where only those titles which the user has previously purchased or downloaded to their DVR are presented for selection. Myriad other schemes for presenting the remote user with choices for selection will be recognized by those of ordinary skill when provided the present disclosure, and accordingly are not described further herein.

When the viewer is found to be entitled to access the particular title, a determination is made about the type of title desired (step 316). In the exemplary embodiment relating to media (e.g., video services), three types of titles are generally made available to a user: (i) live or broadcast television, (ii) VOD material available in the local network; and (iii) user programs, either existing on the subscriber's DVR (or networked or virtual DVR, or some such arrangement). It will be appreciated, however, that the invention is in no way limited to media or video-related content, and remote access accordingly can be extended to a number of other different forms of content including without limitation audio content (e.g., music CD's, individual MP3 or comparable files, etc.), gaming or simulation content, software applications, and even stored data (e.g., archived data stored at the head-end or another designated storage location, such as part of a "virtual RAID" service for the subscriber).

If the content desired by the user is a live or broadcast program (or other substantially real-time content delivery modality), the personal content server 242 may check for additional constraints (step 320) that might limit the delivery. These checks may include, e.g., determining the geographic location of the user, and whether the selected content can be delivered to that location at that specific time, such as due to blackouts or other such restrictions. For example, professional sports organizations routinely use blackouts. Such a blackout can be enforced by obtaining information about the subscriber's location from the remote network.

Once the server has ensured that the program viewing request can be fulfilled, further steps to set up the content delivery session are undertaken (step 324). These steps are generally consistent with conventional content delivery techniques, and accordingly not described further herein. The content manager 238 may also select an appropriate origination point from within the local network (or a proxy) for delivering the content to the subscriber. The choice may depend on several factors, including for example location of any remote network gateways or nodes with respect to available content servers 242 in the network.

If the content desired by the user is a title available on the VOD servers of the delivery network, the CM 238 will hand off the streaming session to an appropriate VOD server (step 318). As a result, a VOD delivery session will be instantiated, and the content delivered via the session to the requesting RCD.

If the content desired by the user is a title present on his DVR (step 326), multiple scenarios are possible, including: (i) the DVR is present in the subscriber's premises, or (ii) the DVR is on the network side in the form of a virtual DVR (VDVR) or a network DVR (NDVR). So as to avoid use of upstream bandwidth, if the selected title is present on the premises DVR, a third party content source is accessed to locate and provide the requested content, as opposed to retrieving the content from the premises DVR. Alternatively, if the requested content is already present on the network in the form of a NDVR/VDVR copy, then a call is made to the relevant storage function to obtain the requested content.

When the local network contains a DVR or similar recording device, additional signal exchanges may take place between the content manager 238, and the local/remote devices in order to authenticate, validate, and/or synchronize remote viewing. For example, content providers are concerned about copyright issues associated with recording and storing high value content in unprotected physical devices and formats. Such concerns may be addressed by the present invention by synchronizing or correlating the content stored by the subscriber on the home DVR or other such device; if the content desired to be accessed from the visited or remote location is present on the home DVR, then the remote user will be allowed access. If no correlation exists, then remote access is denied. This approach carries advantages relating to copyright protection and management as well; in simple terms, since the subscriber already has a copy on their DVR, allowing that same subscriber to view the same content except in a remote location is no different than if that subscriber had merely brought their DVR with them to the remote location.

In another embodiment of the invention, the remote content delivery functionality previously described is predicated upon what the subscriber's premises device (e.g., CPE 106 or CD) is presently tuned to, or will be tuned to (such as via an advance reservation or channel tuning selection on an EPG or the like). This information can readily be obtained from the head-end 150 or BSA hub infrastructure, and passed to the content server 242 tasked with serving the remote content request from the RCD. In this fashion, the subscriber makes an affirmative selection of the content that they wish to have delivered to them, and the remote content delivery mechanisms of the invention act as a "repeater" only; i.e., they are coupled to the subscriber's premises tuning activities. Stated differently, the subscriber can be selectively blocked from remotely accessing content that is not presently selected for viewing or recording by a premises device. This approach has advantages from, inter alia, a copyright standpoint, since there is direct coupling between what the subscriber is tuned to at their premises and what they are receiving remotely. Hence, the "time shifting" and "space shifting" paradigms are preserved; the subscriber is merely displacing their viewing location for the content, as if they merely had a very long "wire" from their premises to the remote location.

The foregoing approach also enables a "watch-along" function; i.e., by allowing remote delivery of content that is also contemporaneously being delivered over a channel to which subscriber's LCD 208 is tuned, family or other logically related groups can be serviced in effectively identical fashion. Hence, a parent away on a business trip can be apprised of what his/her children are watching at home with the aforementioned watch-along or repeater function. VoIP or similar audio/video communications (e.g., webcam) between the RCD and LCD domains may also be provided, such as to provide conversational capability between the parent and the family members while all are watching the content, so that all participants feel proximate to one another.

Similarly, the RCD can be configured to communicate with the CM 238 (or even the LCD 208 directly) to enable/disable certain functions or tuning capabilities. For example, the RCD can instruct the CM 238 to disable serving VOD or broadcast content associated with more adult or mature channels to the LCD during certain time periods.

In another embodiment of the invention, the recording of content at the head-end 150, BSA hub site or other MSO node is controlled based on subscriber selections. For example, in one variant, the subscriber must affirmatively select content for recording via their DVR/NDVR/VDVR before it can delivered to the RCD. In this manner, the user has affirmatively selected content for recording, and hence the MSO or other entity tasked with recording the content (if necessary) for delivery to the RCD is in effect simply acting as a remote recorder for the subscriber. In the case where the user has recorded content within an NDVR or VDVR environment, that same copy or recorded content can be used as the basis or source of the content used to service the remote delivery request if desired, thereby causing the MSO or other content recording entity to make only a single copy of the content. It will be appreciated that the subscriber tuning and the recording actions described above can be invoked remotely if desired as well as locally. Hence, a given subscriber might remotely transmit a "tune" command from their RCD or another device (e.g., via a packetized communication delivered over an in-band-channel, OOB, DOCSIS channel, telephony or other link) to tune their LCD to a given program channel, or invoke a DVR record function, thereby enabling the aforementioned delivery of the same content to the remote location.

Network Server—

Figure 4:
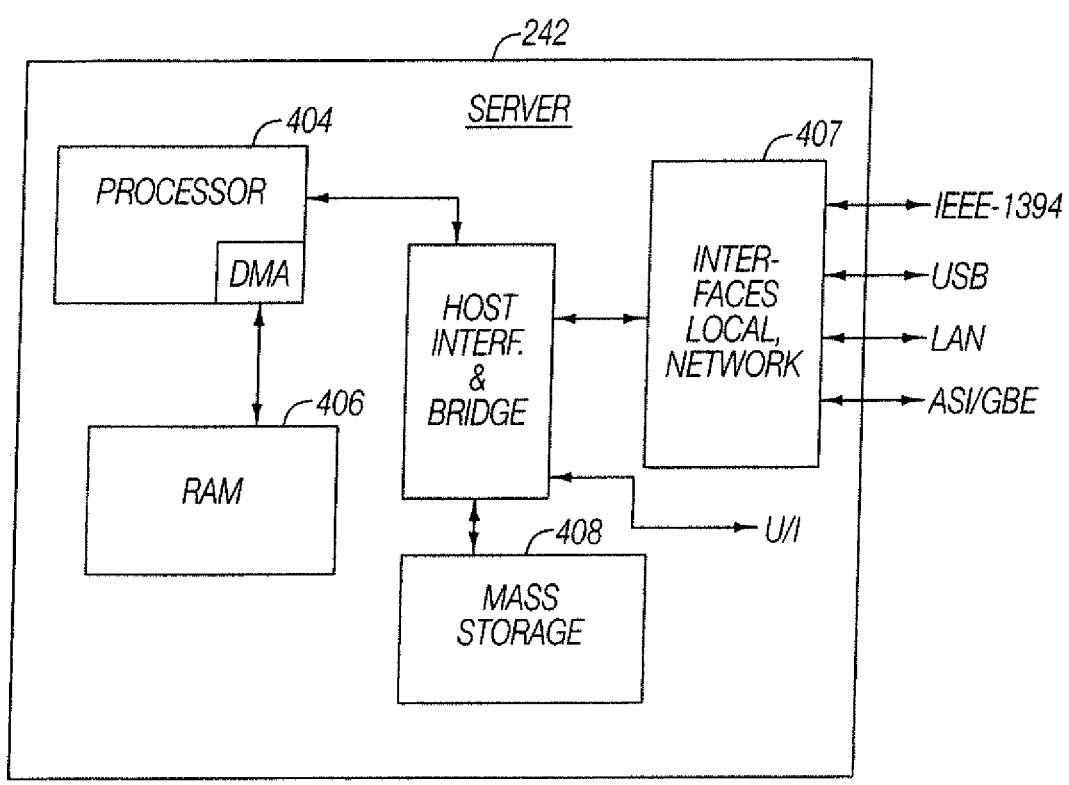
FIG. 4 is a functional block diagram illustrating an exemplary embodiment of a network server apparatus according to the invention.

Referring now to FIG. 4, one embodiment of the improved network content server device 242 adapted for remote content delivery according to the present invention is described. As shown in FIG. 4, the device 242 generally comprises a network server module adapted for interface with the remote network 204 of FIG. 2, digital processor(s) 404, storage device 406 (and optional mass storage device 408), and a plurality of interfaces 407 for use with other network apparatus such as LANs, routers, and other packet network devices, network management and provisioning systems, local PCs, etc. Other components which may be utilized within the server device 401 include amplifiers, board level electronic components, as well as media processors and other specialized SoC or ASIC devices. Support for various processing layers and protocols (e.g., TCP/IP, 802.3, DHCP, SNMP, H.323/RTP/RTCP, VoIP, SIP, LSCP, etc.) may also be provided as required. Where the content server is also acting in a local network capacity (e.g., as a VOD or application server), an appropriate application is also disposed to run on the server module 401 to provide a functional interface for e.g., VOD session requests received from the LCD or other interposed entities. These additional components and functionalities are well known to those of ordinary skill in the cable and embedded system fields, and accordingly not described further herein.

As previously discussed, the server device 401 also may run the server portion 252 of the content management DA.

The server device 242 of FIG. 4 may take any number of physical forms, comprising for example one of a plurality of discrete modules or cards within a larger network head-end or edge device of the type well known in the art. The server may also comprise firmware, either alone or in combination with other hardware/software components such as those previously described (e.g., disposed in the aforementioned edge device). Alternatively, the server module 401 may be a stand-alone device disposed at the head end or other location (such as a VOD server 105 or application server 104), and may even include its own RF front end (e.g., modulators, encryptors, etc.) or optical interface so as to interface directly with various portions of the HFC network 101 if desired. Numerous other configurations may be used. The server device 242 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, any required conditioning of the content before delivery (such as the inclusion of watermarking or other data, encryption, generation of encryption key pairs and/or challenges, and so forth) may take the form of one or more computer programs running on a single device disposed within the network (e.g., the content server 242 of FIG. 2a), such as at a head-end, node, or hub.

As yet another example, portions of the content distribution functionality may be rendered as a dedicated or application specific IC (ASIC) or DSP having code running thereon. For example, a security processor of the type well known in the art can be used to implement encryption algorithms on the delivered content, and/or to perform key pair generation and the like. Myriad different configurations for practicing the invention will be recognized by those of ordinary skill in the network arts provided the present disclosure.

The server operation can also be masked or controlled by a "business rules" engine" or other logical wrapper or layer as described subsequently herein.

Local Client Device—

Figure 5:
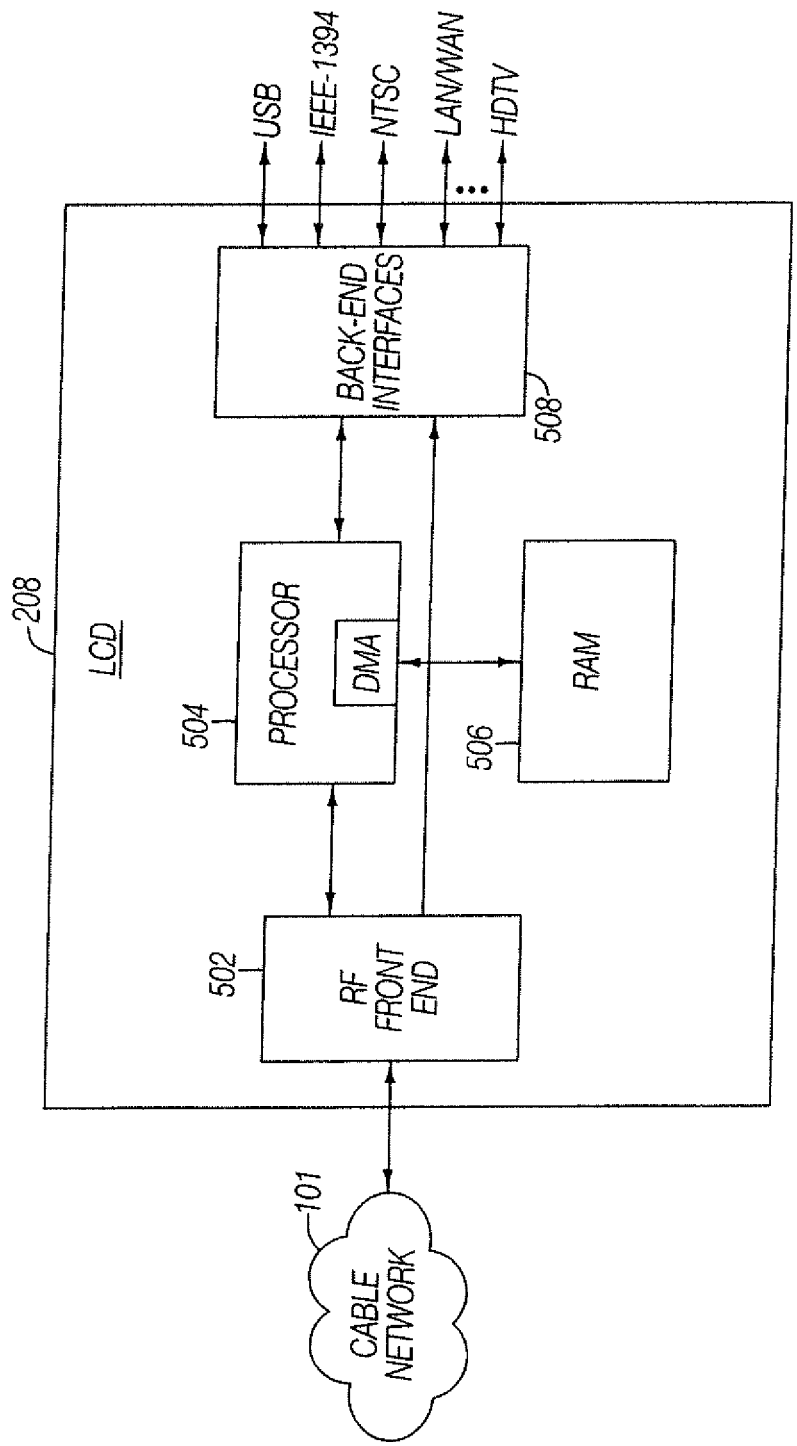
FIG. 5 is a functional block diagram illustrating a first embodiment of a local client device (LCD) generally useful with the invention.
Figure 6:
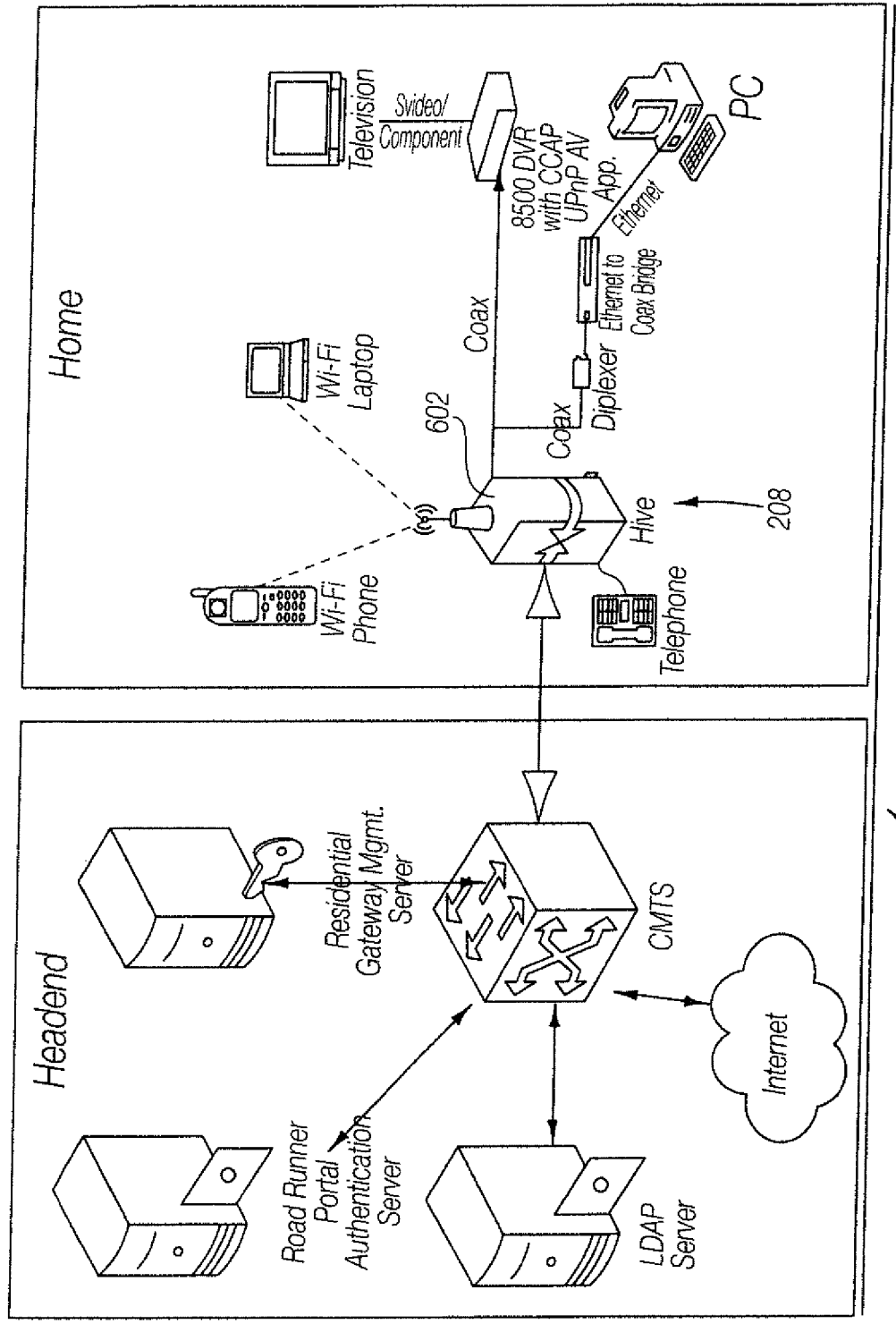
FIG. 6 is a functional block diagram illustrating a first embodiment of a local client device (LCD) generally useful with the invention.

Referring now to FIGS. 5 and 6, exemplary embodiments of the Local Client Devices (LCDs) according to the invention are described.

In the case of HFC or satellite networks, the LCD 208 in one embodiment comprises a CPE in the form of a set-top box with a tuner stage or front end adapted for interface with the relevant physical medium (e.g., connected to the coaxial cable, or a satellite antenna). The LCD 208 may or may not include DVR/PVR functionality. Also, the LCD may not be a physically separate or stand-alone piece of equipment but be integrated into another device, such as in the case of a cable-ready television set.

FIG. 5 illustrates an exemplary embodiment of an LCD 208 according to the present invention. As shown in the simplified diagram of FIG. 5, the device 208 generally comprises an OpenCable-compliant embedded system (e.g., DSTB) having an RF front end 502 (including tuner and demodulator/decryptors) for interface with the HFC network 101 of FIG. 2a, digital processor(s) 504, storage device 506, and a plurality of interfaces 508 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 5 for simplicity) various processing layers (e.g., DOCSIS MAC or DAVIC OOB channel, MPEG, etc.) as well as media processors and other specialized SoC or ASIC devices. The LCD 208 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The LCD 208 of FIG. 5 is also provided with an OCAP-compliant application and Java-based middleware which, inter alia, manages the operation of the device and applications running thereon. It will be recognized by those of ordinary skill that myriad different device and software architectures may be used consistent with the tuning and channel request functions of the present invention, the device of FIG. 5 being merely exemplary. For example, different middlewares (e.g., MHP, ARIB, or ACAP) may be used in place of the OCAP middleware of the illustrated embodiment.

The exemplary LCD 208 further comprises a personal content or media application, which allows a user to manage his personal content. Such management includes, but is not limited to, the ability to browse through content stored to see which are available for viewing, select content for local viewing, and configure various parameters associated with the remote access (e.g., user logon names, passwords, etc.). As previously described, the content available for viewing may be stored locally, or alternatively may be stored remotely, such as at the head-end, BSA hub, or even a third party content source.

The personal content application is also responsive to a network-side application (e.g., server portion of a DA) that queries the LCD to check on the content titles stored on the LCD, and other data related thereto.

In one implementation, the client program resident on the LCD 208 tracks and reports user activity related to personal content viewing to the relevant server(s) for each LCD. This activity tracking is useful from a number of perspectives, including: (i) determining remote access to content that has been stored or viewed locally; (ii) in billing; and (iii) in determining when programs are added or deleted from the local storage (e.g., subscriber's DVR). This tracking can also be performed in a substantially anonymous fashion, such as through use of cryptographic hashes of TUNER ID, MAC, and similar variables as described in detail elsewhere herein. Such mechanisms allow for specific identification of the LCD 208 which has recorded or accessed content, without necessarily having to know the subscriber's identity.

Furthermore, an application on the LCD 208 can be made to be responsive to the user's commands to control the DVR from the remote or visited network 204. Such a logical connection from the remote network to the LCD can be implemented using any number of different approaches, including direct communications between the LCD 208 and the RCD 214 (e.g., via Internet), relayed communications that pass through the MSO (local) infrastructure (e.g., RCD 214 to CM 238 to LCD 208), and so forth. Allowing the subscriber to set up such a connection provides a remote management interface to managing the LCD to perform personal media related functions, among others, thereby adding significant flexibility to the operation and utilization of the remote content access functionality.

FIG. 6 illustrates an alternative embodiment of the LCD comprising a converged device (CD), such as that described in co-owned U.S. patent application Ser. No. 11/378,129 entitled "Methods and Apparatus for Centralized Content and Data Delivery" filed Mar. 16, 2006, issued as U.S. Pat. No. 8,347,341 on Jan. 1, 2013, and incorporated herein by reference in its entirety. The exemplary CD 602 comprises a remotely manageable premises device that, inter alia, acts as a centralized client networking platform providing gateway services such as network management as well as traditional content and high-speed data delivery functions. The device also acts as the shared internet (e.g., Internet) connection for all devices in the premises via a cable modem or other such interface, sharing personal and DVR content such as video, music and photos (and any associated metadata) throughout the premises, and providing both a wired and wireless network in the home. Telephony services utilizing e.g., embedded multimedia terminal adapter (eMTA) and/or Wi-Fi architectures may also be provided via the device; these services can make use of the network operator's indigenous VoIP or comparable telephony capability if desired, thereby providing an even more unified service environment.

The converged premises device can also provide a trusted domain for content or data, as well as allowing a subscriber total mobility in the home by not limiting content or data to any one viewing/access location. For example, content or data may be accessed on any monitor in the premises, as well as on a PC or personal media device (PMD).

A wired home network utilizing existing coaxial cable in the premises is also created, using e.g., an Ethernet-to-coaxial bridge technology based on the MoCA specification. This allows existing devices and DVRs to connect and share content with the CD, and also allows the network operator (e.g., MSO) to control and manage the premises coaxial network.

The CD is also advantageously accessible via any remote device with internetworking (e.g., Internet) capability, thereby allowing personal content to be accessed by the user (or other entities such as the content manager 238) from outside the premises.

Business Methods and Considerations—

Various exemplary business-related aspects of the remote content delivery technology previously discussed herein are described in detail.

In one embodiment, remote access capability is provided as an incentive or feature as part of the subscriber's subscription plan. Hence, this approach treats the remote location as merely an extension of the subscriber's premises, thereby requiring no differentiation between the remote and local domains.

In a second embodiment, streamed content or data sent to a RCD (e.g., cellular telephone, PDA, laptop, etc.) is differentiated (from a billing perspective) from that delivered to the subscriber's premises, and billed directly to the subscriber's MSO account, such as via their monthly cable TV bill. The billing module 152 or other comparable process software at the MSO head-end is configured to obtain the relevant data regarding the subscriber's remote device usage, which is then integrated with that subscriber's other activity to generate a monthly statement. Such data may comprise, for example, the number of movies or other content the subscriber has downloaded during the past billing cycle. As an alternative to the foregoing "per-use" model, the subscriber may be offered a plan wherein they can obtain an unlimited (or finite) number of remote downloads or access per billing cycle, such as for a flat fee. As yet another alternative, the selected/downloaded content or data can be billed on a "pay as you go" basis, such as via debit card, electronic payment service (e.g., "Paypal™") or the like, with successful negotiation of the payment contract being a condition precedent to delivery of the content/data.

Content as discussed previously also need not be full length features (e.g., movies); rather, music videos, promotional materials, tutorials, trailers, and other desirable content can be provided in a broadcast or session fashion without the extra effort associated with entering into a contract with a separate service provider. Similarly, it is anticipated that content developers (such as the MSO themselves, or a third-party entity such as a studio or channel) will develop content specifically adapted to the remote delivery paradigm set forth herein; e.g., suitable to perhaps more limited bandwidth availability of the remote network 204. In this fashion, the MSO or other content source may also maintain two or more versions of the content recorded or purchased by the subscriber; e.g., a "local" or home copy, and a "remote" or lower bandwidth or differently encoded/compressed copy, with the applicable version being delivered to the user depending on their location. The local copy might also comprise HD, while the remote copy comprises an SD rendition of the same content.

This process can also work in reverse; i.e., to provide content or data from the subscriber upstream. As previously discussed, the captured video can be uploaded to the MSO or third party server, for later download and viewing at the subscriber's premises (or those of other subscribers authorized to view the content). Such download may also be to a second appropriately equipped RCD 214.

Figure 7:
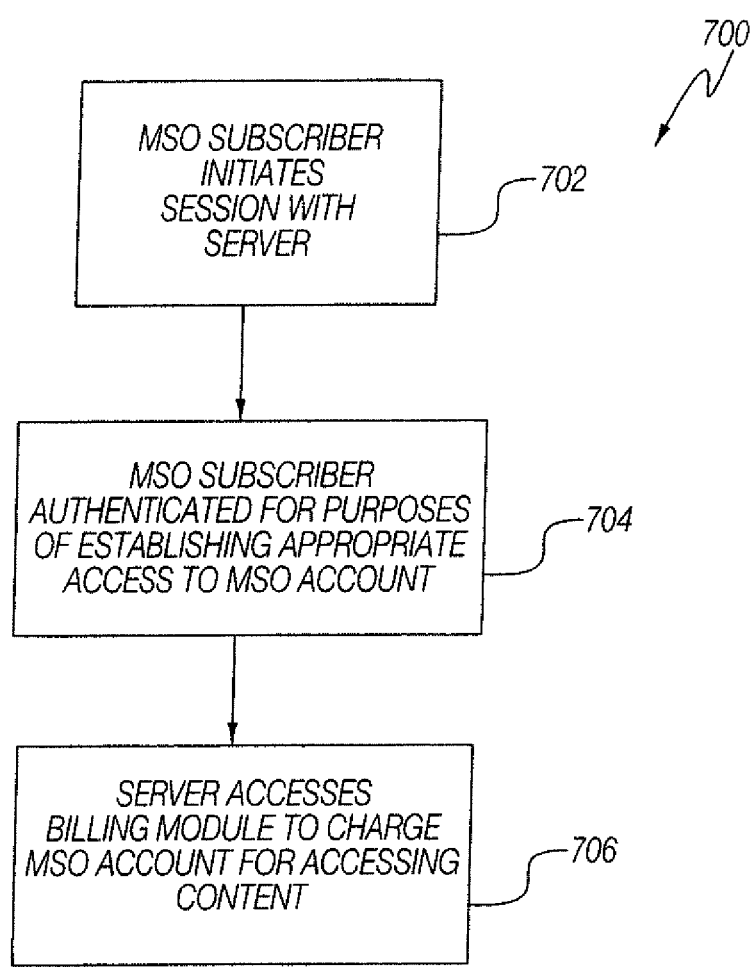
FIG. 7 is a logical flow diagram illustrating one exemplary business method for establishing common billing between a MSO subscriber's local network and remote access to content through a (mobile) client device.

Referring now to FIG. 7, one embodiment of the aforementioned methodology is described in detail in the context of an exemplary MSO and associated mobile device (RCD) user, although it will be appreciated that the methodology 700 is readily adapted to other contexts.

In step 702, an MSO subscriber wishing to access content initiates a session directly or indirectly with the network entity providing the content (e.g., content server 242).

Per step 704, the subscriber is authenticated for purposes of verifying that the subscriber attempting to access content through an MSO account is indeed the person named in the MSO account. This can be accomplished through a variety of means including via security architecture at the cable (MSO) side of the system architecture, and/or authentication via the CSP/WSP, or any other portion on the IP network side of the system.

Per step 706, the content server 242 can access the billing module 152 or other billing entity within the network, whether directly or indirectly, and write a record or data into the appropriate database so that the subscriber can be charged for the content on his/her home cable bill. Other relevant information such as date/time, content requested, CSP/WSP network identification, and so forth may be included in the billing information if desired in order to be included on the subscriber invoice.

Lastly, the billing module 152 or other entity responsible for generating billing data assembles the invoice or statement for the subscriber using the cable system component (e.g., monthly service/use charges) as well as those associated with content access and download via the CSP/WSP if any. These latter charges can be set off in a separate section of the statement if desired, or merely integrated into existing categories of services or charges.

Furthermore, where a business relationship exists between the CSP/WSP and the MSO, the subscribers wireless or mobile access charges during the billing period (whether related to content access or not) may also be incorporated into the subscriber's MSO-generated bill. In this fashion, the subscriber can be provided only one "umbrella" invoice covering both their cable/satellite and wireless charges. Various of the foregoing data may also be optionally bundled with VoIP or similar access charges, such as for example where the MSO offers VoIP telephony service to their subscribers via their indigenous cable/satellite and IP infrastructure. This allows for an even higher level of service integration, with the subscriber receiving only one bill for their "home" (e.g., VoIP-based) and wireless telephony, as well as their cable or satellite and Internet access. In one exemplary configuration, the MSO can offer 1) cable access (including premium services such as DVR/PVR and on-demand), 2) high speed Internet access (such as the "Roadrunner®" offered by the Assignee hereof), 3) VoIP-based telephone service, and 4) remote content delivery service.

It will also be appreciated that there are significant economies of scale to this approach for the service provider(s), such as by obviating the need for the printing and mailing or electronic processing of multiple separate monthly invoices, and reduced customer service overhead. Such integrated service packages also offer increased opportunities for promotions, incentives, and "cross-over" sales of products and services, thereby increasing the profitability of this paradigm.

Delivery of the content to remote client or mobile devices (or the user's PC or laptop) can also be effected according to the methods and apparatus described in co-owned U.S. patent application Ser. No. 11/198,620 entitled "Method And Apparatus For Context-Specific Content Delivery" filed Aug. 4, 2005, and issued as U.S. Pat. No. 9,286,388 on Mar. 15, 2016, incorporated herein by reference in its entirety, which describes, inter alia, the display and seamless transition of primary and secondary content within, e.g., a unified display mechanism (window). This integration allows for yet additional business or economic opportunities, since the content downloaded by the user can be coupled (seamlessly) to an advertising server or the like, the latter presenting the user with context-specific links or other information (secondary content) relating to the primary content (e.g., video) downloaded. The user then merely selects one or more of these links, and is provided additional information relating to the topic of interest (either the primary content or the links which individually may or may not be commercial in nature). These links can be accessed, e.g., a traditional IP or similar mechanism of the type previously described herein, such as the well known WAP protocol and browser.

In addition to the foregoing, the "watch-along" function can also be marketed as an incentive or additional premium feature. Specifically, parents or others may desire to have the capability to both monitor what their children are watching while they are away, as well as affirmatively control access to certain channels or content from a remote location. This paradigm can also be readily extended into the enterprise or business arenas, such as to monitor/control employee channel usage.

Operations/Business Rules Engine—

In another aspect of the invention, the aforementioned content manager 238 (e.g., rendered as one or more computer programs) includes a so-called "rules" engine. This engine comprises, in an exemplary embodiment, a series of software routines running on the content server device 242 or other associated hardware/firmware environment adapted to control the operation of the content management algorithms previously described. These rules may also be fully integrated within the content manager 238 itself, and controlled via e.g., a GUI on a PC connected to the server 242. In effect, the rules engine comprises a supervisory entity which monitors and selectively controls, via the content manager 238, the remote content delivery functions at a higher level, so as to implement desired operational or business rules. The rules engine can be considered an overlay of sorts to the remote content management and delivery algorithms. For example, the content manager 238 may invoke certain operational protocols or decision processes based on requests received from the RCD, subscriber data, geographic data, etc. However, these processes may not always be compatible with higher level business or operational goals, such as maximizing profit or system reliability. Hence, when imposed, the business/operational rules can be used to dynamically (or manually) control the operation of the CM 238. The rules may be, e.g., operational or business-oriented in nature, or related to preservation of security, and may also be applied selectively in terms of time of day, duration, specific local areas, or even at the individual user level.

For example, one rule implemented by the rules engine may comprise only providing targeted secondary content insertion (e.g., advertising) to certain classes of subscribers (e.g., those at a premium level of service, or subscribers who have "opted-in" to receiving targeted advertising, since these subscribers may be considered to have the highest revenue potential or likelihood of responding to the targeted advertisement).

Another rule might impose a moratorium on delivering certain content (even if already viewed or recorded by the subscriber at the LCD 208) over the remote network to the RCD due to an actual or perceived threat of theft or unauthorized copying. For example, the MSO may only allow remote delivery of certain classes of content that are not considered "high value", or are sufficiently dated since their release over the local network.

It will also be appreciated that certain subscribers may be given preference for remote delivery of content over others, such as in cases where the remote network bandwidth is limited.

It will be appreciated that less "binary" approaches than that described above can be utilized consistent with the invention, whether in the context of secondary content insertion, servicing remote delivery requests, or otherwise. Specifically, the foregoing approaches to remote delivery of content based on prior recording or tuner state has effectively two states; i.e., delivered or not delivered. This model has the advantage of simplicity, in that little real intelligence is required for implementation. For example, a supervisory process (e.g., algorithm) may comprise a fuzzy logic, Bayesian, or similar approach to classify individual RCDs into one of two categories in terms of a particular context (e.g., "high-value" or "low-value", "local" or "distant", "low bandwidth" or "high bandwidth", etc.), which can then be used as the sole (or at least partial) basis for delivering content for the designated RCD.

Many other approaches and combinations are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A computerized method for providing digitally rendered content to at least one mobile computerized device via a content delivery network, the computerized method comprising:

receiving first data representative of a request to store a digitally rendered content element, the request to store originating from an application computer program operative to run on a first mobile computerized device, the received first data comprising data identifying the first mobile computerized device;

based at least on the received first data, determining that the first mobile computerized device is authorized to access the digitally rendered content element;

based at least on the received first data and the determination that the first mobile computerized device is authorized to access the digitally rendered content element, causing storage of the digitally rendered content element in a network storage location specifically designated for use by at least the first mobile computerized device or a user associated therewith;

receiving second data representative of a request to access the at least the digitally rendered content element, the request to access originating from an application computer program operative to run on a second mobile computerized device associated with the first mobile computerized device or the user, the received second data comprising data identifying the second mobile computerized device;

based at least on the received second data, determining that the second mobile computerized device is authorized to access the digitally rendered content element; and based at least on the received second data and the determining that the second mobile computerized device is authorized to access the digitally rendered content element, providing access to the stored digitally rendered content via the second mobile computerized device.

2. The computerized method of claim 1, wherein the determining, based at least on the received first data, that the first mobile computerized device is authorized to access the digitally rendered content element comprises accessing a network subscriber or user database using at least the data identifying the first mobile computerized device, the database comprising data associating the first mobile device to the user and one or more subscription or access privileges.

3. The computerized method of claim 1, wherein:

the network storage location is part of a computerized storage entity comprising a multi-user partitioned storage apparatus accessible to a group of users including the user; and the network storage location comprises an electronically secure storage location configured to frustrate unauthorized copying or reproduction of the digitally rendered content by at least other users of the group.

4. The computerized method of claim 1, wherein the first computerized device is accessing the content delivery network via a second network, and the computerized method further comprises:

authenticating the first computerized device at separate computerized processes of each of the content delivery network and the second network.

5. The computerized method of claim 1, wherein the first computerized device is accessing the content delivery network via a second network, and the computerized method further comprises:

authenticating the first computerized device at a first computerized process of one of the content delivery network and the second network; and using data associated with the authentication of the first computerized device by the first computerized process at the one of the content delivery network and the second network, to authenticate within the other one of the content delivery network and the second network using a second computerized process.

6. The computerized method of claim 1, wherein the second computerized device is accessing the content delivery network via a second network, and the determining that the second mobile computerized device is authorized to access the digitally rendered content element comprises validating at least login credentials included in the second data against a computerized database of the content delivery network, the computerized database comprising data associating the first mobile computerized device and the second mobile computerized device with an account having content access privileges.

7. The computerized method of claim 1, wherein the content delivery network comprises a managed content delivery network, and the receiving the first data comprises receiving the first data at a computerized server of the managed content delivery network, and computerized method further includes:

receiving the digitally rendered content element from a third party web server external to the managed content delivery network.

8. Computerized network apparatus, comprising:

first network apparatus configured to store digitally rendered content, and distribute the digitally rendered content to a first computerized device at a first location via a first content delivery network;

second network apparatus in data communication with the first network apparatus and configured to receive data representative of a request to access the digitally rendered content from a second computerized device located at a second location served by a second content delivery network; and computerized logic in data communication with the first network apparatus and the second network apparatus and configured to, when executed:

based at least on (i) a portion of the received data representative of the request, and (ii) data indicating that the digitally rendered content has previously been stored for delivery to the first location, determine that the second computerized device is authorized to receive the stored digitally rendered content; and cause delivery of the stored digitally rendered content to the second computerized device at the second location via the second content delivery network.

9. The computerized network apparatus of claim 8, wherein the first content delivery network comprises a cable or satellite content delivery network, the second content delivery network comprises a cellular network configured to distribute content to a plurality of mobile devices; and wherein the second computerized device comprises a mobile device, and a relationship between the first computerized device and the second computerized device comprises the first computerized device and the second computerized device being associated with a common user that is subscribed to receive first service over the cable or satellite network and second service over the cellular network.

10. The computerized network apparatus of claim 8, wherein the first computerized device and the second computerized device being associated with the common user is determined at least in part by the common user providing authentication information via the second computerized device.

11. The computerized network apparatus of claim 8, wherein the computerized device is associated with a subscriber of the first content delivery network, the association being determined at least in part on authentication information, the authentication information being useful for authentication of the subscriber to the first content delivery network.

12. The computerized network apparatus of claim 11, wherein the authentication information comprises a one-way cryptographic hash utilized to anonymously identify at least one of the subscriber and the computerized device.

13. The computerized network apparatus of claim 12, wherein the one-way cryptographic hash is generated based on at least the IP address of the computerized device.

14. The computerized network apparatus of claim 11, wherein the storage of the digitally rendered content comprises storage of the digitally rendered content in a virtual storage apparatus.

15. The computerized network apparatus of claim 14, wherein the storage of the digitally rendered content in the virtual storage apparatus comprises storage within a portion of the virtual storage apparatus, the portion specifically assigned to or associated with the subscriber such that only the subscriber can access the portion.

16. The computerized network apparatus of claim 14, wherein the virtual storage apparatus comprises a plurality of discrete storage apparatus disposed at different physical locations but logically operative as a single storage device.

17. Computer readable apparatus comprising a non-transitory storage medium, the non-transitory medium comprising at least one computer program having a plurality of instructions, the plurality of instructions configured to, when executed on a processing apparatus:

form, via a network apparatus of a content delivery network, a trusted domain with an Internet Protocol (IP)-enabled device of a user;

receive data representative of a request for a digital content element, the request originated from the IP-enabled device;

determine that the user is permitted access to the digital content element and based at least on the determination, cause storage of the content element at a partitioned virtual storage location accessible to the user; and subsequent to the storage, provide access the stored digital content element available to the IP enabled device of the user within the trusted domain for delivery over the content delivery network.

18. The computer readable apparatus of claim 17, wherein the determination that the user is permitted access to the digital content element comprises:

transmission of data identifying the IP-enabled device to an authorization entity of a second network; and receipt, from the authorization entity, of a determination that the IP-enabled device is among a plurality of computerized devices associated with the user.

19. The computer readable apparatus of claim 18, wherein the content delivery network comprises a hybridized fiber/non-fiber network, the second network comprises the Internet, the IP-enabled device comprises a personal mobile device able to access the Internet, and the authorization entity comprises an Internet-based server.

20. The computer readable apparatus of claim 17, wherein the stored digital content element is configured to be accessible only by the user via at least an association of a particular device identification associated with the user's subscriber account to the stored digital content element.

21. The computer readable apparatus of claim 20, wherein the stored digital content element is configured to be accessible only by the user by at least removal of the stored digital content element from the partitioned virtual storage location upon the delivery thereof to the IP enabled device.

22. The computer readable apparatus of claim 17, wherein the digital content element comprises content which bears a contextual relationship to a geographic location at which the IP-enabled device is then disposed.

23. A computerized method for providing digitally rendered content to at least one mobile computerized device via a managed content delivery network, the computerized method comprising:

receiving at a first computerized process of the managed content delivery network first data representative of a request to store a digitally rendered content element, the request to store originating from an application computer program operative to run on a first mobile computerized device, the received first data comprising data identifying the first mobile computerized device;

based at least on the received first data, determining that the first mobile computerized device is authorized to access the digitally rendered content element;

receiving the digitally rendered content element from a web server associated with a third party content provider, the web server being external to the managed content delivery network;

based at least on the received first data and the determination that the first mobile computerized device is authorized to access the digitally rendered content element, causing storage of the digitally rendered content element in a network storage location of the managed content delivery network, the network storage location specifically designated for use only by at least the first mobile computerized device or a user associated therewith; and subsequently providing access to the stored digitally rendered content element by at least the first mobile computerized device.

* * * * *